(12) United States Patent
Kondo

(10) Patent No.: US 9,918,084 B2
(45) Date of Patent: Mar. 13, 2018

(54) ENCODING DEVICE, ENCODING METHOD, DECODING DEVICE, AND DECODING METHOD

(75) Inventor: Kenji Kondo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 702 days.

(21) Appl. No.: 13/805,428

(22) PCT Filed: Jul. 8, 2011

(86) PCT No.: PCT/JP2011/065734
§ 371 (c)(1),
(2), (4) Date: Dec. 19, 2012

(87) PCT Pub. No.: WO2012/008388
PCT Pub. Date: Jan. 19, 2012

(65) Prior Publication Data
US 2013/0094584 A1    Apr. 18, 2013

(30) Foreign Application Priority Data
Jul. 15, 2010    (JP) .................................. 2010/160952

(51) Int. Cl.
*H04N 19/159*    (2014.01)
*H04N 19/176*    (2014.01)
(Continued)

(52) U.S. Cl.
CPC ..... *H04N 19/00781* (2013.01); *H04N 19/122* (2014.11); *H04N 19/159* (2014.11);
(Continued)

(58) Field of Classification Search
None
See application file for complete search history.

(56) References Cited

U.S. PATENT DOCUMENTS

| | | | | |
|---|---|---|---|---|
| 2008/0310507 A1* | 12/2008 | Ye | ..................... | H04N 19/00812 375/240.12 |
| 2009/0327386 A1* | 12/2009 | Schoenblum | ........... | G06T 5/002 708/400 |
| 2011/0293002 A1* | 12/2011 | Sole | ....................... | H04N 19/70 375/240.12 |

OTHER PUBLICATIONS

McCann et al., "Samsung's Response to the Call for Proposals on Video Compression Technology," Joint Collaborative Team on Video Coding (JCT-VC) of ITU-T SG16 WP3 and ISO/IEC JTC1/SC29/WG11 1st Meeting: Dresden, DE, Apr. 2010, pp. 1-42.*

(Continued)

*Primary Examiner* — Thai Tran
*Assistant Examiner* — Christopher T Braniff
(74) *Attorney, Agent, or Firm* — Oblon, McClelland, Maier & Neustadt, L.L.P.

(57) ABSTRACT

The present technology relates to an encoding device and an encoding method, and a decoding device and a decoding method that are capable of reducing the calculation amount of orthogonal transform processing or inverse orthogonal transform processing. A DWT unit (91) performs a DWT of which the calculation amount is smaller than that of a KLT for residual information. KLT units (92-0 to 92-8) perform separable-type KLTs for a low-frequency component of the residual information that is acquired as a result of the DWT using bases of KLTs of the corresponding intra prediction modes. A coefficient acquired as a result of the KLT and a high-frequency component of the residual information that is acquired as a result of the DWT are losslessly encoded. The present technology can be applied to, for example, an image encoding device.

7 Claims, 27 Drawing Sheets

(51) Int. Cl.
*H04N 19/61* (2014.01)
*H04N 19/63* (2014.01)
*H04N 19/122* (2014.01)
*H04N 19/18* (2014.01)
*H04N 19/42* (2014.01)

(52) U.S. Cl.
CPC ........... *H04N 19/176* (2014.11); *H04N 19/18* (2014.11); *H04N 19/42* (2014.11); *H04N 19/439* (2014.11); *H04N 19/61* (2014.11); *H04N 19/63* (2014.11)

(56) References Cited

OTHER PUBLICATIONS

Yan Ye and Marta Karczewicz, "Improved Intra Coding," ITU-Telecommunications Standardization Sector Study Group 16, Question 6, Video Coding Experts Group (VCEG) 33rd Meeting: Shenzhen, China, Document VCEG-AG11r1, ITU-T, Oct. 2007, pp. 1-6.*

Combined Office Action and Search Report dated Jan. 26, 2015 in Chinese Patent Application No. 201180033755.6 (with English language translation).
International Search Report dated Oct. 4, 2011 in PCT/JP2011/065734.
Ken McCann et al., "Samsung's Response to the Call for Proposals on Video Compression Technology", Joint Collaborative Team on Video Coding (JCT-VC) of ITU-T SG16 WP3 and ISO/IEC JTC1/SC29/WG11, Apr. 15-23, 2010, 40 pages.
Yan Ye et al, "Improved Intra Coding", ITU-Telecommunications Standardization Sector, Study Group 16 Question 6, Video Coding Experts Group (VCEG), Oct. 20, 2007, 6 pages.
Marta Karczewicz et al., "Video coding technology proposal by Qualcomm Inc.", Joint Collaborative Team on Video Coding (JCT-VC) of ITU-T SG16 WP3 and ISO/IEC JTC1/SC29/WG11, Apr. 15-23, 2010, 25 pages.
Marta Karczewicz "Improved Intra Coding", ITU-Telecommunications Standardization Sector, Study Group 16 Question 6, Video Coding Experts Group (VCEG), Apr. 20-21, 2007, 4 pages.
Madhukar Budagavi et al., "Orthogonal MDDT and Mode Dependent DCT", ITU-Telecommunications Standardization Sector, Study Group 16 Question 6, Video Coding Experts Group (VCEG), Jan. 17-22, 2010, 9 pages.

* cited by examiner

ENCODING DEVICE, ENCODING METHOD, DECODING DEVICE, AND DECODING METHOD

TECHNICAL FIELD

The present technology relates to an encoding device, an encoding method, a decoding device, and a decoding method, and more particularly, to an encoding device, an encoding method, a decoding device, and a decoding method capable of reducing the amount of calculation of orthogonal transform processing or inverse orthogonal transform processing.

BACKGROUND ART

In an advanced video coding (AVC) mode, a mode dependent directional transform (MDDT) that improves intra prediction encoding is proposed (for example, see Patent Documents 1 and 2). The MDDT is a technology for improving the encoding efficiency by using a Karhunen-Loeve transform (KLT) in accordance with an intra prediction mode instead of using a conventional discrete cosine transform (DCT) when an orthogonal transformation is performed for a residual error between an intra-predicted image and an input image.

The KLT is such a transform that coefficients after the transform have no correlation and is a transform in which the dispersion of a first principal component is a maximum. More bits are assigned to a large coefficient of dispersion that is acquired by such a transform, and fewer bits are assigned to a small coefficient of the dispersion, whereby the encoding efficiency can be improved.

Further, as described in Patent Document 1, the residual error between an intra-predicted image and an input image depends on an intra prediction mode. Accordingly, in the MDDT, bases of the KLT are learned in accordance with an intra prediction mode in advance, and, by using a base of the KLT that differs in accordance with each intra prediction mode, the residual can be efficiently transformed.

However, the KLT has a calculation amount more than the DCT. Thus, in Patent Document 2, it is proposed to decrease the number of times of multiplication by performing not a non-separable type KLT that has generality but a separable-type KLT having a relatively small amount of calculation for the residual between an intra-predicted image and an input-image.

CITATION LIST

Non-Patent Documents

Non-Patent Document 1: Marta Karczewicz, "Improved Intra Coding", VCEG (Video Coding Experts Group)-AF15, USA, April, 2007

Non-Patent Document 2: Yan Ye, Marta Karczewicz, "Improved Intra Coding", VCEG (Video Coding Experts Group)-AG11r1, China, October, 2007

SUMMARY OF THE INVENTION

Problems to be Solved by the Invention

However, as disclosed in Patent Document 2, even in a case where the separable-type KLT is performed, when the block size is large, the amount of calculation is large. More specifically, when the block size is N×N pixels, the order of the amount of calculation of the DCT using a high-speed algorithm is Nlog|N|, and the order of the amount of calculation of the separable-type KLT is $N^2$. Accordingly, as the block size becomes larger, the amount of calculation of the separable-type KLT becomes larger than the amount of calculation of the DCT using a high-speed algorithm.

As a result, in a case where the separable-type KLT is realized by hardware, the circuit scale of the large scale integration (LSI) increases, and accordingly, the manufacturing cost increases. On the other hand, in a case where the separable-type KLT is realized by software, the amount of processing increases, and it is difficult to reproduce an image in real time.

The present technology is contrived in view of such situations and enables a decrease in the amount of calculation in orthogonal transform processing or inverse orthogonal transform processing.

Solutions to Problems

A first aspect of the present technology is an encoding device including: a prior orthogonal transformation unit that performs a second orthogonal transform of which a calculation amount is smaller than a calculation amount of a first orthogonal transform for an image; a posterior orthogonal transformation unit that performs the first orthogonal transform for a low-frequency component of the image that is acquired as a result of the second orthogonal transform; and an encoding unit that encodes the low-frequency component after the first orthogonal transform and a high-frequency component of the image that is acquired as a result of the second orthogonal transform.

An encoding method according to the first aspect of the present technology corresponds to the encoding device according to the first aspect of the present technology.

According to the first aspect of the present technology, a second orthogonal transform of which the calculation amount is smaller than that of a first orthogonal transform is performed for an image, the first orthogonal transform is performed for a low-frequency component of the image that is acquired as a result of the second orthogonal transform, and the low-frequency component after the first orthogonal transform and a high-frequency component of the image that is acquired as a result of the second orthogonal transform are encoded.

A second aspect of the present technology is a decoding device including: a decoding unit that acquires a coefficient of a low-frequency component of an image after a first orthogonal transform that is acquired as a result of performing a second orthogonal transform of which a calculation amount is smaller than a calculation amount of the first orthogonal transform as a result of encoding the image and a result of encoding a high-frequency component of the image that is acquired as a result of performing the second orthogonal transform and decodes a result of encoding of the image; a prior inverse orthogonal transformation unit that performs a first inverse orthogonal transform that corresponds to the first orthogonal transform for the coefficient of the low-frequency component after the first orthogonal transform that is acquired as a result of the decoding; and a posterior inverse orthogonal transformation unit that acquires the image by performing a second inverse orthogonal transform that corresponds to the second orthogonal transform for the low-frequency component that is acquired as a result of the first inverse orthogonal transform and the high-frequency component that is acquired as a result of the decoding.

A decoding method according to the second aspect of the present technology corresponds to the decoding device according to the second aspect of the present technology.

According to the second aspect of the present technology, a coefficient of a low-frequency component of an image after a first orthogonal transform that is acquired as a result of performing a second orthogonal transform of which a calculation amount is smaller than a calculation amount of the first orthogonal transform as a result of encoding the image and a result of encoding a high-frequency component of the image that is acquired as a result of performing the second orthogonal transform are acquired, a result of encoding of the image is decoded, a first inverse orthogonal transform that corresponds to the first orthogonal transform is performed for the coefficient of the low-frequency component after the first orthogonal transform that is acquired as a result of decoding, and a second inverse orthogonal transform that corresponds to the second orthogonal transform is performed for the low-frequency component that is acquired as a result of the first inverse orthogonal transform and the high-frequency component that is acquired as a result of the decoding, whereby the image can be acquired.

The encoding device according to the first aspect and the decoding device according to the second aspect may be independent devices or may be internal blocks that configure one device.

Effects of the Invention

According to the first aspect of the present technology, the amount of calculation in orthogonal transform processing can be reduced.

In addition, according to the second aspect of the present technology, the amount of calculation in inverse orthogonal transform processing can be reduced.

MODE FOR CARRYING OUT THE INVENTION

First Embodiment

Configuration Example of Image Encoding Device

Figure 1:
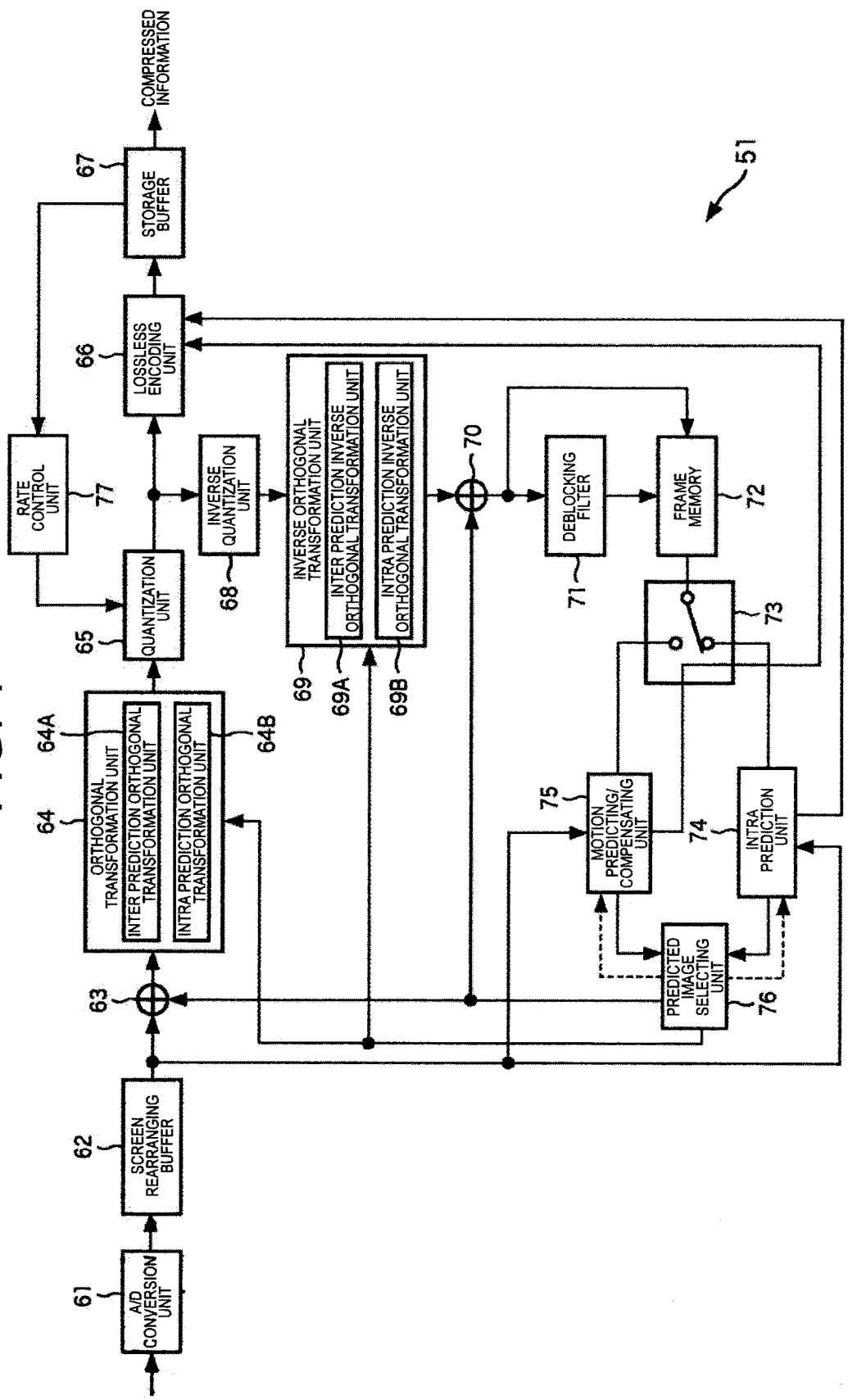
FIG. 1 is a block diagram that illustrates a configuration example of an image encoding device according to a first embodiment of the present technology.

FIG. 1 is a block diagram that illustrates a configuration example of an image encoding device according to a first embodiment of the present technology.

The image encoding device 51 illustrated in FIG. 1 is configured by an A/D conversion unit 61, a screen rearranging buffer 62, a calculation unit 63, an orthogonal transformation unit 64, a quantization unit 65, a lossless encoding unit 66, a storage buffer 67, an inverse quantization unit 68, an inverse orthogonal transformation unit 69, a calculation unit 70, a deblocking filter 71, a frame memory 72, a switch 73, an intra prediction unit 74, a motion predicting/compensating unit 75, a predicted image selecting unit 76, and a rate control unit 77. The image encoding device 51 compresses and encodes an input image in an AVC mode.

More specifically, the A/D conversion unit 61 of the image encoding device 51 performs A/D conversion of input images that are formed in units of frames and outputs resultant images to the screen rearranging buffer 62 for storage. The screen rearranging buffer 62 arranges stored images of frames, which are in display order, in order for encoding in accordance with a group of picture (GOP) structure.

The calculation unit 63, as is needed, subtracts a predicted image supplied from the predicted image selecting unit 76 from an image read from the screen rearranging buffer 62.

The calculation unit 63 outputs an image acquired from a result of the subtraction or the image read from the screen rearranging buffer 62 to the orthogonal transformation unit 64 as residual information. In a case where a predicted image is not supplied from the predicted image selecting unit 76, the calculation unit 63 outputs the image that has been read from the screen rearranging buffer 62 to the orthogonal transformation unit 64 without any change as the residual information.

The orthogonal transformation unit 64 is configured by an inter prediction orthogonal transformation unit 64A and an intra prediction orthogonal transformation unit 64B. In a case where information (hereinafter, referred to as inter prediction mode information) that represents an optimal inter prediction mode is supplied from the predicted image selecting unit 76, the inter prediction orthogonal transformation unit 64A performs orthogonal transform processing such as a DCT or a KLT for the residual information supplied from the calculation unit 63 as orthogonal transform processing. Then, the orthogonal transformation unit 64 supplies coefficients that are acquired as the result of the process to the quantization unit 65 as transform coefficients.

In a case where information (hereinafter, referred to as intra-prediction mode information) that represents an optimal intra prediction mode is supplied from the predicted image selecting unit 76, the intra prediction orthogonal transformation unit 64B performs orthogonal transform processing for the residual information supplied from the calculation unit 63.

More specifically, the intra prediction orthogonal transformation unit 64B performs a discrete wavelet transform (DWT), which has a calculation amount less than a KLT, for the residual information and extracts a low-frequency component and a high-frequency component. Then, the intra prediction orthogonal transformation unit 64B performs a separable-type KLT of each intra prediction mode for the low-frequency component. The intra prediction orthogonal transformation unit 64B supplies coefficients that are acquired as a result of the separable-type KLT of the optimal intra-prediction mode that is represented by the intra prediction mode information and a high frequency component to the quantization unit 65 as transform coefficients.

The quantization unit 65 quantizes the transform coefficients that are supplied from the orthogonal transformation unit 64. The quantized transform coefficients are input to the lossless encoding unit 66.

The lossless encoding unit 66 acquires the intra prediction mode information from the intra prediction unit 74 and acquires the inter prediction mode information, information of a motion vector, and the like from the motion predicting/compensating unit 75.

The lossless encoding unit 66 (encoding unit) performs lossless encoding such as variable-length coding (for example, context-adaptive variable length coding (CAVLC)) and an arithmetic coding (for example, context-adaptive binary arithmetic coding (CABAC)) for the quantized transform coefficients supplied from the quantization unit 65 and sets resultant information as a compressed image. In addition, the lossless encoding unit 66 performs lossless encoding of the intra prediction mode information, the inter prediction mode information, the information of a motion vector, and the like and sets acquired resultant information as header information to be added to the compressed image.

In addition, in a case where the optimal prediction mode of the transform coefficients is the optimal intra prediction mode, the lossless encoding unit 66 performs lossless encoding of the transform coefficients in order according to the optimal intra prediction mode. The lossless encoding unit 66 supplies and stores the compressed image, to which the header information acquired as the result of the lossless encoding is added, to the storage buffer 67 as compressed information.

The storage buffer 67 temporarily stores the compressed information that is supplied from the lossless encoding unit 66 and, for example, outputs the compressed information to a recording device, a transmission line, or the like, which is not illustrated in the diagram, disposed on the latter part.

Further, the quantized transform coefficients output from the quantization unit 65 are also input to the inverse quantization unit 68, inverse-quantization is performed for the quantized transform coefficients, and then, the transform coefficients are supplied to the inverse orthogonal transformation unit 69.

The inverse orthogonal transformation unit 69 is configured by an inter prediction inverse orthogonal transformation unit 69A and an intra prediction inverse orthogonal transformation unit 69B. In a case where the inter prediction mode information is supplied from the predicted image selecting unit 76, the inter prediction inverse orthogonal transformation unit 69A performs an inverse orthogonal transform such as an inverse DCT or an inverse KLT for the transform coefficients that are supplied from the inverse quantization unit 68 as inverse orthogonal transform processing. The inter prediction inverse orthogonal transformation unit 69A supplies acquired resultant residual information to the calculation unit 70.

In a case where the intra prediction mode information is supplied from the predicted image selecting unit 76, the intra prediction inverse orthogonal transformation unit 69B performs inverse orthogonal transform processing for the transform coefficients that are supplied from the inverse quantization unit 68. More specifically, the intra prediction inverse orthogonal transformation unit 69B performs an inverse KLT of each intra prediction mode for a coefficient of the low-frequency component out of the transform coefficients. In addition, the intra prediction inverse orthogonal transformation unit 69B performs an inverse DWT for a high-frequency component out of the low-frequency component that is acquired as the result of the inverse KLT of the optimal intra prediction mode that is represented by the intra prediction mode information and the transform coefficients, thereby acquiring residual information. The intra prediction inverse orthogonal transformation unit 69B supplies the residual information to the calculation unit 70.

The calculation unit 70 adds the residual information supplied from the inverse orthogonal transformation unit 69 and the predicted image supplied from the predicted image selecting unit 76 together as is needed, thereby acquiring an image that is locally decoded. The calculation unit 70 supplies the acquired image to the deblocking filter 71.

The deblocking filter 71 filters the locally-decoded signal that is supplied from the calculation unit 70, thereby eliminating block distortion. The deblocking filter 71 supplies an acquired resultant image to the frame memory 72 for storage. In addition, the image before the deblocking filter process performed by the deblocking filter 71 is also supplied to the frame memory 72 and is stored.

The switch 73 outputs the image stored in the frame memory 72 to the motion predicting/compensating unit 75 or the intra prediction unit 74 as a reference image.

The intra prediction unit 74 performs an intra prediction process of all the intra prediction modes that are candidates based on the image read from the screen rearranging buffer 62 and the reference image supplied through the switch 73, thereby generating a predicted image. Here, intra prediction modes having different block sizes are described as mutually-different intra prediction modes even when the intra prediction modes are for the same predicted direction. In addition, as the block size, it is assumed that two types of 4×4 pixels and 8×8 pixels are handled.

In addition, the intra prediction unit 74 calculates cost function values for all the intra prediction modes that are candidates. Then, the intra prediction unit 74 selects an intra prediction mode of which the cost function value is a minimum as an optimal intra prediction mode.

This cost function value is also called a rate distortion (RD) cost and is calculated, for example, based on any one technique of a high complexity mode and a low complexity mode as defined in a joint model (JM) that is reference software of the AVC mode.

More specifically, in a case where the high complexity mode is employed as the technique for calculating a cost function value, provisionally the process up to the lossless encoding is performed for all the intra prediction modes that are candidates, and the cost function value represented in the following Equation (1) is calculated for each intra prediction mode.

$$\text{Cost(Mode)} = D + \lambda \cdot R \qquad \text{Equation (1)}$$

Here, D is a difference (distortion) between an original image and a decoded image, R is the amount of generated codes including up to a transform coefficient, and λ is a Larange multiplier that is given as a function of a quantization parameter QP.

On the other hand, in a case where the low complexity mode is employed as the technique for calculating a cost function value, generation of a decoded image and calculation of a header bit such as intra prediction mode information are performed for all the intra prediction modes that are candidates, and a cost function value represented by the following Equation (2) is calculated for each intra prediction mode.

$$\text{Cost(Mode)} = D + \text{QPtoQuant}(QP) \cdot \text{Header\_Bit} \qquad \text{Equation (2)}$$

Here, D is a difference (distortion) between an original image and a decoded image, Header_Bit is a header bit for an intra prediction mode, and QPtoQuant is a function that is given as a function of a quantization parameter QP.

In the low complexity mode, only decoded images are generated for all the intra prediction modes, and it is not necessary to perform lossless encoding, whereby the amount of calculation is small. Here, it is assumed that the high complexity mode is employed as the technique for calculating a cost function value.

The intra prediction unit 74 supplies the intra prediction mode information, the predicted image that is generated in the optimal intra prediction mode, and the corresponding cost function value to the predicted image selecting unit 76. When being notified of the selection of the predicted image that is generated in the optimal intra prediction mode from the predicted image selecting unit 76, the intra prediction unit 74 supplies the intra prediction mode information to the lossless encoding unit 66.

The motion predicting/compensating unit 75 predicts motions of all the inter prediction modes that are candidates based on the image supplied from the screen rearranging buffer 62 and the reference image supplied through the switch 73 and generates a motion vector. Then, the motion predicting/compensating unit 75 performs a compensation process for the reference image based on the motion vector and generates a predicted image. At this time, the motion predicting/compensating unit 75 calculates cost function values for all the inter prediction modes that are candidates and determines an inter prediction mode of which the cost function value is a minimum as an optimal inter prediction mode.

Then, the motion predicting/compensating unit 75 supplies inter prediction mode information, the predicted image that is generated in the optimal inter prediction mode, and the corresponding cost function value to the predicted image selecting unit 76. When being notified of the selection of the predicted image of the optimal inter prediction mode from the predicted image selecting unit 76, the motion predicting/compensating unit 75 outputs the inter prediction mode information, information of the corresponding motion vector, and the like to the lossless encoding unit 66.

The predicted image selecting unit 76 determines one of the optimal intra prediction mode and the optimal inter prediction mode as an optimal prediction mode based on the cost function values supplied from the intra prediction unit 74 and the motion predicting/compensating unit 75. Then, the predicted image selecting unit 76 supplies the predicted image of the optimal prediction mode to the calculation unit 63 and the calculation unit 70. In addition, the predicted image selecting unit 76 notifies the intra prediction unit 74 or the motion predicting/compensating unit 75 of the selection of the predicted image of the optimal prediction mode. Furthermore, the predicted image selecting unit 76 supplies the inter prediction mode information or the intra prediction mode information that represents the optimal prediction mode to the orthogonal transformation unit 64 and the inverse orthogonal transformation unit 69.

The rate control unit 77 performs control of the rate of the quantization operation of the quantization unit 65 based on the compressed information stored in the storage buffer 67 such that overflow or underflow does not occur.

[Description of Intra Prediction Mode]

Figure 2:
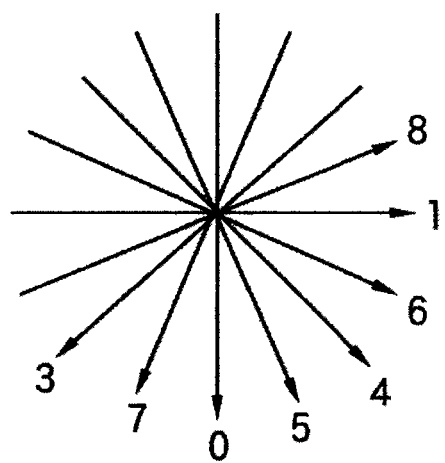
FIG. 2 is a diagram that illustrates an example of a predicted direction of each intra prediction mode.

FIG. 2 is a diagram that illustrates an example of a predicted direction of each intra prediction mode.

As illustrated in FIG. 2, in the intra prediction mode of the AVC mode, there are a mode in which eight directions are predicted and a mode in which a DC is predicted. Numbers represented in FIG. 2 are intra prediction mode numbers, and arrows to which the numbers are assigned represent predicted directions of the numbers.

More specifically, as illustrated in FIG. 2, a predicted direction of the intra prediction mode of number 0 is the vertical direction, and a predicted direction of the intra prediction mode of number 1 is the horizontal direction. An intra prediction mode of number 2 that is not illustrated in the diagram is a mode in which a DC is predicted. As illustrated in FIG. 2, predicted directions of the intra prediction modes of numbers 3 to 8 are oblique directions.

[Example of Detailed Configuration of Intra Prediction Orthogonal Transformation Unit]

Figure 3:
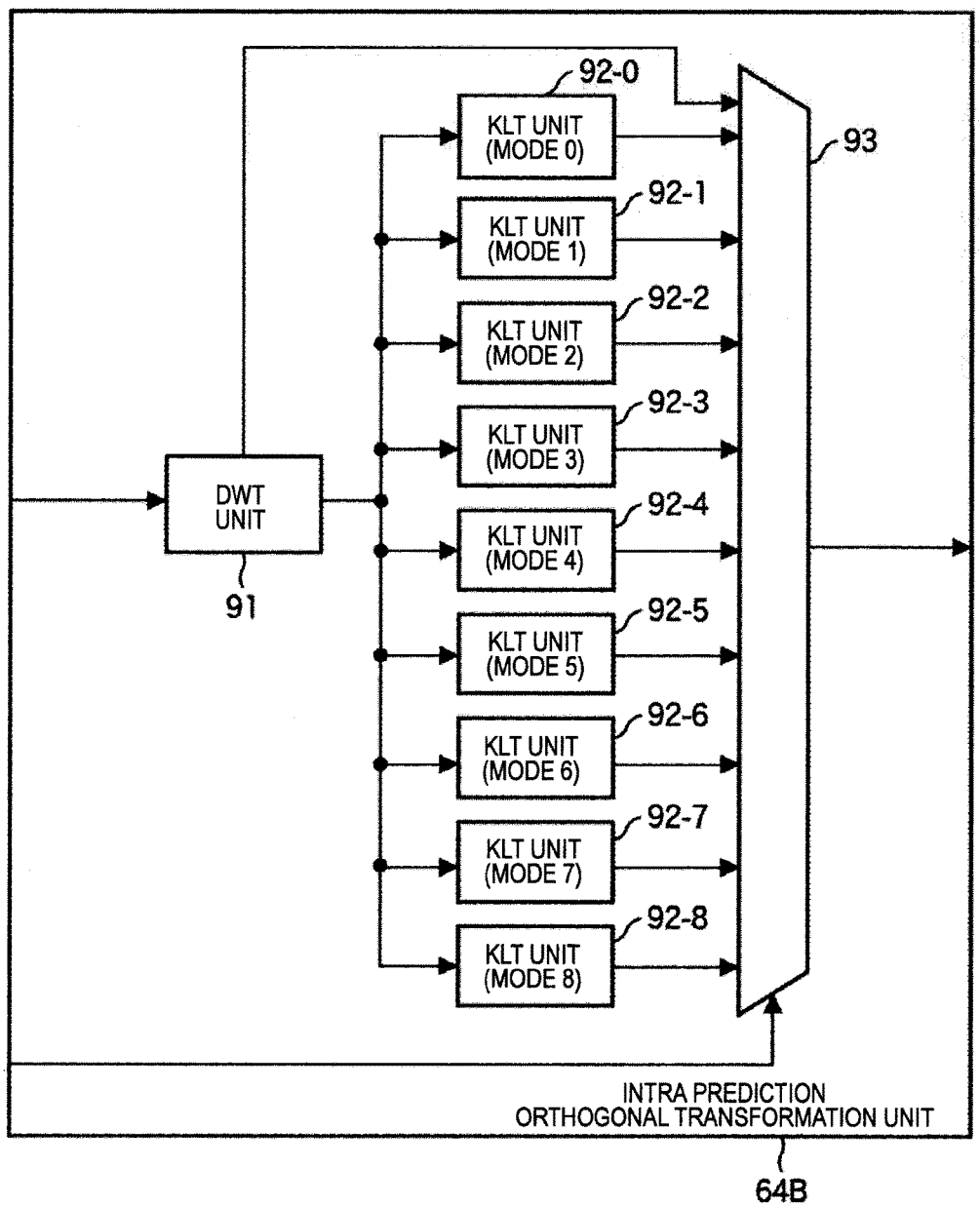
FIG. 3 is a block diagram that illustrates an example of a detailed configuration of an intra prediction orthogonal transformation unit that is illustrated in FIG. 1.

FIG. 3 is a block diagram that illustrates an example of a detailed configuration of the intra prediction orthogonal transformation unit 64B that is illustrated in FIG. 1.

The intra prediction orthogonal transformation unit 64B illustrated in FIG. 3 is configured by a DWT unit 91, KLT units 92-0 to 92-8, and a selector 93.

The DWT unit 91 (prior orthogonal transformation unit) performs a DWT for the residual information that is supplied from the calculation unit 63 illustrated in FIG. 1, as is needed, and thereby acquiring a low-frequency component and a high-frequency component. The DWT unit 91 supplies the low-frequency component to the KLT units 92-0 to 92-8 and supplies the high-frequency component to the selector 93. In a case where the KLT does not need to be performed, the DWT unit 91 supplies the residual information to the KLT units 92-0 to 92-8 without change.

The KLT units 92-0 to 92-8 (posterior orthogonal transformation units) perform separable-type KLTs for the low-frequency component or the residual information that is supplied from the DWT unit 91 using bases of the KLTs of the intra prediction modes of numbers 0 to 8. Here, the base of the KLT of each intra prediction mode is an optimal value that is acquired through learning in advance. The KLT units 92-0 to 92-8 supply coefficients that are acquired as results of the separable-type KLTs to the selector 93.

The intra prediction mode information supplied from the predicted image selecting unit 76 is supplied to the selector 93. The selector 93 selects a coefficient, which is supplied from one of the KLT units 92-0 to 92-8 that corresponds to the optimal intra prediction mode, out of coefficients supplied from the KLT units 92-0 to 92-8 based on the intra prediction mode information. Then, the selector 93 supplies the selected coefficient of the residual information to the quantization unit 65 (FIG. 1) as a transform coefficient or supplies a coefficient of the low-frequency component and the high-frequency component that is supplied from the DWT unit 91 to the quantization unit 65 as transformation coefficients.

Although the selector 93 is disposed after the KLT units 92-0 to 92-8 in the intra prediction orthogonal transformation unit 64B illustrated in FIG. 3, the selector may be disposed before the KLT units 92-0 to 92-8. In such a case, the low-frequency component or the residual information that is output from the DWT unit 91 is supplied to only one of the KLT units 92-0 to 92-8 that corresponds to the optimal intra prediction mode.

[Description of DWT]

Figure 4:
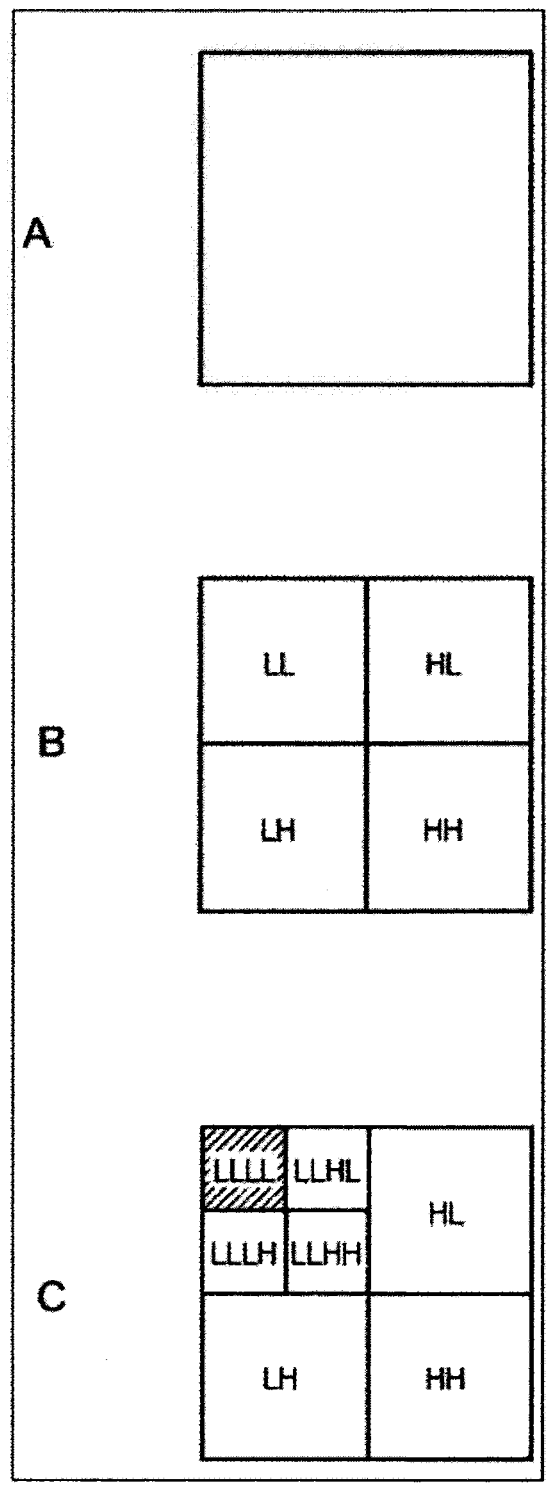
FIG. 4 is a diagram that illustrates a DWT performed by a DWT unit.

FIG. 4 is a diagram that illustrates the DWT performed by the DWT unit 91.

When the DWT is performed for the residual information illustrated in A of FIG. 4 in the horizontal direction and the vertical direction, as illustrated in B of FIG. 4, the horizontal component and the vertical component are respectively divided into a high-frequency component and a low-frequency component. In FIG. 4, L represents the low-frequency component, and H represents the high-frequency component. In addition, the horizontal component and the vertical component are continuously represented. These are similarly applied also to FIG. 17 to be described below.

As illustrated in B of FIG. 4, when a DWT is performed for the residual information in the horizontal direction and the vertical direction, the residual information is divided into a component (LL component) in which the horizontal component and the vertical component are low-frequency components, a component (HL component) in which the horizontal component is a high-frequency component and the vertical component is a low-frequency component, a component (LH component) in which the horizontal component is a high-frequency component and the vertical component is a low-frequency component, and a component (HH component) in which the horizontal component and the vertical component are high frequency components.

In addition, when a DWT is performed again for the LL component in the horizontal direction and the vertical direction, as illustrated in C of FIG. 4, the horizontal component and the vertical component of the LL component are respectively divided further into a high-frequency component and a low-frequency component. As a result, the LL component is divided into a component (LLLL component) in which the horizontal component and the vertical component are low-frequency components, a component (LLHL component) in which the horizontal component is a high-frequency component and the vertical component is a low frequency component, a component (LLLH) in which the horizontal component is a low-frequency component and the vertical component is a high-frequency component, and a component (LLHH component) in which the horizontal component and the vertical component are high-frequency components. The HL component, the LH component, and the HH component that are components of the residual information other than the LL component are unchanged.

For example, in a case where the number of DWTs performed by the DWT unit 91 is two, the LLLL component that is formed by the horizontal component and the vertical component that have the lowest frequency is output to the KLT units 92-0 to 92-8 (FIG. 3) as a low frequency component. Accordingly, the size of data that is a target for the separable-type KLT can be 1/16 of the size of data of the residual information. For example, in a case where the block size of the intra prediction corresponds to 4×4 pixels, in other words, in a case where the residual information corresponds to 4×4 pixels, the size of data that is a target for the separable-type KLT corresponds to 1×1 pixel. In addition, in a case where the block size of the intra prediction corresponds to 8×8 pixels, the size of data that is a target for the separable-type KLT corresponds to 2×2 pixels.

As a result, the calculation amount of the orthogonal transform processing for the residual information using a predicted image according to an intra prediction can be reduced. More specifically, when the block size corresponds to N×N pixels, the order of the calculation amount of the DWT unit 91 is about from N to Nlog|N|, and the order of the calculation amounts of the KLT units 92-0 to 92-8 is $(N/4)^2$. Accordingly, the order of the calculation amount of the orthogonal transform processing is about $(N/4)^2$+ Nlog|N|, which is sufficiently smaller than $N^2$ that is the order of the calculation amount of the separable-type KLT in a case where the block size corresponds to N×N pixels.

The components other than the LLLL component are output to the quantization unit 65 (FIG. 1) as high frequency components without change.

Here, the number of DWTs that are performed is not limited to two. The DWT is repeatedly performed until the size of a component that is formed by the horizontal component and the vertical component that have the lowest frequency is a size that can be processed by the KLT units 92-0 to 92-8 or less. As the size that can be processed by the KLT units 92-0 to 92-8 becomes smaller, although the calculation amount of the orthogonal transform processing is smaller, which is advantageous in terms of the manufacturing cost or real-time reproduction, the number of DWTs that are performed increases, and the coding efficiency decreases. Accordingly, the size that can be processed by the KLT units 92-0 to 92-8 is determined in consideration of the coding efficiency and an allowed range of the calculation amount of the orthogonal transform processing.

[Detailed Configuration Example of Intra Prediction Orthogonal Transformation Unit]

Figure 5:
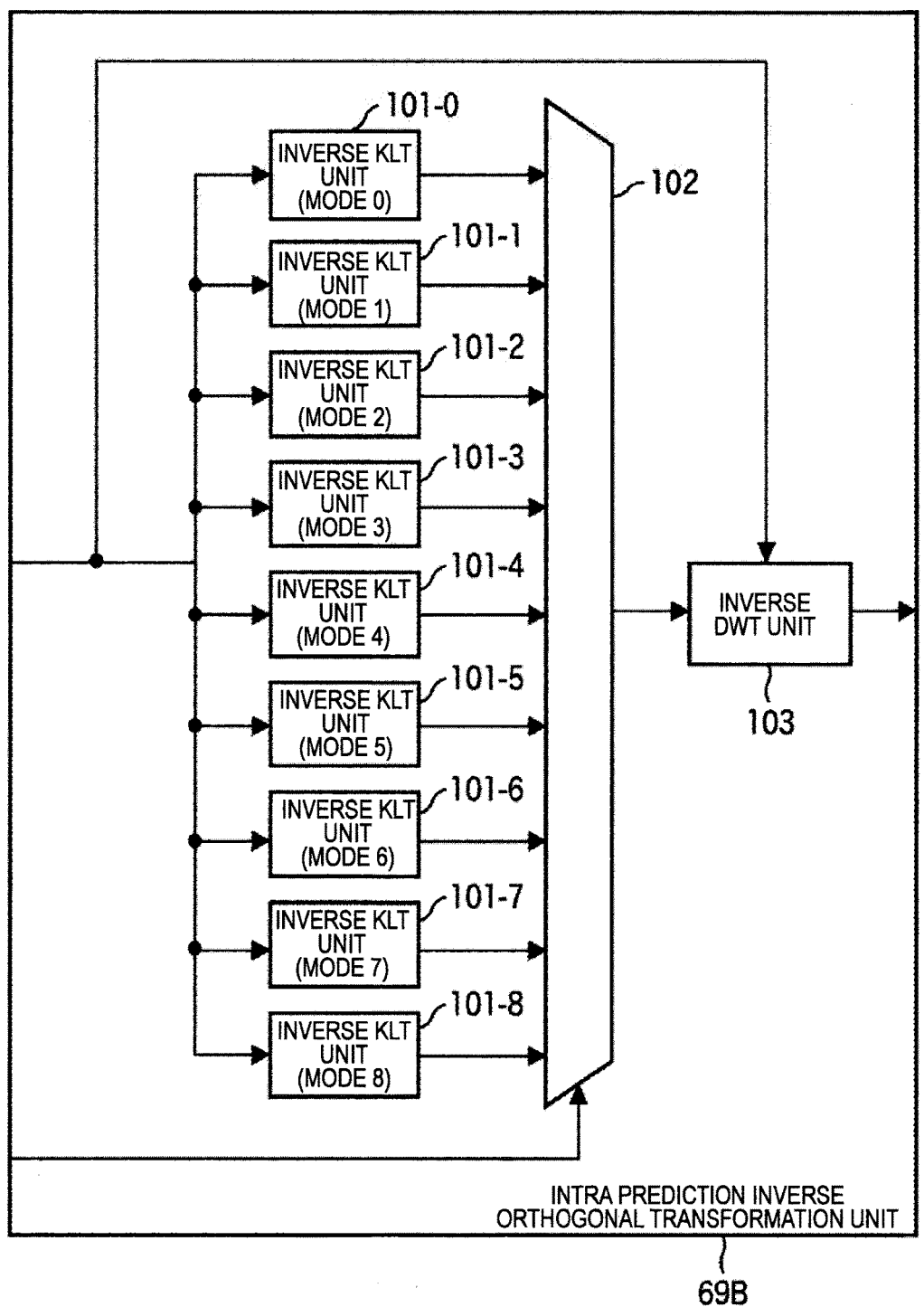
FIG. 5 is a block diagram that illustrates a detailed configuration example of the intra prediction inverse orthogonal transformation unit that is illustrated in FIG. 1.

FIG. 5 is a block diagram that illustrates a detailed configuration example of the intra prediction inverse orthogonal transformation unit 69B that is illustrated in FIG. 1.

The intra prediction inverse orthogonal transformation unit 69B illustrated in FIG. 5 is configured by inverse KLT units 101-0 to 101-8, a selector 102, and an inverse DWT unit 103.

The inverse KLT units 101-0 to 101-8 perform separable-type inverse KLTs for coefficients out of transform coefficients supplied from the inverse quantization unit 68 illustrated in FIG. 1 using bases of the inverse KLTs of the intra prediction modes of numbers 0 to 8.

The intra prediction mode information that is supplied from the predicted image selecting unit 76 is supplied to the selector 102. The selector 102 selects a post-inverse KLT component, which is supplied from one of the inverse KLT units 101-0 to 101-8, corresponding to the optimal intra prediction mode out of post-inverse KLT components supplied from the inverse KLT units 101-0 to 101-8 based on the intra prediction mode information. Then, the selector 102 supplies the selected post-inverse KLT component to the inverse DWT unit 103.

The inverse DWT unit 103 supplies the component that is supplied from the selector 102 to the calculation unit 70 (FIG. 1) as the residual information. Alternatively, the inverse DWT unit 103 performs an inverse DWT that corresponds to the DWT according to the DWT unit 91 for the component supplied from the selector 102 and a high-frequency component out of the transform coefficients supplied from the inverse quantization unit 68 and supplies an acquired resultant component to the calculation unit 70 as the residual information.

In the intra prediction inverse orthogonal transformation unit 69B illustrated in FIG. 5, although the selector 102 is disposed after the inverse KLT units 101-0 to 101-8, the selector may be disposed before the inverse KLT units 101-0 to 101-8. In such a case, coefficients of the transform coefficients supplied from the inverse quantization unit 68 are supplied only to one of the inverse KLT units 101-0 to 101-8 that corresponds to the optimal intra prediction mode.

[Description of Procedure of Lossless Encoding]

Figure 6:
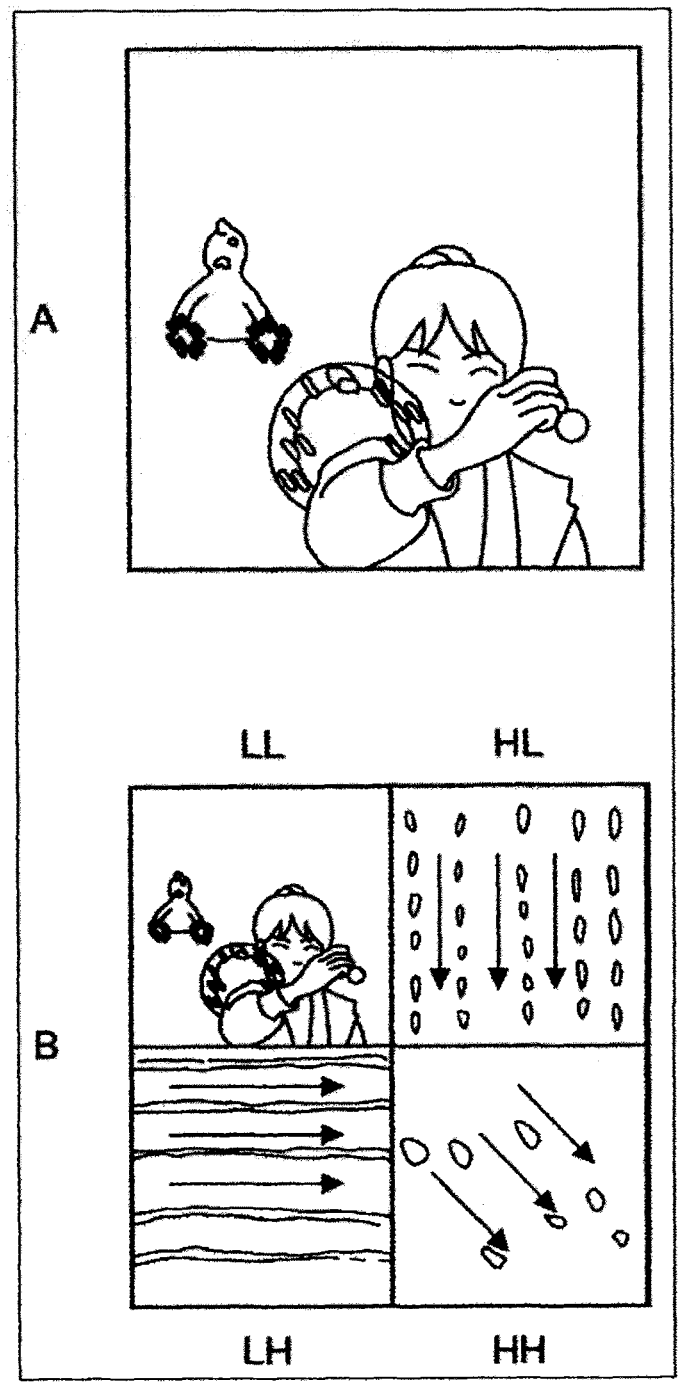
FIG. 6 is a diagram that illustrates the sequence of lossless encoding that is performed by the lossless encoding unit illustrated in FIG. 1.

FIG. 6 is a diagram that illustrates the sequence of lossless encoding that is performed by the lossless encoding unit 66 illustrated in FIG. 1.

In the lossless encoding, since the number of consecutive 0's is coded, and it is preferable that the sequence of lossless encoding is the sequence in which 0's are consecutive.

Thus, the lossless encoding unit 66 changes the encoding sequence in accordance with the intra prediction mode such that 0's of the transform coefficient after quantization is consecutive.

More specifically, when a DWT is performed for the residual information illustrated in A of FIG. 6, the residual information, as illustrated in B of FIG. 6, is divided into bands of four components including an LL component, an HL component, an LH component, and an HH component. At this time, as illustrated in B of FIG. 6, the LL component has characteristics of the residual information. In addition, the HL component represents lines extending in the vertical direction, the LH component represents lines extending in the horizontal direction, and the HH component represents lines extending in an oblique direction. In other words, the HL component has a strong correlation in the vertical direction, the LH component has a strong correlation in the horizontal direction, and the HH component has a strong correlation in the oblique direction.

In the intra prediction mode of number 0 in which the predicted direction is the vertical direction, the correlation of the residual information in the vertical direction is strong. In other words, there are many high-frequency components of the residual information in the horizontal direction. Accordingly, in the intra prediction mode of number 0, there are many cases where there are many HL components.

In the intra prediction mode of number 1 in which the predicted direction is the horizontal direction, the correlation of the residual information in the horizontal direction is strong. In other words, there are many high-frequency components of the residual information in the vertical direction. Accordingly, in the intra prediction mode of number 1, there are many cases where there are many LH components.

In the intra prediction modes of numbers 3 to 8 in which the predicted directions are oblique directions, the correlations of the residual information in the oblique directions are strong. In other words, there are many high-frequency components of the residual information in the oblique directions. Accordingly, in the intra prediction modes of numbers 3 to 8, there are many cases where there are many HH components.

Here, in order to allow 0's of the transform coefficients after quantization to be consecutive as a target for lossless encoding, it is necessary to set the transform coefficients of components after quantization as targets for lossless encoding in order from a transform coefficient of a component, of which the value after the DWT is estimated to be larger, to a transform coefficient of which the value after the DWT is estimated to be smaller.

Accordingly, in a case where the optimal prediction mode is the intra prediction mode having number 0, for example, the lossless encoding unit 66 sets the targets for lossless encoding in order of the LL component, the HL component, the HH component, and the LH component. In addition, in a case where the optimal prediction mode is the intra prediction mode of number 1, for example, the targets for lossless encoding are set in order of the LL component, the LH component, the HH component, and the HL component. Furthermore, in a case where the optimal prediction mode is any one of the intra prediction modes of numbers 3 to 8, for example, the targets for lossless encoding are set in order of the LL component, the HH component, the HL component, and the LH component. In addition, in a case where the optimal prediction mode is the intra prediction mode of number 2, components are set as targets for lossless encoding in a predetermined order set in advance.

Also within the LH component, the HL component, and the HH component, blocks are set as targets for lossless encoding in order from a block of which a value after the DWT is estimated to be larger to a block of which a value after the DWT is estimated to be smaller. More specifically, since the LH component has a strong correlation in the horizontal direction, blocks are set as targets for lossless encoding in order of the alignment in the horizontal direction within the LH component. In addition, since the HL component has a strong correlation in the vertical direction, blocks are set as targets for lossless encoding in order of the alignment in the vertical direction within the HL component. Further, since the HH component has a strong correlation in the oblique direction, blocks are set as targets for lossless encoding in order of the alignment in the oblique direction within the HH component.

Within the LL component, blocks are set as targets for lossless encoding in a predetermined order that is determined in advance. The order within the LL component may be different for each intra prediction mode.

[Description of Encoding Process of Image Encoding Device]

Figure 7:
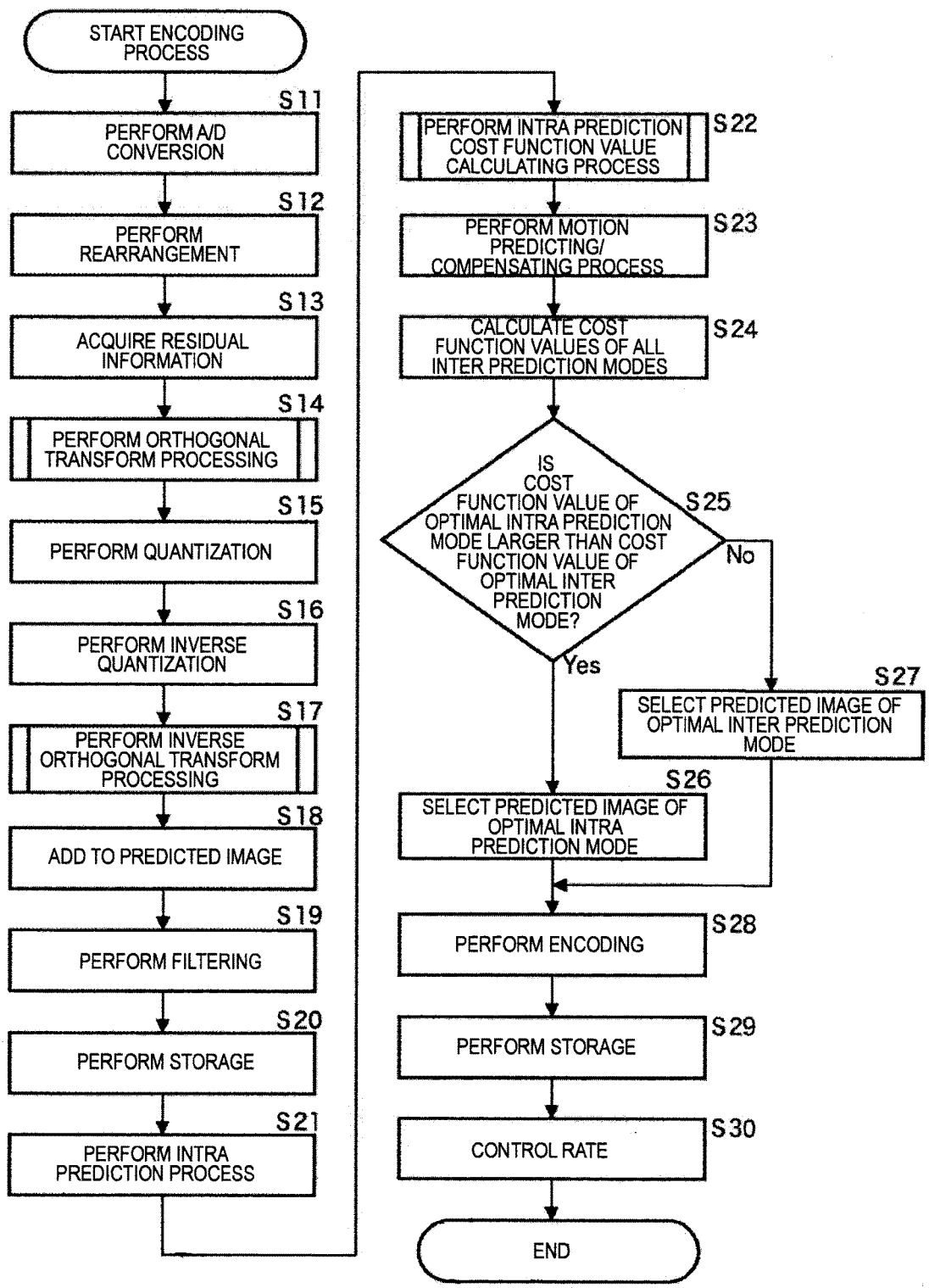
FIG. 7 is a flowchart that illustrates an encoding process of the image encoding device illustrated in FIG. 1.

FIG. 7 is a flowchart that illustrates an encoding process of the image encoding device 51 illustrated in FIG. 1.

In Step S11, the A/D conversion unit 61 performs A/D conversion of an input image that is in units of frames and supplies a resultant image to the screen rearranging buffer 62. In Step S12, the screen rearranging buffer 62 stores the image that is supplied from the A/D conversion unit 61, rearranges the images of frames stored in order of display in the order for encoding, and supplies a resultant image to the calculation unit 63.

In Step S13, the calculation unit 63 subtracts the predicted image supplied from the predicted image selecting unit 76 from the image read from the screen rearranging buffer 62 as is necessary, thereby acquiring residual information. Then, the calculation unit 63 outputs the residual information to the orthogonal transformation unit 64.

In Step S14, the orthogonal transformation unit 64 performs orthogonal transform processing for the residual information supplied from the calculation unit 63. More specifically, in a case where the inter prediction mode information is supplied from the predicted image selecting unit 76, the inter prediction orthogonal transformation unit 64A of the orthogonal transformation unit 64 performs orthogonal transform processing for the residual information supplied from the calculation unit 63 and supplies acquired resultant coefficients to the quantization unit 65 as transform coefficients.

In a case where the intra-prediction mode information is supplied from the predicted image selecting unit 76, the intra prediction orthogonal transformation unit 64B performs orthogonal transform processing for the residual information that is supplied from the calculation unit 63. The orthogonal transform processing will be described in detail with reference to FIG. 8 to be described below.

In Step S15, the quantization unit 65 quantizes the transform coefficients that are acquired as a result of the orthogonal transform processing. When the quantization is performed, the rate is controlled as will be described regarding the process of Step S30 to be described below.

The transform coefficients that are quantized as described above are locally decoded as below. In Step S16, the inverse quantization unit 68 performs inverse-quantization of the transform coefficients that are quantized by the quantization unit 65 in accordance with characteristics corresponding to the characteristics of the quantization unit 65. In Step S17, the inverse orthogonal transformation unit 69 performs inverse orthogonal transform processing that corresponds to the orthogonal transform processing performed by the orthogonal transformation unit 64 for the transform coefficients for which the inverse-quantization has been performed by using the inverse quantization unit 68.

More specifically, in a case where the inter prediction mode information is supplied from the predicted image selecting unit 76, the inter prediction inverse orthogonal transformation unit 69A of the inverse orthogonal transformation unit 69 performs inverse orthogonal transform processing for the transform coefficients that are supplied from the inverse quantization unit 68. The inter prediction inverse orthogonal transformation unit 69A supplies acquired resultant residual information to the calculation unit 70.

In addition, in a case where the intra prediction mode information is supplied from the predicted image selecting unit 76, the intra prediction inverse orthogonal transformation unit 69B performs inverse orthogonal transform processing for the transform coefficients that are supplied from the inverse quantization unit 68. The inverse orthogonal transform processing will be described in detail with reference to FIG. 9 to be described below.

In Step S18, the calculation unit 70 adds the residual information that is supplied from the inverse orthogonal transformation unit 69 to the predicted image that is supplied from the predicted image selecting unit 76, thereby generating an image that is locally decoded. Then, the calculation unit 70 supplies the locally-decoded image to the calculation unit 70 and the frame memory 72.

In Step S19, the deblocking filter 71 eliminates block distortion by filtering the image, which is locally decoded, supplied from the calculation unit 70. Then, the deblocking filter 71 supplies an acquired resultant image to the frame memory 72.

In Step S20, the frame memory 72 stores the image that is supplied from the deblocking filter 71 and the image, which is not filtered by the deblocking filter 71, supplied from the calculation unit 70.

In Step S21, the intra prediction unit 74 performs an intra prediction process. More particularly, the intra prediction unit 74 performs an intra prediction process of all the intra prediction modes that are candidates based on the image read from the screen rearranging buffer 62 and the reference image supplied from the frame memory 72 through the switch 73, thereby generating a predicted image.

In Step S22, the intra prediction unit 74 performs an intra prediction cost function value calculating process for calculating cost function values of all the intra prediction modes that are candidates. The intra prediction cost function value calculating process will be described in detail with reference to FIG. 10 to be described below.

In Step S23, the motion predicting/compensating unit 75 performs a motion predicting/compensating process. More specifically, the motion predicting/compensating unit 75 predicts the motions of all the inter prediction modes that are candidates based on the image supplied from the screen rearranging buffer 62 and the reference image supplied through the switch 73, thereby generating a motion vector. Then, the motion predicting/compensating unit 75 performs a compensation process for the reference image based on the motion vector, thereby generating a predicted image.

In Step S24, the motion predicting/compensating unit 75 calculates the cost function values of all the inter prediction modes that are candidates and determines an inter prediction mode of which the cost function value is a minimum as an optimal inter prediction mode. Then, the motion predicting/compensating unit 75 supplies the inter prediction mode information, the predicted image generated in the optimal inter prediction mode, and the corresponding cost function value to the predicted image selecting unit 76.

In Step S25, the predicted image selecting unit 76 determines whether the cost function value of the optimal intra prediction mode that is supplied from the intra prediction unit 74 is larger than the cost function value of the optimal inter prediction mode that is supplied from the motion predicting/compensating unit 75.

In a case where the cost function value of the optimal intra prediction mode is determined to be larger than the cost function value of the optimal inter prediction mode in Step S25, the process proceeds to Step S26. In Step S26, the predicted image selecting unit 76 determines the optimal intra prediction mode as an optimal prediction mode and selects a predicted image of the optimal intra prediction mode. Then, the predicted image selecting unit 76 supplies the predicted image of the optimal intra prediction mode to the calculation unit 63 and the calculation unit 70. This predicted image is used in the processes of Steps S13 and S18 described above. In addition, the predicted image selecting unit 76 supplies the intra prediction mode information to the orthogonal transformation unit 64 and the inverse orthogonal transformation unit 69 and notifies the intra prediction unit 74 of the selection of the predicted image of the optimal intra prediction mode. The intra prediction unit 74 supplies the intra prediction mode information to the lossless encoding unit 66 in accordance with the notification. Then, the process proceeds to Step S28.

On the other hand, in a case where the cost function value of the optimal intra prediction mode is determined not to be larger than the cost function value of the optimal inter prediction mode in Step S25, the process proceeds to Step S27. In Step S27, the predicted image selecting unit 76 determines the optimal inter prediction mode as an optimal prediction mode and selects a predicted image of the optimal inter prediction mode. Then, the predicted image selecting unit 76 supplies the predicted image of the optimal inter prediction mode to the calculation unit 63 and the calculation unit 70. This predicted image is used in the processes of Steps S13 and S18 described above. In addition, the predicted image selecting unit 76 supplies the inter prediction mode information to the orthogonal transformation unit 64 and the inverse orthogonal transformation unit 69 and notifies the motion predicting/compensating unit 75 of the selection of the predicted image of the inter prediction mode. The motion predicting/compensating unit 75 supplies the inter prediction mode information, information of the corresponding motion vector, and the like to the lossless encoding unit 66 in accordance with the notification. Then, the process proceeds to Step S28.

In Step S28, the lossless encoding unit 66 performs lossless encoding of the quantized transform coefficients that are supplied from the quantization unit 65, thereby acquiring a compressed image. In a case where the optimal prediction mode of the transform coefficient that is a target for lossless encoding is the optimal intra prediction mode, lossless encoding is performed in the sequence according to the optimal intra prediction mode as described with reference to FIG. 6. In addition, the lossless encoding unit 66 performs lossless encoding of the intra prediction mode information, the inter prediction mode information, the motion vector, and the like and sets acquired resultant information as header information added to the compressed image. The lossless encoding unit 66 supplies the compressed image to which the header information acquired as a result of the lossless encoding is added to the storage buffer 67 as compressed information.

In Step S29, the storage buffer 67 stores the compressed information that is supplied from the lossless encoding unit 66. The compressed information that is stored in the storage buffer 67 is appropriately read and is transmitted to the decoding side through transmission lines.

In Step S30, the rate control unit 77 performs control of the rate of the quantization operation of the quantization unit 65 based on the compressed information stored in the storage buffer 67 such that overflow or underflow does not occur.

Figure 8:
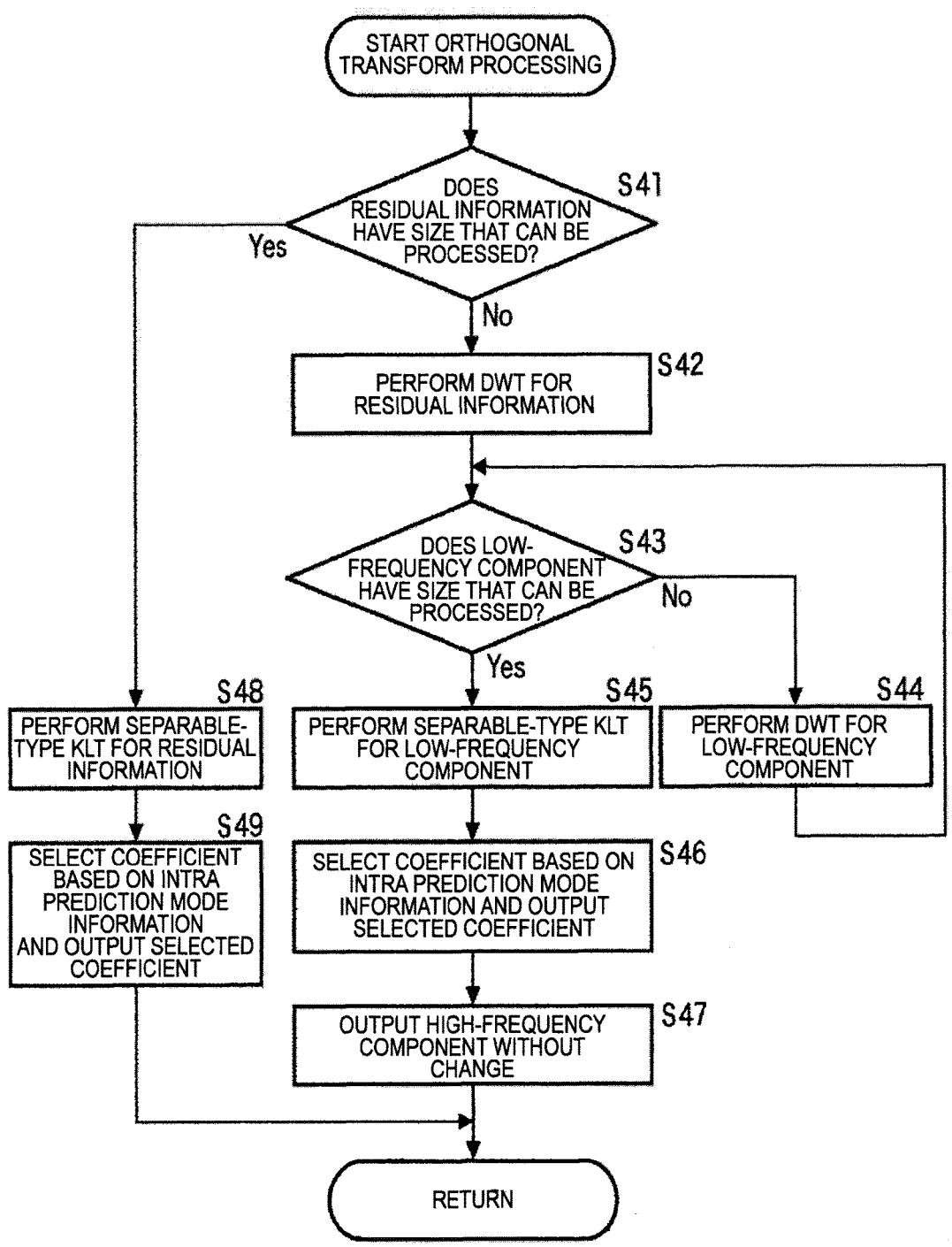
FIG. 8 is a flowchart that illustrates orthogonal transform processing.

FIG. 8 is a flowchart that illustrates orthogonal transform processing that is performed by the intra prediction orthogonal transformation unit 64B in Step S14 illustrated in FIG. 7.

In Step S41, the DWT unit 91 (FIG. 3) of the intra prediction orthogonal transformation unit 64B determines whether or not the size of the residual information supplied from the calculation unit 63 (FIG. 1) is a size that can be processed by the KLT units 92-0 to 92-8.

In a case where the size of the residual information is determined not to be a size that can be processed by the KLT units 92-0 to 92-8 in Step S41, the DWT unit 91 performs a DWT for the residual information in Step S42.

In Step S43, the DWT unit 91 determines whether or not the size of a low-frequency component acquired as a result of the process of Step S42 is a size that can be processed by the KLT units 92-0 to 92-8. In a case where the size of the low-frequency component acquired as the result of the DWT is determined not to be a size that can be processed by the KLT units 92-0 to 92-8 in Step S43, the DWT unit 91 performs a DWT in Step S44 for the low-frequency component acquired as the result of the processes of Step S42. Then, the process is returned to Step S43, and the process of Steps S43 and S44 is repeated until the size of the low-frequency component becomes a size that can be processed by the KLT units 92-0 to 92-8.

In a case where the size of the low-frequency component acquired as the result of the DWT is determined to be a size that can be processed by the KLT units 92-0 to 92-8 in Step S43, the DWT unit 91 supplies the low-frequency component acquired as the result of the DWT to the KLT units 92-0 to 92-8 and supplies a high-frequency component to the selector 93.

Then, in Step S45, the KLT units 92-0 to 92-8 perform separable-type KLTs for the low-frequency component by using bases of the KLTs of the corresponding intra prediction modes.

In Step S46, the selector 93 selects a coefficient supplied from one of the KLT units 92-0 to 92-8 that corresponds to the optimal intra prediction mode out of the coefficients supplied from the KLT units 92-0 to 92-8 based on the intra prediction mode information and outputs the selected coefficient to the quantization unit 65 (FIG. 1).

In Step S47, the selector 93 outputs the high-frequency component supplied from the DWT unit 91 to the quantization unit 65.

On the other hand, in a case where the size of the residual information is determined to be a size that can be processed by the KLT units 92-0 to 92-8 in Step S41, the DWT unit 91 supplies the residual information to the KLT units 92-0 to 92-8 without change. Then, in Step S48, the KLT units 92-0 to 92-8 perform separable-type KLTs for the residual information by using the bases of the KLTs of the corresponding intra prediction modes.

In Step S49, the selector 93 selects a coefficient that is supplied from one of the KLT units 92-0 to 92-8 that corresponds to the optimal intra prediction mode out of the coefficients supplied from the KLT units 92-0 to 92-8 based on the intra prediction mode information and outputs the selected coefficient to the quantization unit 65.

Figure 9:
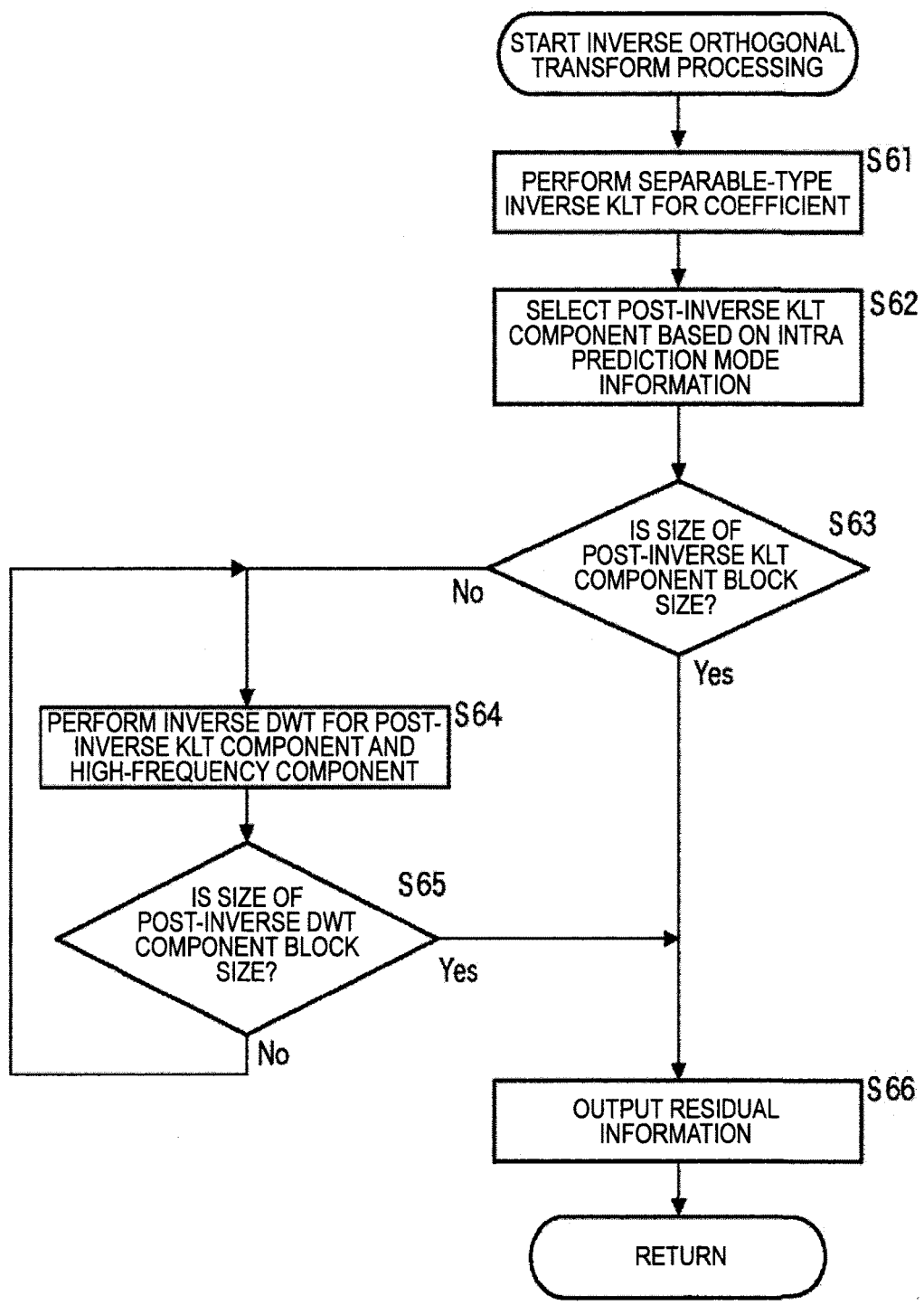
FIG. 9 is a flowchart that illustrates inverse orthogonal transform processing.

FIG. 9 is a flowchart that illustrates inverse orthogonal transform processing performed by the intra prediction inverse orthogonal transformation unit 69B of Step S17 illustrated in FIG. 7.

In Step S61, the inverse KLT units 101-0 to 101-8 (FIG. 5) of the intra prediction inverse orthogonal transformation unit 69B perform separable-type KLTs for the coefficients included in the transform coefficients supplied from the inverse quantization unit 68 (FIG. 1) by using the bases of the KLTs of the corresponding intra prediction modes.

In Step S62, the selector 102 selects a post-inverse KLT component supplied from one of the inverse KLT units 101-0 to 101-8 that corresponds to the optimal intra prediction mode out of the post-inverse KLT components supplied from the inverse KLT units 101-0 to 101-8 based on the intra prediction mode information supplied from the predicted image selecting unit 76. Then, the selector 102 supplies the selected post-inverse KLT component to the inverse DWT unit 103.

In Step S63, the inverse DWT unit 103 determines whether or not the size of the post-inverse KLT component supplied from the selector 102 is the block size. In a case where the size of the post-inverse KLT component is determined not to be the block size in Step S63, the process proceeds to Step S64. In Step S64, the inverse DWT unit 103 performs an inverse DWT for high-frequency components of the post-inverse KLT component and the transform coefficients supplied from the inverse quantization unit 68.

In Step S65, the inverse DWT unit 103 determines whether or not the size of the post-inverse DWT component that is acquired by as a result of the process of Step S64 is the block size. In a case where the size of the post-inverse DWT component is determined not to be the block size in Step S65, the process is returned to Step S64, and the processes of Steps S64 and S65 are repeated until the size of the post-inverse DWT component becomes the block size.

In a case where the size of the post-inverse DWT component is determined to be the block size in Step S65, the process proceeds to Step S66.

On the other hand, in a case where the size of the post-inverse KLT component is determined to be the block size in Step S63, the process proceeds to Step S66.

In Step S66, the inverse DWT unit 103 supplies the post-inverse DWT component or the post inverse KLT component to the calculation unit 70 (FIG. 1) as the residual information.

Figure 10:
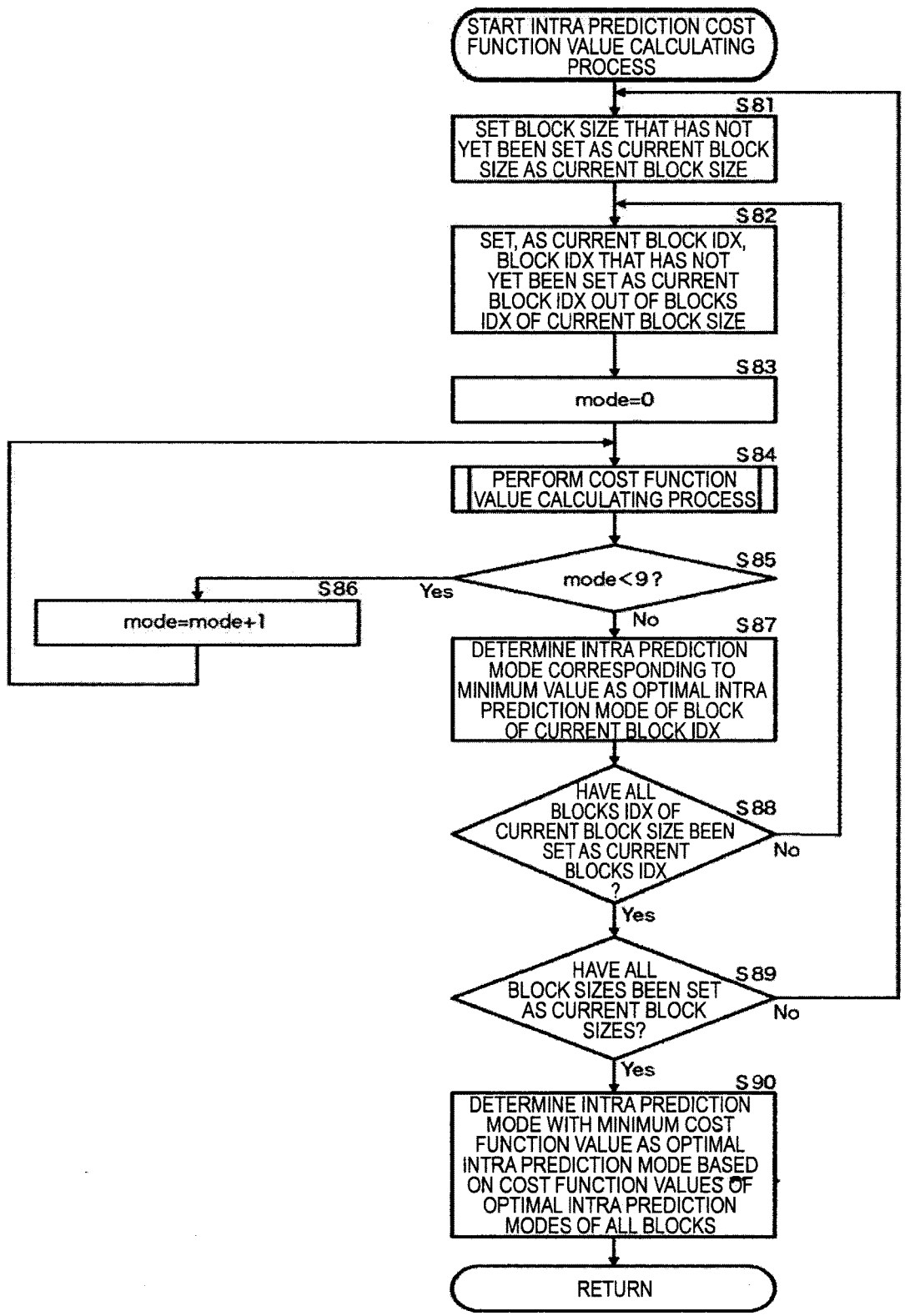
FIG. 10 is a flowchart that illustrates an intra-prediction cost function value calculating process.

FIG. 10 is a flowchart that illustrates an intra-prediction cost function value calculating process of Step S22 illustrated in FIG. 7.

In Step S81, the intra prediction unit 74 sets a block sizes that has not been yet set as a block size (hereinafter, referred to as a current block size) of a block that is a processing target and is a candidate as a current block size. Here, the block sizes that are candidates are 4×4 pixels and 8×8 pixels.

In Step S82, the intra prediction unit 74 sets a block IDX that is not set as a block IDX (hereinafter, referred to as a current block IDX) of a processing target block out of blocks IDX of a current block size as a current block IDX. Here, the block IDX is information that specifies each block when a macro block is divided into blocks in accordance with a block size. For example, in a case where the macro block has a size of 128×128, and the block size is 8×8, there are 16 blocks IDX of 0 to 15.

In Step S83, the intra prediction unit 74 sets the number mode of the intra prediction mode to "0".

In Step S84, the intra prediction unit 74 performs a cost function value calculating process for calculating a cost function value of the intra prediction mode of the number mode. This cost function calculating process will be described in detail with reference to FIG. 11 to be described below.

In Step S85, the intra prediction unit 74 determines whether or not the number mode is less than the number "9" of the intra prediction modes that are candidates. In a case where the number mode is determined to be less than "9" in Step S85, in other words, in a case where the cost function values of all the intra prediction modes of the block of the current block IDX have not been calculated yet, the process proceeds to Step S86.

In Step S86, the intra prediction unit 74 increments the number mode by one, returns the process to Step S84, and repeats the processes of Steps S84 to S86 until the number mode becomes "9" or more.

In a case where the number mode is determined not to be less than "9" in Step S85, in other words, in a case where the cost function values of all the intra prediction modes of the block of the current block IDX are calculated, the process proceeds to Step S87. In Step S87, the intra prediction unit 74 determines an intra prediction mode that corresponds to a minimal value out of the cost function values of all the intra prediction modes of the block of the current block IDX as an optimal intra prediction mode of the block of the current block IDX.

In Step S88, the intra prediction unit 74 determines whether or not all the blocks IDX of the current block size have been set as current blocks IDX. In a case where all the blocks IDX of the current block size are determined not to have been set as the current blocks IDX in Step S88, the process is returned to Step S82. Then, until all the blocks IDX of the current block size are set as the current blocks IDX, the process of Steps S82 to S88 is repeated.

On the other hand, in a case where all the blocks IDX of the current block size are determined to have been set as the current blocks IDX in Step S88, the intra prediction unit 74 determines whether or not all the block sizes are set as the current block sizes in Step S89.

In a case where all the block sizes are determined not to have been yet set as the current block sizes in Step S89, the process is returned to Step S81, and the process of Steps S81 to S89 is repeated until all the block sizes are set as the current block sizes.

On the other hand, in a case where all the block sizes are determined to have been set as the current block sizes in Step S89, in other words, in a case where the optimal intra prediction modes of all the blocks of all the blocks of all the block sizes are determined, the process proceeds to Step S90.

In Step S90, the intra prediction unit 74 determines an intra prediction mode of which the cost function value is a minimum in units of macro blocks as a final optimal intra prediction mode based on the cost function values of the optimal intra prediction modes of all the blocks of all the block sizes. Then, the intra prediction unit 74 supplies intra prediction mode information that represents the optimal intra prediction mode, a predicted image that is generated in the optimal prediction mode, and a corresponding cost function value to the predicted image selecting unit 76. Then, the process is returned to Step S22 illustrated in FIG. 7 and proceeds to Step S23.

Figure 11:
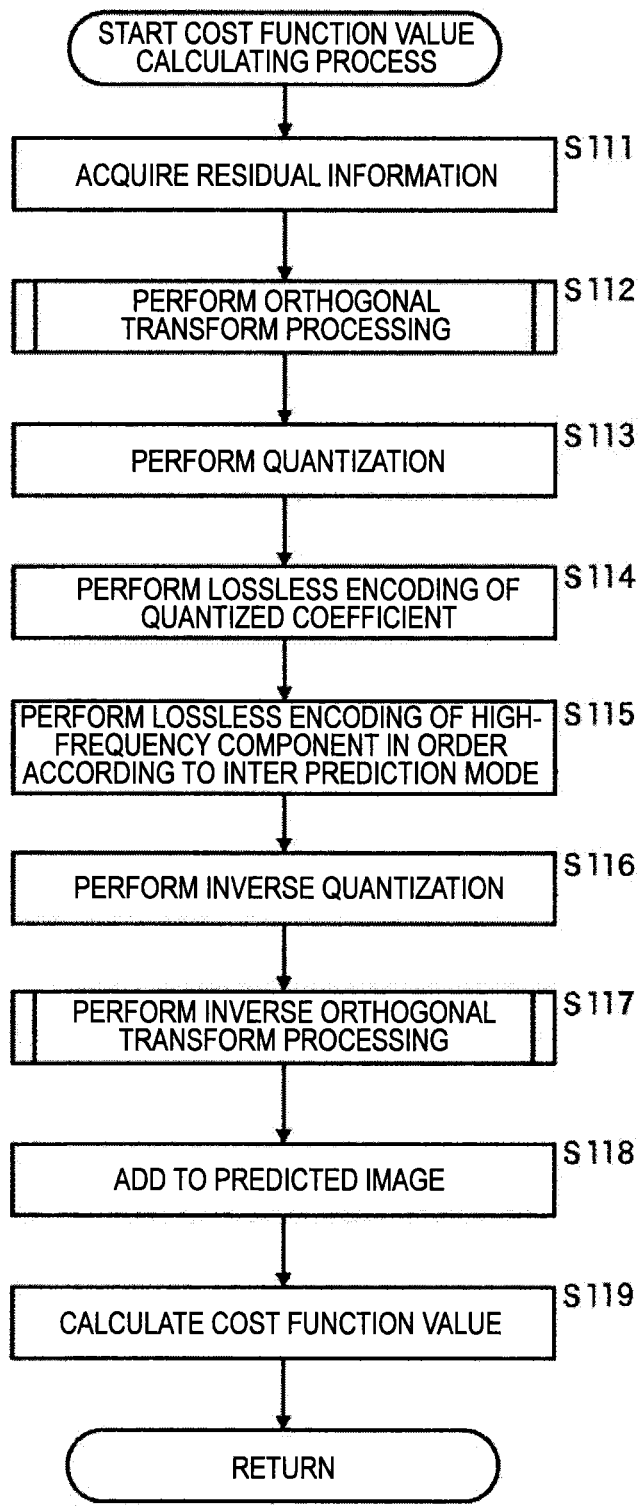
FIG. 11 is a flowchart that illustrates a cost function value calculating process.

FIG. 11 is a flowchart that illustrates the cost function value calculating process of Step S84 illustrated in FIG. 10.

In Step S111, the intra prediction unit 74 subtracts a predicted image of an intra prediction mode of a number mode that corresponds to the current block IDX from an image corresponding to the current block IDX that is supplied from the screen rearranging buffer 62, thereby acquiring residual information.

In Step S112, the intra prediction unit 74 performs the orthogonal transform processing illustrated in FIG. 8 for the residual information.

In Step S113, the intra prediction unit 74 quantizes transform coefficients that are acquired as a result of the orthogonal transform processing.

In Step S114, the intra prediction unit 74 performs lossless encoding of coefficients of the quantized transform coefficients in a predetermined order.

In Step S115, the intra prediction unit 74 performs lossless encoding of high-frequency components (for example, an LH component, an HL component, and an HH component) of the quantized transform coefficients in the order according to the intra prediction modes of the number modes. In addition, in a case where a DWT is not performed in the orthogonal transform processing of Step S112, the process of Step S115 is not provided.

In Step S116, the intra prediction unit 74 performs inverse quantization of the quantized transform coefficients that are acquired in the process of Step S113.

In Step S117, the intra prediction unit 74 performs inverse orthogonal transforming illustrated in FIG. 9 for the transform coefficients for which inverse quantization has been performed in Step S116.

In Step S118, the intra prediction unit 74 adds residual information that is acquired as a result of the process of Step S117 and the predicted image of the intra prediction mode of the number mode that corresponds to the current block IDX together.

In Step S119, the intra prediction unit 74 calculates a cost function value using Equation (1) described above by using the decoded image that is acquired as a result of the process of Step S118, the image supplied from the screen rearranging buffer 62, and the amount of generated codes in the process of Step S115. This cost function value is a cost function value of the intra prediction mode of the number mode of the block of the current block IDX.

As above, in the image encoding device 51, the intra prediction orthogonal transformation unit 64B performs a DWT of which the amount of calculation is less than that of a discrete type KLT before a discrete type KLT and performs the discrete-type KLT only for low-frequency components that are acquired as a result of the DWT. As a result, the amount of calculation in the orthogonal transform processing at the time of performing intra prediction is reduced, and the amount of calculation can be reduced even in a case where the block size is large. In addition, at the time of performing the inverse orthogonal transform processing, a discrete-type inverse KLT is performed only for low-frequency components, and an inverse DWT of which the amount of calculation is less than that of an inverse KLT is performed, whereby the amount of calculation of the inverse orthogonal transform processing can be similarly reduced.

In the current AVC mode, although a maximum block size of the intra prediction is 16×16, there is a high possibility that a block size exceeding 16×16 is employed in a next-generation standard. Accordingly, it is very useful to reduce the amount of calculation in the orthogonal transform processing at the time of performing an intra prediction. Since the amount of calculation in the orthogonal transform processing is reduced, in a case where the intra prediction orthogonal transformation unit 64B is realized by hardware, the circuit scale of the LSI is reduced, whereby the manufacturing cost can be reduced. In addition, in a case where the intra prediction orthogonal transformation unit 64B is realized by software, the amount of processing is reduced, whereby reproduction of an image in real time can be performed more reliably.

[Configuration Example of Image Decoding Device]

Figure 12:
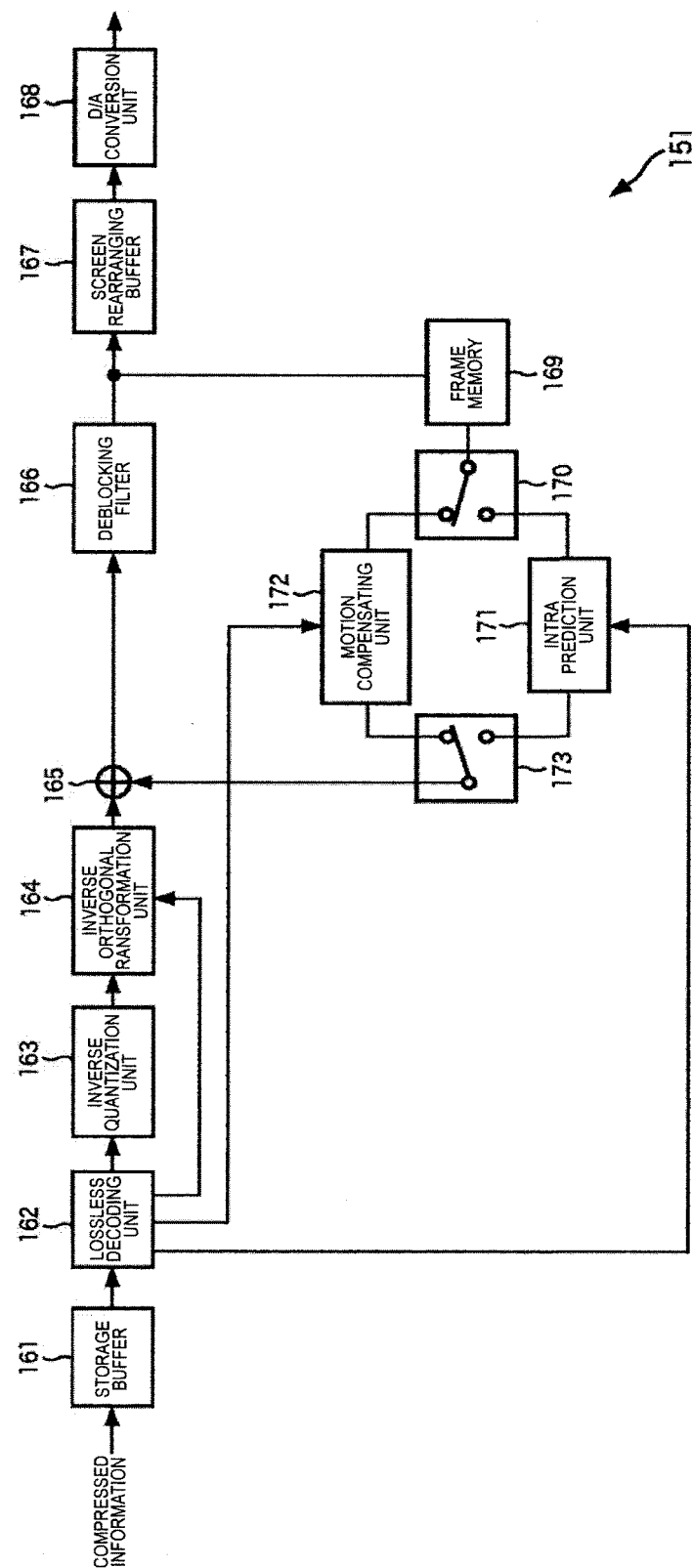
FIG. 12 is a block diagram that illustrates a configuration example of an image decoding device according to the first embodiment of the present technology.

FIG. 12 is a block diagram that illustrates a configuration example of an image decoding device according to the first embodiment of the present technology.

The image decoding device 151 is configured by a storage buffer 161, a lossless decoding unit 162, an inverse quantization unit 163, an inverse orthogonal transformation unit 164, a calculation unit 165, a deblocking filter 166, a screen rearranging buffer 167, a D/A conversion unit 168, a frame memory 169, a switch 170, an intra prediction unit 171, a motion compensating unit 172, and a switch 173.

The storage buffer 161 stores compressed information that is transmitted from the image encoding device 51. The lossless decoding unit 162 (decoding unit) reads and acquires the compressed information from the storage buffer 161 and performs lossless decoding of the compressed information using a mode that corresponds to the lossless encoding mode of the lossless encoding unit 66 that is illustrated in FIG. 1.

More specifically, the lossless decoding unit 162 performs lossless decoding of the header information included in the compressed information, thereby acquiring intra prediction mode information, inter prediction mode information, motion vector information, and the like. In addition, the lossless decoding unit 162 performs lossless decoding of a compressed image included in the compressed information. In a case where the intra prediction mode information is acquired, the lossless decoding unit 162 performs lossless decoding of the compressed image in the order according to an optimal intra prediction mode that is represented by the intra prediction mode information.

In addition, the lossless decoding unit 162 supplies quantized transform coefficients that are acquired as a result of performing lossless decoding of the compressed image to the inverse quantization unit 163. The lossless decoding unit 162 supplies the intra prediction mode information that is acquired as a result of performing the lossless decoding to the inverse orthogonal transformation unit 164 and the intra prediction unit 171 and supplies the inter prediction mode information, the motion vector information, and the like to the motion compensating unit 172. Furthermore, the lossless decoding unit 162 supplies the inter prediction mode information to the inverse orthogonal transformation unit 164.

The inverse quantization unit 163 is configured similarly to the inverse quantization unit 68 illustrated in FIG. 1 and performs inverse quantization for quantized transform coefficients that are supplied from the lossless decoding unit 16 using a mode that corresponds to the quantization mode of the inverse quantization unit 65 illustrated in FIG. 1. The inverse quantization unit 163 supplies transform coefficients that are acquired as a result of the inverse quantization to the inverse orthogonal transformation unit 164.

The inverse orthogonal transformation unit 164 is configured similarly to the inverse orthogonal transformation unit 69 illustrated in FIG. 1. The inverse orthogonal transformation unit 164 performs inverse orthogonal transform processing for the transform coefficients that are supplied from the inverse quantization unit 163 in accordance with the inter prediction mode information or the intra prediction mode information that is supplied from the lossless decoding unit 162. The inverse orthogonal transformation unit 164 supplies residual information that is acquired as a result of the orthogonal transform processing to the calculation unit 165.

The calculation unit 165 adds the residual information supplied from the inverse orthogonal transformation unit 164 to the predicted image supplied from the switch 173 as is needed and decodes the image. The calculation unit 165 supplies the decoded image to the deblocking filter 166.

The deblocking filter 166 filters the decoded signal that is supplied from the calculation unit 165, thereby eliminating block distortion. The deblocking filter 166 supplies an acquired resultant image to the frame memory 169 for storage and outputs the resultant image to the screen rearranging buffer 167.

The screen rearranging buffer 167 arranges images supplied from the deblocking filter 166. More specifically, the order of images that are arranged in order for encoding by the screen rearranging buffer 62 illustrated in FIG. 1 is arranged in the order of the original display. The D/A conversion unit 168 performs D/A conversion of the images arranged by the screen rearranging buffer 167 and outputs resultant images to a display not illustrated in the diagram for a display.

The switch 170 reads an image that is stored in the frame memory 169 as a reference image, outputs the read image to the motion compensating unit 172, and supplies the read image to the intra prediction unit 171.

The intra prediction unit 171 performs an intra prediction process of an optimal intra prediction mode that is represented by the intra prediction mode information based on the intra prediction mode information that is supplied from the lossless decoding unit 162, thereby generating a predicted image. The intra prediction unit 171 outputs the predicted image to the switch 173.

The motion compensating unit 172 performs a motion compensating process for the reference image that is supplied through the switch 170 based on the inter prediction mode information, the motion vector information, and the like that are supplied from the lossless decoding unit 162, thereby generating a predicted image. The motion compensating unit 172 supplies the predicted image to the switch 173.

The switch 173 selects the predicted image that is generated by the motion compensating unit 172 or the intra prediction unit 171 and supplies the selected image to the calculation unit 165.

[Description of Process of Image Decoding Device]

Figure 13:
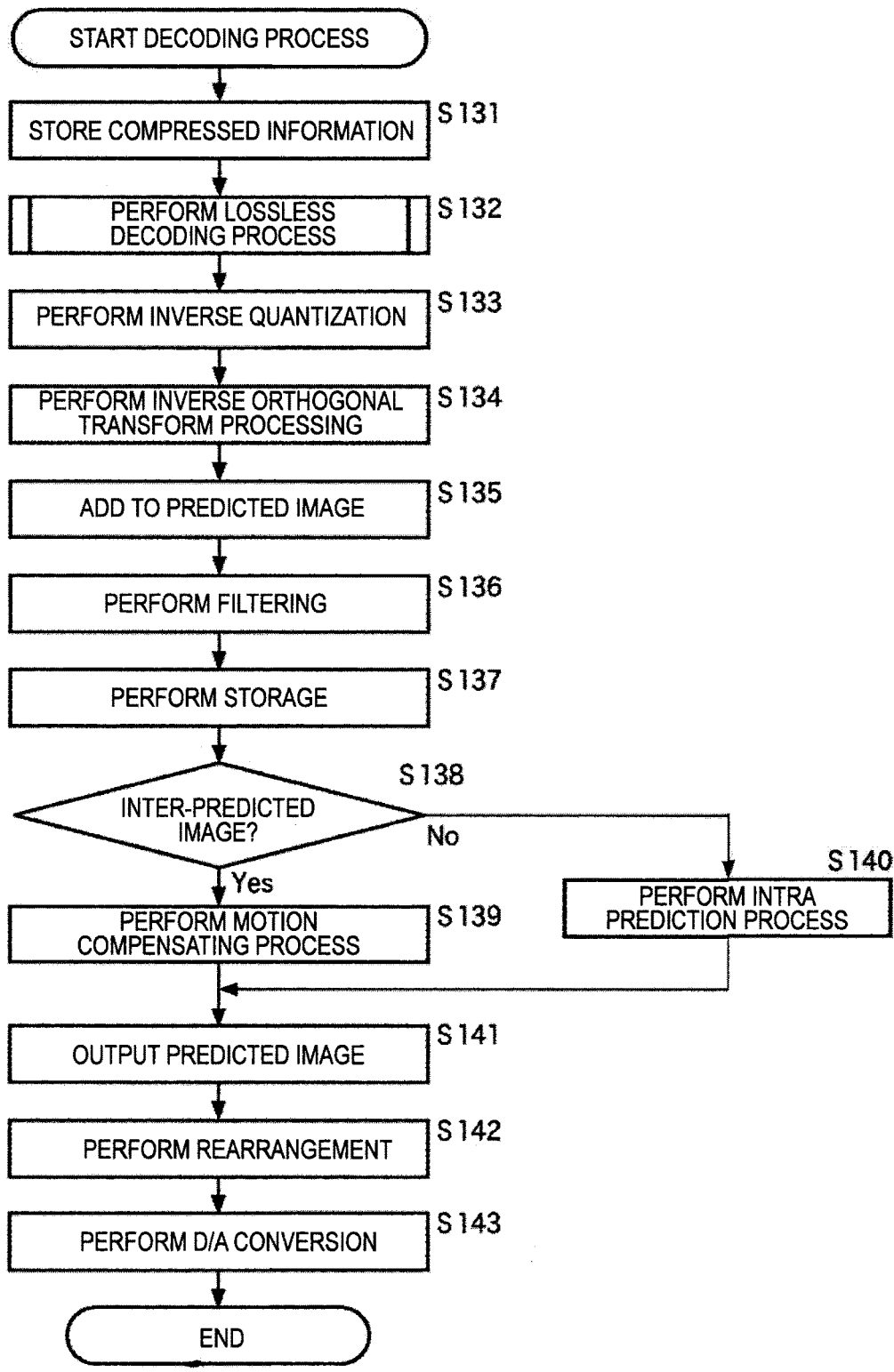
FIG. 13 is a flowchart that illustrates a decoding process performed by the image decoding device.

FIG. 13 is a flowchart that illustrates a decoding process performed by the image decoding device 151.

In Step S131, the storage buffer 161 stores compressed information that is transmitted from the image encoding device 51. In Step S132, the lossless decoding unit 162 reads the compressed information from the storage buffer 161 and performs a lossless decoding process for the compressed information. The lossless decoding process performed in a case where the intra prediction mode information is acquired will be described in detail with reference to FIG. 14 to be described below.

In addition, the lossless decoding unit 162 supplies quantized transform coefficients that are acquired as a result of the lossless decoding process to the inverse quantization unit 163. The lossless decoding unit 162 supplies intra prediction mode information that is acquired as a result of the lossless decoding process to the inverse orthogonal transformation unit 164 and the intra prediction unit 171 and supplies the inter prediction mode information, the motion vector information, and the like to the motion compensating unit 172. In addition, the lossless decoding unit 162 supplies the inter prediction mode information to the inverse orthogonal transformation unit 164.

In Step S133, the inverse quantization unit 163 performs inverse quantization of the quantized transform coefficients that are supplied from the lossless decoding unit 162 so as to have characteristics that correspond to the characteristics of the quantization unit 65 illustrated in FIG. 1. The inverse quantization unit 163 supplies the transform coefficients that are acquired as a result of the inverse quantization to the inverse orthogonal transformation unit 164.

In Step S134, the inverse orthogonal transformation unit 164 performs inverse orthogonal transform processing, which is similar to the inverse orthogonal transform processing of Step S17 illustrated in FIG. 7, of the transform coefficients that are supplied from the inverse quantization unit 163. The inverse orthogonal transformation unit 164 supplies residual information that is acquired as a result of the inverse orthogonal transform processing to the calculation unit 165.

In Step S135, the calculation unit 165 adds the predicted image that is input by the process of Step S141 to be described below and the residual information that is supplied from the inverse orthogonal transformation unit 164 together as is needed and decodes the image. The calculation unit 165 supplies the decoded image to the deblocking filter 166.

In Step S136, the deblocking filter 166 filters the decoded image that is supplied from the calculation unit 165, thereby eliminating block distortion. The deblocking filter 166 supplies an acquired resultant image to the frame memory 169 and the screen rearranging buffer 167.

In Step S137, the frame memory 169 stores the image that is supplied from the deblocking filter 166.

In Step S138, the lossless decoding unit 162 determines whether or not the compressed image included in the compressed information is an inter-predicted image, in other words, whether or not the inter prediction mode information has been acquired.

In a case where it is determined that the compressed image included in the compressed information is an inter-predicted image in Step S138, the lossless decoding unit 162 supplies the inter prediction mode information, the motion vector, and the like to the motion compensating unit 172.

Then, in Step S139, the motion compensating unit 172 performs a motion compensating process for the reference image supplied through the switch 170 based on the inter prediction mode information, the motion vector information, and the like supplied from the lossless decoding unit 162, thereby generating a predicted image. The motion compensating unit 172 supplies the predicted image to the switch 173.

On the other hand, in Step S138, in a case where it is determined that the compressed image included in the compressed information is not an inter-predicted image, in other words, in a case where it is determined that intra prediction mode information has been acquired, the lossless decoding unit 162 supplies the intra prediction mode information to the intra prediction unit 171.

Then, in Step S140, the intra prediction unit 171 performs an intra prediction process of an optimal intra prediction mode that is represented by the intra prediction mode information based on the intra prediction mode information that is supplied from the lossless decoding unit 162, thereby generating a predicted image. The intra prediction unit 171 outputs the predicted image to the switch 173.

In Step S141, the switch 173 selects the predicted image that is supplied from the motion compensating unit 172 or the intra prediction unit 171 and outputs the selected image to the calculation unit 165. This predicted image, as described above, is added to the output of the inverse orthogonal transformation unit 164 in Step S135.

In Step S142, the screen rearranging buffer 167 arranges images supplied from the deblocking filter 166.

In Step S143, the D/A conversion unit 168 performs D/A conversion of the images arranged by the screen rearranging buffer 167 and outputs resultant images to a display not illustrated in the diagram for a display.

Figure 14:
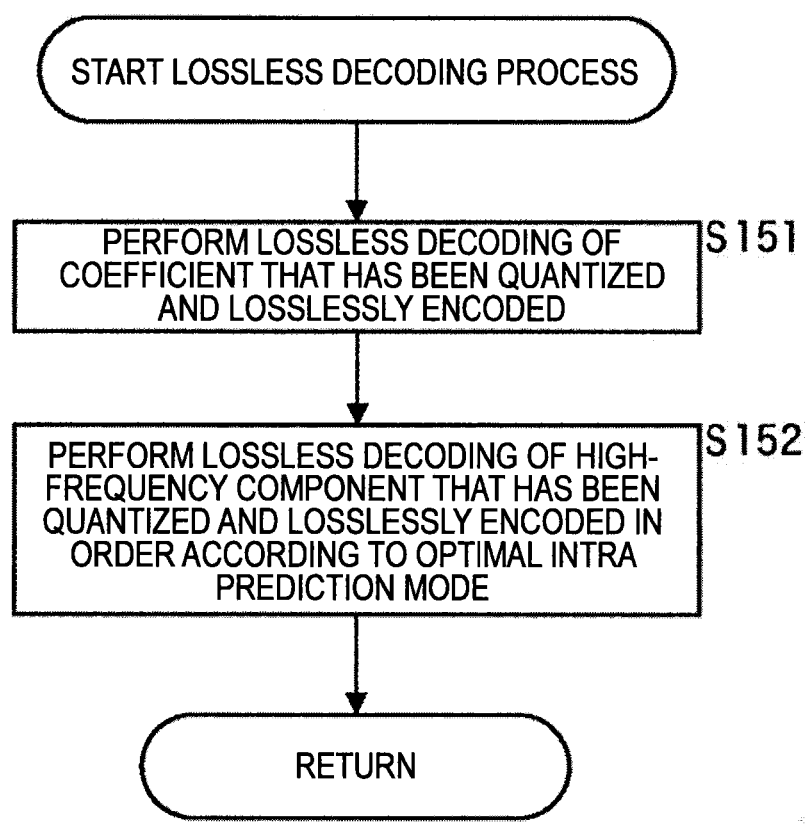
FIG. 14 is a flowchart that illustrates a lossless decoding process.

FIG. 14 is a flowchart that illustrates a lossless decoding process in a case where intra prediction mode information is acquired in Step S132 illustrated in FIG. 13.

In Step S151, the lossless decoding unit 162 performs lossless decoding of coefficients, which are quantized and are losslessly encoded, included in the compressed information that is supplied from the storage buffer 161 and supplies the coefficients to the inverse quantization unit 163.

In Step S152, the lossless decoding unit 162 performs lossless decoding of high-frequency components, which are quantized and losslessly encoded, included in the compressed information in the order according to an optimal intra prediction mode that is represented by the intra prediction information and supplies decoded high-frequency components to the inverse quantization unit 163. In a case where a high-frequency component is not included in the compressed information, the process of Step S152 is not provided.

As above, the image decoding device 151 decodes the compressed information that is acquired from the encoding device 51, and, by performing a discrete-type inverse KLT only for low-frequency components and performing an inverse DWT of which the amount of calculation is less than that of an inverse KLT, the inverse orthogonal transform processing can be performed. As a result, the amount of calculation performed in the inverse orthogonal transform processing is reduced, and accordingly, the amount of calculation can be reduced even in a case where the block size is large.

Second Embodiment

Configuration Example of Image Encoding Device

Figure 15:
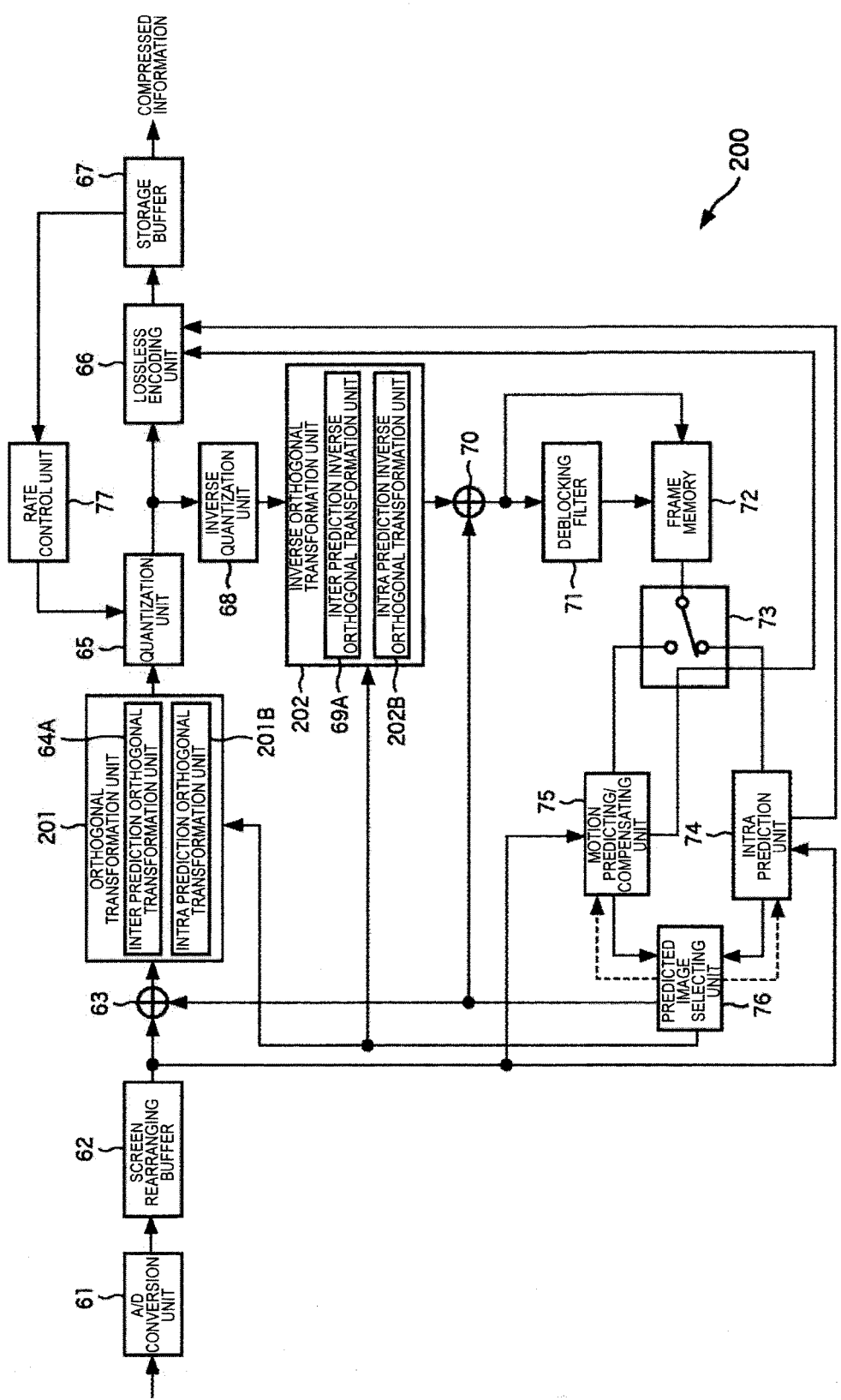
FIG. 15 is a block diagram that illustrates a configuration example of an image encoding device according to a second embodiment of the present technology.

FIG. 15 is a block diagram that illustrates a configuration example of an image encoding device according to a second embodiment of the present technology.

In the configuration illustrated in FIG. 15, a same reference sign is assigned to the same configuration as that illustrated in FIG. 1. Duplicate description will not be presented as is appropriate.

The configuration of the image encoding device 200 illustrated in FIG. 15 is mainly different from that illustrated in FIG. 1 that an orthogonal transformation unit 201 is disposed instead of the orthogonal transformation unit 64, and an inverse orthogonal transformation unit 202 is disposed instead of the inverse orthogonal transformation unit 69. In the intra prediction orthogonal transform processing, the image encoding device 200 does not perform a separable-type KLT in all the intra prediction modes but performs a separable-type KLT in intra prediction modes of which the predicted directions are other than the oblique directions and performs a non-separable type KLT in intra prediction modes of which the predicted directions are other than the oblique directions.

More specifically, the orthogonal transformation unit 201 is configured by an inter prediction orthogonal transformation unit 64A and an intra prediction orthogonal transformation unit 201B. In a case where intra prediction mode information is supplied from a predicted image selecting unit 76, the intra prediction orthogonal transformation unit 201B performs orthogonal transform processing on residual information supplied from a calculation unit 63. More specifically, the intra prediction orthogonal transformation unit 201B extracts a high-frequency component and a low-frequency component by performing a DWT on the residual information. In addition, the intra prediction orthogonal transformation unit 201B may change the number of DWTs to be performed based on whether a predicted direction of the intra prediction mode is an oblique direction or a direction other than the oblique direction.

In a case where the predicted direction of the intra prediction mode is the oblique direction, the intra prediction orthogonal transformation unit 201B performs a non-separable type KLT of each intra prediction mode information on the low-frequency component. On the other hand, in a case where the predicted direction of the intra prediction mode is a direction other than the oblique direction, the intra prediction orthogonal transformation unit 201B performs a separable-type KLT of each intra prediction mode information on the low-frequency component. The intra prediction orthogonal transformation unit 201B supplies coefficients that are acquired as a result of the KLT of an optimal intra prediction mode that is represented by the intra prediction mode information and the high-frequency component to the quantization unit 65 as transform coefficients.

The inverse orthogonal transformation unit 202 is configured by an inter prediction inverse orthogonal transformation unit 69A and an intra prediction inverse orthogonal transformation unit 202B. In a case where the intra prediction mode information is supplied from the predicted image selecting unit 76, the intra prediction inverse orthogonal transformation unit 202B performs inverse orthogonal transform processing on transform coefficients that are supplied from the inverse quantization unit 68. More specifically, in a case where the predicted direction of the intra prediction mode is the oblique direction, the intra prediction inverse orthogonal transformation unit 202B performs a non-separable type inverse KLT of each intra prediction mode on coefficients of the low-frequency component out of the transform coefficients. On the other hand, in a case where the predicted direction of the intra prediction mode is a direction other than the oblique direction, the intra prediction inverse orthogonal transformation unit 202B performs a separable-type inverse KLT of each intra prediction mode on coefficients of the low-frequency component out of the transform coefficients.

In addition, the intra prediction inverse orthogonal transformation unit 202B performs an inverse DWT for a low frequency component that is acquired as a result of performing the inverse KLT of an optimal intra prediction mode that is represented by the intra prediction mode information and a high-frequency component of the transform coefficients, thereby acquiring residual information. The intra prediction inverse orthogonal transformation unit 202B may change the number of inverse DWTs to be performed based on whether a predicted direction of the optimal intra prediction mode is an oblique direction or a direction other than the oblique direction. The intra prediction inverse orthogonal transformation unit 202B supplies the residual information to the calculation unit 70.

[Example of Detailed Configuration of Intra Prediction Orthogonal Transformation Unit]

Figure 16:
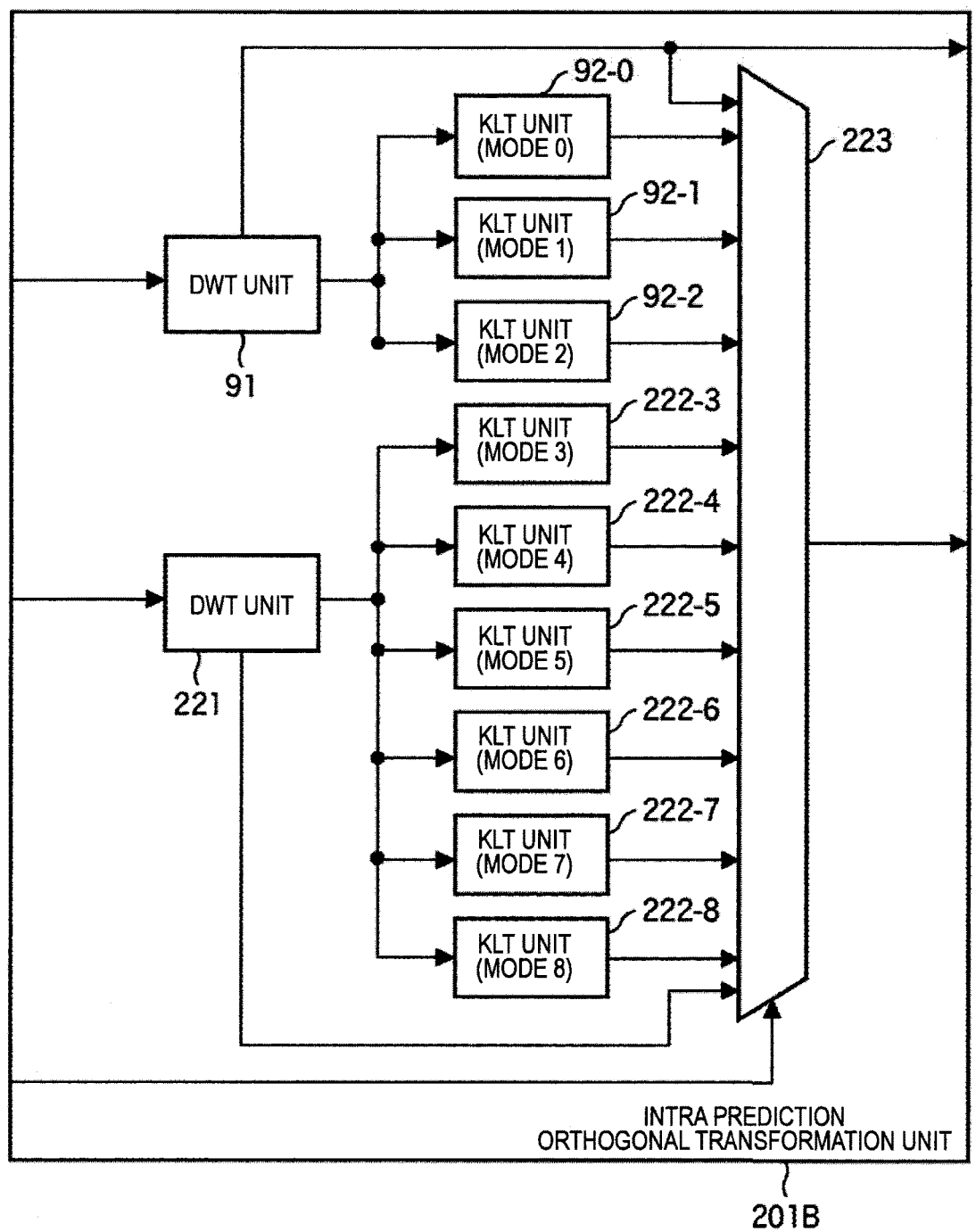
FIG. 16 is a block diagram that illustrates an example of a detailed configuration of an intra prediction orthogonal transformation unit that is illustrated in FIG. 15.

FIG. 16 is a block diagram that illustrates an example of a detailed configuration of the intra prediction orthogonal transformation unit 201B that is illustrated in FIG. 15.

In the configuration illustrated in FIG. 16, a same reference sign is assigned to a same configuration as that illustrated in FIG. 3. Repetitive description will not be presented as is appropriate.

The configuration of the intra prediction orthogonal transformation unit 201B illustrated in FIG. 16 is mainly different from the configuration illustrated in FIG. 3 in that a DWT unit 221 is newly disposed, KLT units 222-3 to 222-8 are deposed instead of the KLT units 92-3 to 92-8, and a selector 223 is disposed instead of the selector 93.

In the intra prediction orthogonal transformation unit 201B illustrated in FIG. 16, a DWT unit 91 is a DWT unit that is used for intra prediction modes of numbers 0 to 2, and a low-frequency component that is output from the DWT unit 91 is supplied only to KLT units 92-0 to 92-2.

The DWT unit 221 is a DWT unit that is used for intra prediction modes of numbers 3 to 8, and the DWT unit 221 (prior orthogonal transformation unit) performs a DWT on residual information that is supplied from the calculation unit 63 (FIG. 15) as is needed, thereby acquiring a low-frequency component and a high-frequency component. The number of DWTs performed by the DWT unit 221 and the number of DWTs performed by the DWT unit 91 may be the same or be different from each other. However, since the non-separable type KLT performed by the KLT units 222-3 to 222-8 has a more calculation amount than the separable-type KLT performed by the KLT units 92-0 to 92-2, in a case where the calculation amounts that can be processed by both KLT units are the same, the DWT unit 221 needs to perform DWTs more than the DWT unit 91.

The DWT unit 221 supplies low-frequency components to the KLT units 222-3 to 222-8 and supplies high-frequency components to the selector 223. In addition, in a case where a KLT does not need to be performed, the DWT unit 221 supplies the residual information to the KLT units 222-3 to 222-8 without change.

The KLT units 222-3 to 222-8 (posterior orthogonal transformation units) perform non-separable type KLTs on the low-frequency components or the residual information that is supplied from the DWT unit 221 using bases of the KLTs of the intra prediction modes of numbers 3 to 8. Here, the base of the KLT of each intra prediction mode is an optimal value that is acquired through learning in advance. The KLT units 222-3 to 222-8 supply coefficients that are acquired as results of the non-separable type KLTs to the selector 223.

The intra prediction mode information supplied from the predicted image selecting unit 76 is supplied to the selector 223. The selector 223 selects a coefficient, which is supplied from one of the KLT units 92-0 to 92-2 and the KLT units 222-3 to 222-8 that corresponds to the optimal intra prediction mode, out of coefficients supplied from the KLT units 92-0 to 92-2 and the KLT units 222-3 to 222-8 based on the intra prediction mode information. Then, the selector 223 supplies the selected coefficient of the residual information to the quantization unit 65 (FIG. 15). Alternatively, the selector 223 supplies the coefficients of the low-frequency component and high-frequency components supplied from the DWT unit 91 or the DWT unit 221 that corresponds to the optimal intra prediction mode to the quantization unit 65 as transform coefficients.

As described above, the intra prediction orthogonal transformation unit 201B performs non-separable type KLTs as KLTs that correspond to the intra prediction modes of numbers 3 to 8 of which the predicted directions are oblique directions, and accordingly, the encoding efficiency can be improved.

More specifically, in the separable-type KLT, a KLT is performed with a component being divided into the horizontal direction and the vertical direction, and accordingly, restriction is added to the base of the KLT more than the non-separable type KLT, whereby the performance is degraded. More specifically, in a case where the predicted direction of the intra prediction mode is an oblique direction, although residual information having a strong correlation in an oblique direction may be easily generated, it is difficult to consider the correlation in the oblique direction in the separable-type KLT, whereby the performance is degraded. In contrast to this, the intra prediction orthogonal transformation unit 201B performs a non-separable type KLT as a KLT that corresponds to the intra prediction mode of which the predicted direction is an oblique direction, and accordingly, a correlation in the oblique direction is considered, whereby the performance is improved. As a result, the encoding efficiency is improved.

In addition, in the case of an intra prediction mode in which the predicted direction is a direction other than an oblique direction, that is, the horizontal direction or the vertical direction, residual information having a strong correlation in the horizontal direction or the vertical direction may be easily generated, whereby sufficient encoding efficiency can be realized even in the separable-type KLT. Accordingly, in the case of an intra prediction mode in which the predicted direction is other than an oblique direction, the intra prediction orthogonal transformation unit 201B performs a separable-type KLT, thereby reducing the amount of calculation.

Although the selector 223 is disposed after the KLT units 92-0 to 92-2 and the KLT units 222-3 to 222-8 in the intra prediction orthogonal transformation unit 201B illustrated in FIG. 16, the selector may be disposed before the KLT units 92-0 to 92-2 and the KLT units 222-3 to 222-8. In such a case, the low-frequency component or the residual information that is output from the DWT unit 91 or the DWT unit 221 is supplied to only one of the KLT units 92-0 to 92-2 and the KLT units 222-3 to 222-8 that corresponds to the optimal intra prediction mode.

[Description of DWT]

Figure 17:
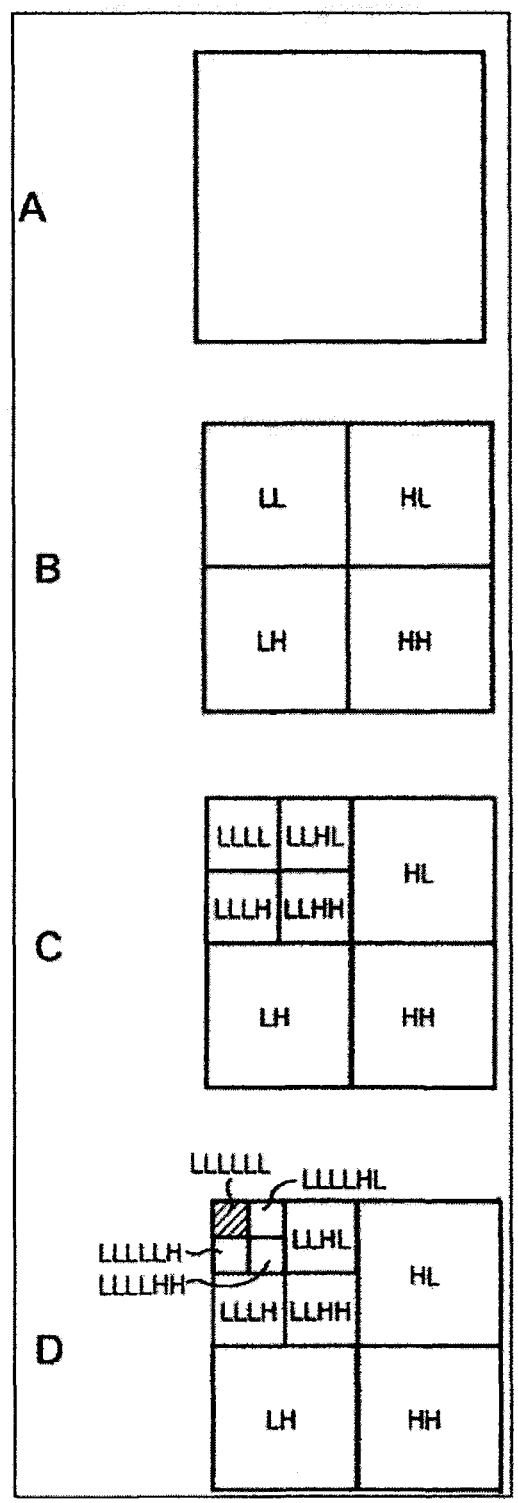
FIG. 17 is a diagram that illustrates a DWT performed by the DWT unit.

FIG. 17 is a diagram that illustrates the DWT performed by the DWT unit 221.

In the example illustrated in FIG. 17, the DWT unit 221 performs three DWTs. Here, A of FIG. 17 to C of FIG. 17 are the same as A of FIG. 4 to C of FIG. 4, and thus, the description thereof will not be presented.

As illustrated in D of FIG. 17, when a DWT is performed for an LLLL component illustrated in C of FIG. 17 in the horizontal direction and the vertical direction, the horizontal component and the vertical component of the LLLL component are respectively divided into a high-frequency component and a low-frequency component. As a result, the LLLL component is divided into a component (LLLLLL component) in which the horizontal component and the vertical component are low-frequency components, a component (LLLLHL component) in which the horizontal component is a high-frequency component and the vertical component is a low frequency component, a component (LLLLLH) in which the horizontal component is a low-frequency component and the vertical component is a high-frequency component, and a component (LLLLHH component) in which the horizontal component and the vertical component are high-frequency components. The HL component, the LH component, the HH component, the LLHL component, the LLLH component, and the LLHH component that are components of the residual information other than the LLLL component are unchanged.

For example, as illustrated in FIG. 4, in a case where the number of DWTs performed by the DWT unit 91 is two, the DWT unit 221, as illustrated in FIG. 17, performs three DWTs, thereby further decreasing the size of the low-frequency component that is a target for a KLT.

[Detailed Configuration Example of Intra Prediction Inverse Orthogonal Transformation Unit]

Figure 18:
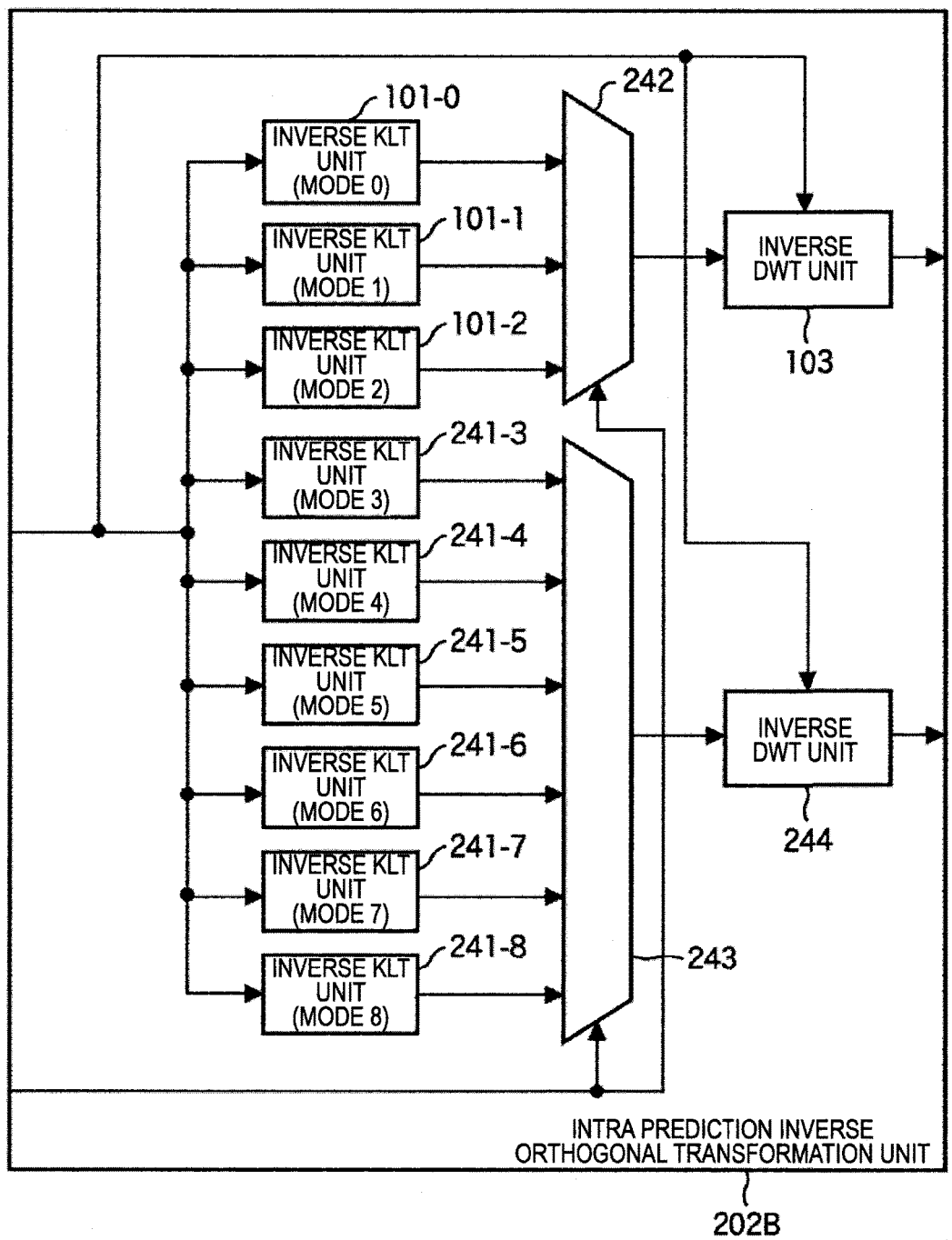
FIG. 18 is a block diagram that illustrates an example of a detailed configuration of the intra prediction inverse orthogonal transformation unit that is illustrated in FIG. 15.

FIG. 18 is a block diagram that illustrates an example of a detailed configuration of the intra prediction inverse orthogonal transformation unit 202B that is illustrated in FIG. 15.

In the configuration illustrated in FIG. 18, a same reference sign is assigned to the same configuration as that illustrated in FIG. 5. Duplicate description will not be presented as is appropriate.

The configuration of the intra prediction inverse orthogonal transformation unit 202B illustrated in FIG. 18 is mainly different from the configuration illustrated in FIG. 5 that inverse KLT units 241-3 to 241-8 are disposed instead of the inverse KLT units 101-3 to 101-8, selectors 242 and 243 are disposed instead of the selector 102, and an inverse DWT unit 244 is newly disposed.

The inverse KLT units 241-3 to 241-8 of the intra prediction inverse orthogonal transformation unit 202B illustrated in FIG. 18 perform non-separable type inverse KLTs for coefficients of the transform coefficients supplied from the inverse quantization unit 68 illustrated in FIG. 15 using bases of the inverse KLTs of the intra prediction modes of numbers 3 to 8.

The intra prediction mode information that is supplied from the predicted image selecting unit 76 is supplied to the selector 242. The selector 242 selects a post-inverse KLT component, which is supplied from one of the inverse KLT units 101-0 to 101-2, corresponding to the optimal intra prediction mode out of post-inverse KLT components supplied from the inverse KLT units 101-0 to 101-2 based on the intra prediction mode information. Then, the selector 242 supplies the selected post-inverse KLT component to the inverse DWT unit 103.

The intra prediction mode information that is supplied from the predicted image selecting unit 76 is supplied to the selector 243. The selector 243 selects a post-inverse KLT component, which is supplied from one of the inverse KLT units 241-3 to 241-8, corresponding to the optimal intra prediction mode out of post-inverse KLT components supplied from the inverse KLT units 241-3 to 241-8 based on the intra prediction mode information. Then, the selector 243 supplies the selected post-inverse KLT component to the inverse DWT unit 244.

In the intra prediction inverse orthogonal transformation unit 202B, the inverse DWT unit 103 is an inverse DWT unit used for intra prediction modes of numbers 0 to 2, and a component that is acquired from one of the inverse KLT units 101-0 to 101-2 is supplied to the inverse DWT unit 103 through the selector 242.

The inverse DWT unit 244 is an inverse DWT unit used for intra prediction modes of numbers 3 to 8, and the inverse DWT unit 244 supplies a component that is supplied from one of the inverse KLT units 241-3 to 241-8 through the selector 243 to the calculation unit 70 (FIG. 15) as residual information. Alternatively, the inverse DWT unit 244 performs an inverse DWT that corresponds to a DWT performed by the DWT unit 221 for the component supplied from the selector 243 and a high-frequency component of the transform coefficients supplied from the inverse quantization unit 68 and supplies an acquired resultant component to the calculation unit 70 as the residual information.

In the intra prediction inverse orthogonal transformation unit 202B illustrated in FIG. 18, although the selectors 242 and 243 are disposed after the inverse KLT units 101-0 to 101-2 and the inverse KLT units 241-3 to 241-8, the selector may be disposed before the inverse KLT units 101-0 to 101-2 and the inverse KLT units 241-3 to 241-8. In such a case, coefficients of the transform coefficients supplied from the inverse quantization unit 68 are supplied only to one of the inverse KLT units 101-0 to 101-2 and the inverse KLT units 241-3 to 241-8 that corresponds to the optimal intra prediction mode.

[Description of Process of Image Encoding Device]

The encoding process of the image encoding device 200 illustrated in FIG. 15 is the same as the encoding process illustrated in FIG. 7 except for orthogonal transform processing performed by the intra prediction orthogonal transformation unit 64B in Step S14 illustrated in FIG. 7 and inverse orthogonal transform processing performed by the intra prediction inverse orthogonal transformation unit 69B in Step S17. Thus, only the orthogonal transform processing and the inverse orthogonal transform processing will be described.

Figure 19:
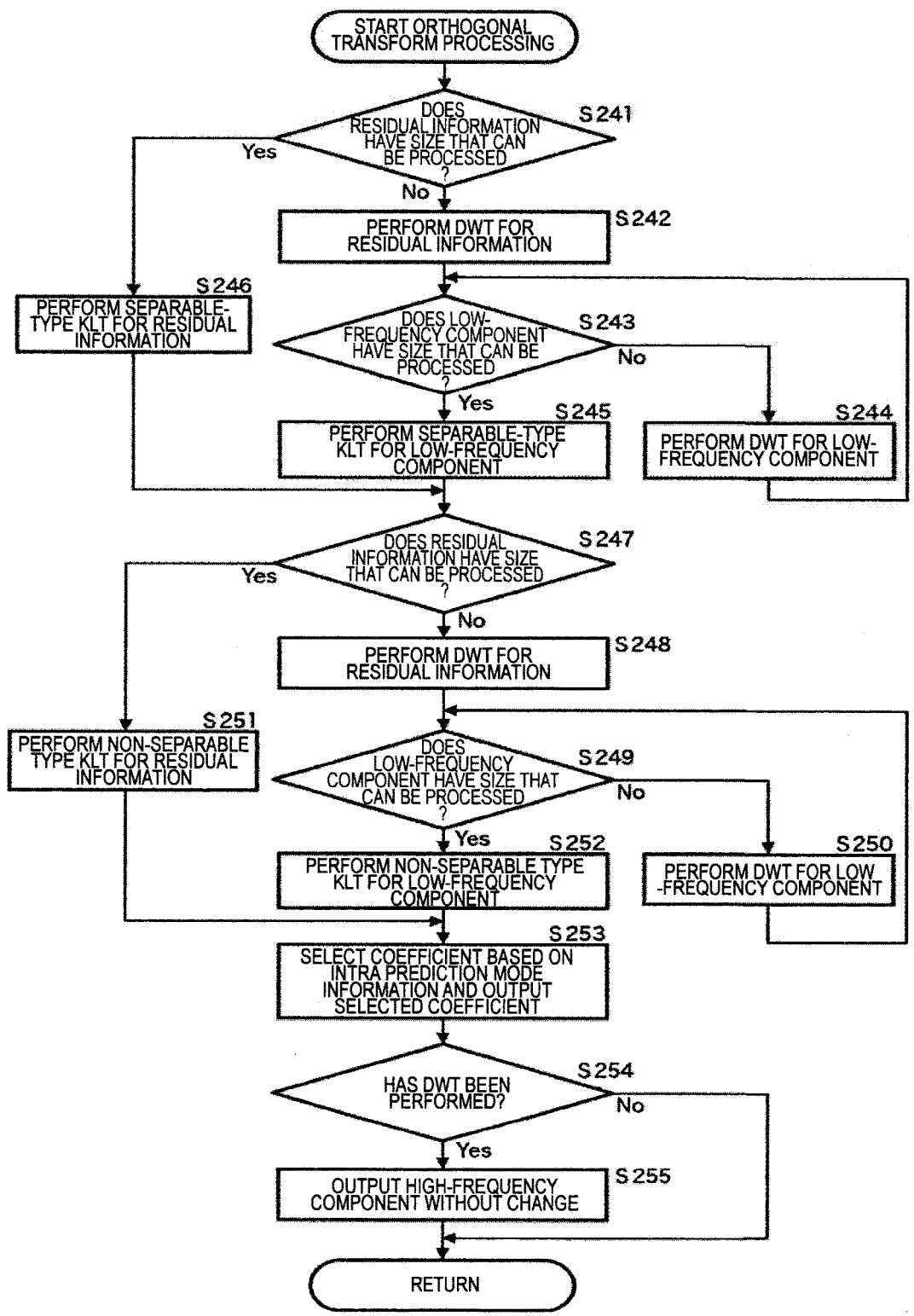
FIG. 19 is a flowchart that illustrates orthogonal transform processing.

FIG. 19 is a flowchart that illustrates orthogonal transform processing performed by the intra prediction orthogonal transformation unit 201B of the image encoding device 200.

The processes of Steps S241 to S246 illustrated in FIG. 19 are the same as those of Steps S41 to S44 and S48 illustrated in FIG. 8 except that the processes of Steps S245 and S246 are performed by the KLT units 92-0 to 92-2.

After the process of Step S245 or Step S246, the DWT unit 221 (FIG. 16) of the intra prediction orthogonal transformation unit 201B determines whether or not the size of the residual information supplied from the calculation unit 63 (FIG. 15) is a size that can be processed by the KLT units 222-3 to 222-8 in Step S247.

In a case where the size of the residual information is determined not to be a size that can be processed by the KLT units 222-3 to 222-8 in Step S247, the DWT unit 221 performs a DWT for the residual information in Step S248.

In Step S249, the DWT unit 221 determines whether or not the size of a low-frequency component acquired as a result of the process of Step S248 is a size that can be processed by the KLT units 222-3 to 222-8. In a case where the size of the low-frequency component acquired as the result of the DWT is determined not to be a size that can be processed by the KLT units 222-3 to 222-8 in Step S249, the DWT unit 221 performs a DWT for the low-frequency component acquired as the result of the process of Step S248 in Step S250. Then, the process is returned to Step S249, and the process of Steps S249 and S250 is repeated until the size of the low-frequency component becomes a size that can be processed by the KLT units 222-3 to 222-8.

In a case where the size of the low-frequency component acquired as the result of the DWT is determined to be a size that can be processed by the KLT units 222-3 to 222-8 in Step S249, the DWT unit 221 supplies the low-frequency component acquired as the result of the DWT to the KLT units 222-3 to 222-8 and supplies a high-frequency component to the selector 223.

Then, in Step S252, the KLT units 222-3 to 222-8 perform non-separable type KLTs for the low-frequency component by using bases of the KLTs of the corresponding intra prediction modes. Then, the process proceeds to Step S253.

On the other hand, in a case where the size of the residual information is determined to be a size that can be processed by the KLT units 222-3 to 222-8 in Step S247, the DWT unit 221 supplies the residual information to the KLT units 222-3 to 222-8 without change. Then, in Step S251, the KLT units 222-3 to 222-8 perform non-separable type KLTs for the residual information by using the bases of the KLTs of the corresponding intra prediction modes, and the process proceeds to Step S253.

In Step S253, similarly to the process of Step S46 illustrated in FIG. 8, the selector 223 selects a coefficient that is supplied from one of the KLT units 92-0 to 92-2 or the KLT units 222-3 to 222-8 that corresponds to the optimal intra prediction mode out of the coefficients supplied from the KLT units 92-0 to 92-2 and the KLT units 222-3 to 222-8 based on the intra prediction mode information and outputs the selected coefficient to the quantization unit 65 (FIG. 15).

In Step S254, the selector 223 determines whether or not the DWT unit 91 or the DWT unit 221 that corresponds to the optimal intra prediction mode has performed a DWT, in other words, whether or not a high-frequency component has been supplied from the DWT unit 91 or the DWT unit 221 that corresponds to the optimal intra prediction mode.

In a case where it is determined that the DWT unit 91 or the DWT unit 221 that corresponds to the optimal intra prediction mode has performed a DWT in Step S254, the process proceeds to Step S255. In Step S255, the selector 223 outputs a high-frequency component supplied from the DWT unit 91 or the DWT unit 221 that corresponds to the optimal intra prediction mode to the quantization unit 65 (FIG. 15) without change and ends the process.

On the other hand, in a case where it is determined that the DWT unit 91 or the DWT unit 221 that corresponds to the optimal intra prediction mode has not performed a DWT in Step S254, the process immediately ends.

Figure 20:
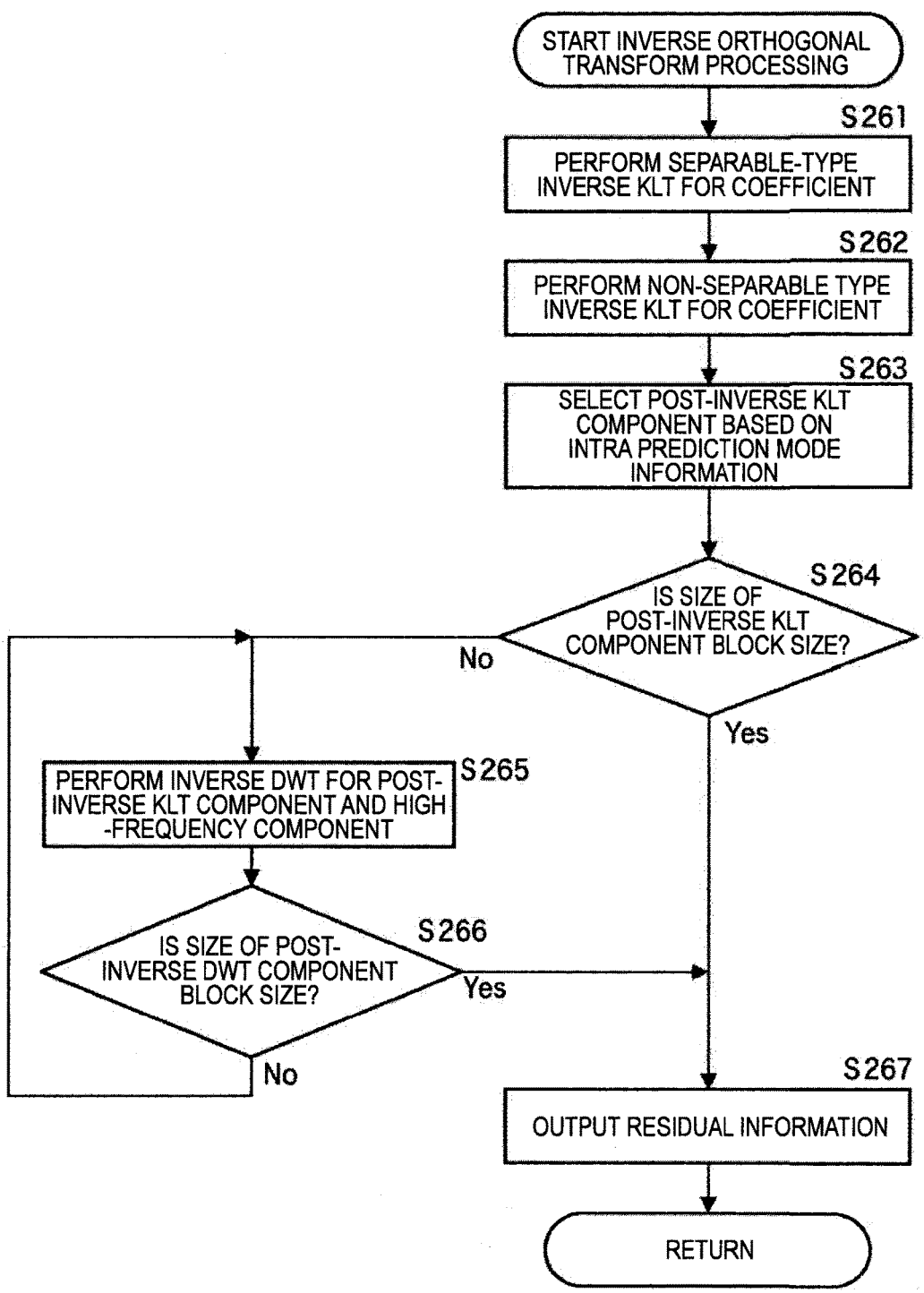
FIG. 20 is a flowchart that illustrates inverse orthogonal transform processing.

FIG. 20 is a flowchart that illustrates inverse orthogonal transform processing of the intra prediction inverse orthogonal transformation unit 202B of the image encoding device 200.

In Step S261, the inverse KLT units 101-0 to 101-2 (FIG. 18) of the intra prediction inverse orthogonal transformation unit 202B perform separable-type inverse KLTs for the coefficients out of the transform coefficients supplied from the inverse quantization unit 68 (FIG. 15) using bases of the KLTs of the intra prediction modes of numbers 0 to 2.

In Step S262, the inverse KLT units 241-3 to 241-8 perform non-separable type inverse KLTs for the coefficients out of the transform coefficients supplied from the inverse quantization unit 68 using bases of the KLTs of the intra prediction modes of numbers 3 to 8.

In Step S263, each of the selectors 242 and 243 selects a post-inverse KLT component supplied from one of the inverse KLT units 101-0 to 101-2 or the inverse KLT units 241-3 to 241-8 that corresponds to the optimal intra prediction mode out of the post-inverse KLT components supplied from the inverse KLT units 101-0 to 101-2 or the inverse KLT units 241-3 to 241-8 based on the intra prediction mode information supplied from the predicted image selecting unit 76. Then, the selectors 242 and 243 supply the selected post-inverse KLT components to the inverse DWT unit 103 or the inverse DWT unit 244, and the process proceeds to Step S264. The subsequent process is performed by the inverse DWT unit 103 or the inverse DWT unit 244 to which the post-inverse KLT component is supplied.

In Step S264, the inverse DWT unit 103 or the inverse DWT unit 244 determines whether or not the size of the post-inverse KLT component supplied from the selector 242 or 243 is the block size. In a case where the size of the post-inverse KLT component is determined not to be the block size in Step S264, the process proceeds to Step S265. In Step S265, the inverse DWT unit 103 performs an inverse DWT for high-frequency components out of the post-inverse KLT component and the transform coefficients supplied from the inverse quantization unit 68.

In Step S266, the inverse DWT unit 103 or the inverse DWT unit 244 determines whether or not the size of the post-inverse DWT component that is acquired by as a result of the process of Step S264 is the block size. In a case where the size of the post-inverse DWT component is determined not to be the block size in Step S265, the process is returned to Step S265, and the processes of Steps S265 and S266 are repeated until the size of the post-inverse DWT component becomes the block size.

In a case where the size of the post-inverse DWT component is determined to be the block size in Step S266, the process proceeds to Step S267.

On the other hand, in a case where the size of the post-inverse KLT component is determined to be the block size in Step S264, the process proceeds to Step S267.

In Step S267, the inverse DWT unit 103 or the inverse DWT unit 244 supplies the post-inverse DWT component or the post-inverse KLT component to the calculation unit 70 as the residual information.

[Configuration Example of Image Decoding Device]

Figure 21:
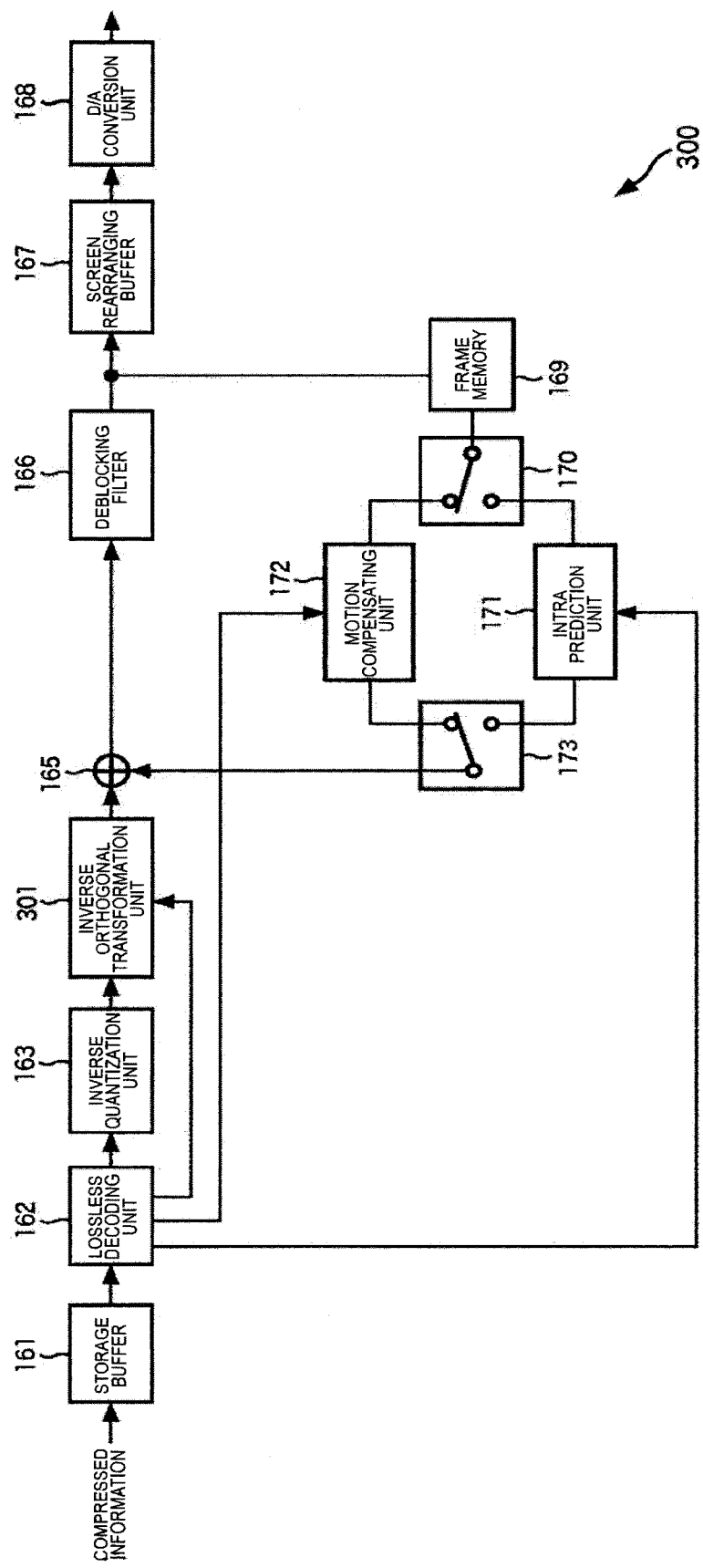
FIG. 21 is a block diagram that illustrates a configuration example of an image decoding device according to the second embodiment of the present technology.

FIG. 21 is a block diagram that illustrates a configuration example of an image decoding device according to a second embodiment of the present technology.

In the configuration illustrated in FIG. 21, a same reference sign is assigned to the same configuration as that illustrated in FIG. 12. Duplicate description will not be presented as is appropriate.

The configuration of the image decoding device 300 illustrated in FIG. 21 is mainly different from the configuration illustrated in FIG. 12 that an inverse orthogonal transformation unit 301 is disposed instead of the inverse orthogonal transformation unit 164.

The inverse orthogonal transformation unit 301 of the image decoding device 300 is configured similarly to the inverse orthogonal transformation unit 202 illustrated in FIG. 15. The inverse orthogonal transformation unit 301 performs inverse orthogonal transform processing for transform coefficients supplied from the inverse quantization unit 163 in accordance with the inter prediction mode information or the intra prediction mode information supplied from the lossless decoding unit 162. The inverse orthogonal transformation unit 301 supplies the residual information acquired as a result of the inverse orthogonal transform processing to the calculation unit 165.

[Description of Process of Image Decoding Device]

The decoding process of the image decoding device 300 illustrated in FIG. 21 is the same as the decoding process illustrated in FIG. 13 except for inverse orthogonal transform processing of Step S134 illustrated in FIG. 13, and thus, description of processes other than the inverse orthogonal transform process will not be presented. In the inverse orthogonal transform processing of the image decoding device 300, in a case where intra prediction information is supplied from the lossless decoding unit 162, inverse orthogonal transform processing similar to the inverse orthogonal transform processing illustrated in FIG. 20 is performed, and, in a case where inter prediction information is supplied, an inverse orthogonal transform is performed for the transform coefficients supplied from the inverse quantization unit 163.

In the description presented above, although the predicted directions of the intra prediction modes of numbers 3 to 8 are assumed to be oblique directions, it may be assumed that the predicted directions of the intra prediction modes of numbers 5 and 7 are the vertical direction, and the predicted directions of the intra prediction modes of numbers 6 and 8 are the horizontal direction.

In the description presented above, two types of 4×4 pixels and 8×8 pixels are assumed as the block sizes of the intra prediction, other block sizes such as 16×16 pixels, 32×32 pixels, 64×64 pixels, and 128×128 pixels may be handled. However, in such a case, since the number of the intra prediction modes changes, the number of the KLT units or the inverse KLT units changes. For example, in a case where the block size is 16×16 pixels, there are four types of intra prediction modes, and the number of the KLT units or the inverse KLT units is four.

In the description presented above, although the DWT is performed before the KLT, the orthogonal transform that is performed before the KLT may be any type of orthogonal transform, of which the calculation amount is less than that of the KLT, for example, for which a high-speed algorithm can be arranged.

Figure 22:
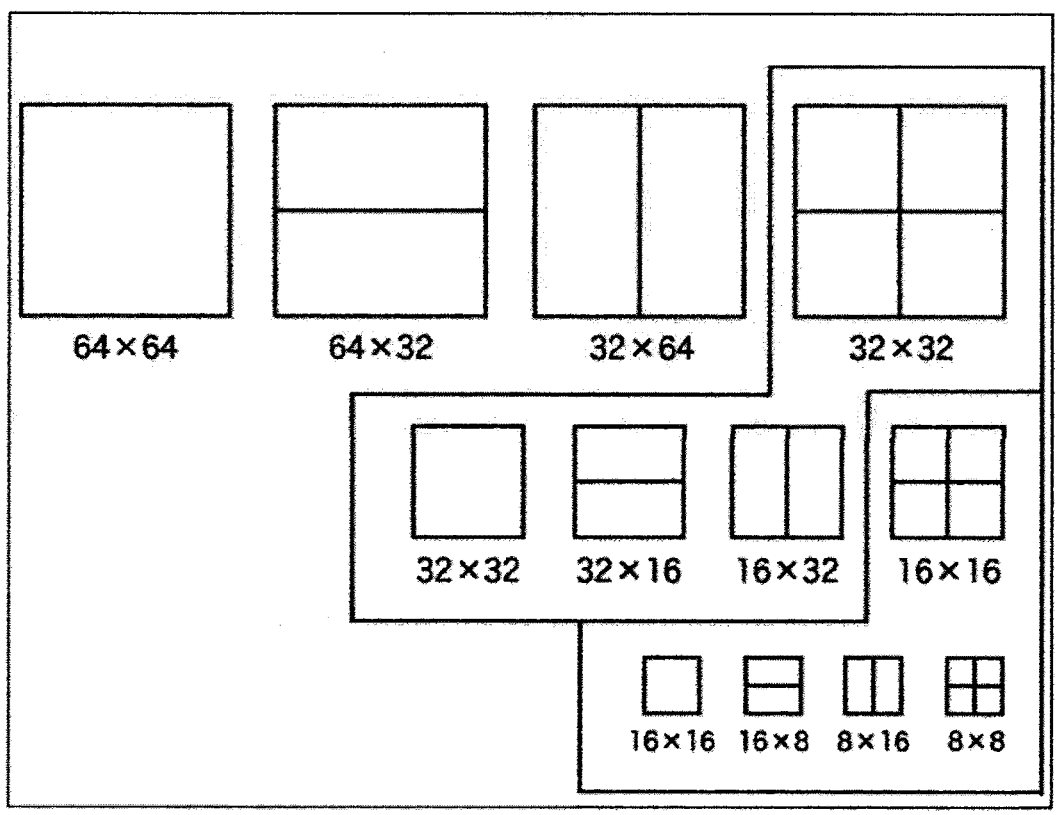
FIG. 22 is a diagram that illustrates an example of the size of a macro block.

In the present technology, the size of the macro block is arbitrary. The present technology may be applied to a macro block having any size, for example, as illustrated in FIG. 22. For example, the present technology may be applied not only to a macro block of an ordinary 16×16 pixels but also to a macro block (expanded macro block) that is expanded as 32×32 pixels.

Third Embodiment

Description of Computer to which Present Technology is Applied

Next, the encoding process or the decoding process described above may be performed by hardware or software. In a case where the encoding process or the decoding process is performed by the software, a program that configures the software is installed to a general-purpose computer or the like.

Figure 23:
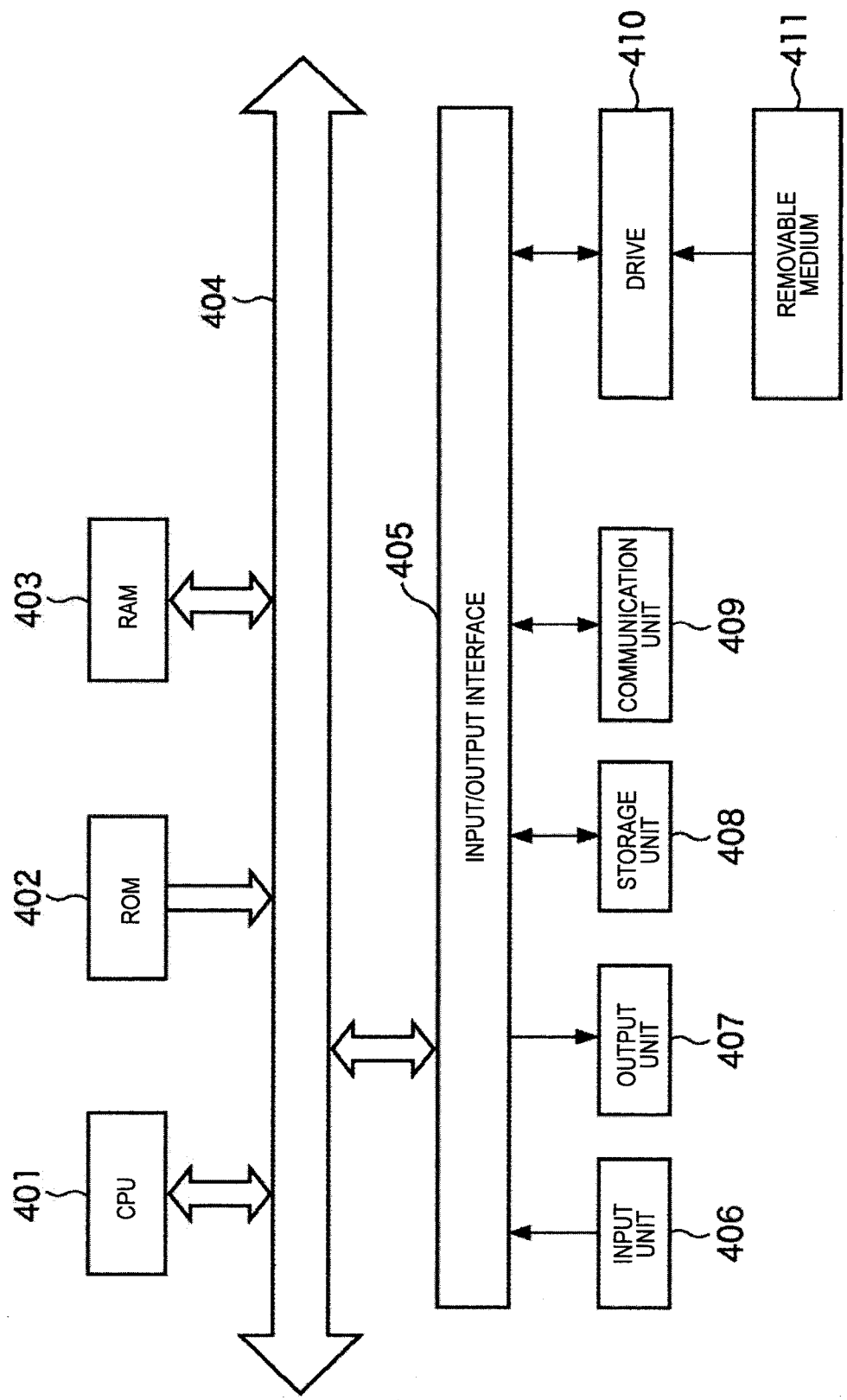
FIG. 23 illustrates a configuration example of a computer according to an embodiment.

FIG. 23 illustrates a configuration example of a computer, to which the program that executes a series of processes described above is installed, according to an embodiment.

The program may be recorded in a storage unit 408 or a read only memory (ROM) 402 in advance as a recording medium that is built in the computer.

Alternatively, the program may be stored (recorded) on a removable medium 411. Such a removable medium 411 may be provided as so-called package software. Here, examples of the removable medium 411 include a flexible disk, a compact disc read only memory (CD-ROM), a magneto optical (MO) disk, a digital versatile disc (DVD), a magnetic disk, and a semiconductor memory.

In addition, instead of installing the program to the computer from a removable medium 411 as described above through a drive 410, the program may be downloaded into the computer through a communication network or a broadcast network and be installed to the storage unit 408 that is built therein. In other words, the program may be transmitted to the computer in a wired manner, for example, from a download site through a satellite used for digital satellite broadcasting or be transmitted to the computer in a wired manner through a network such as a local area network (LAN) or the Internet.

The computer includes a central processing unit (CPU) 401 therein, and an input/output interface 405 is connected to the CPU 401 through a bus 404.

When an instruction is input from a user through the input/output interface 405 by operating an input unit 406, the CPU 401 executes a program that is stored in the ROM 402 in accordance with the instruction. Alternatively, the CPU 401 loads a program that is stored in the storage unit 408 into a random access memory (RAM) 403 and executes the program.

Accordingly, the CPU 401 performs the process according to the above-described flowchart or the process that is performed by the configuration of the above-described block diagram. Then, the CPU 401 outputs a processing result from an output unit 407, for example, through the input/output interface 405, transmits the processing result from a communication unit 409, or records the processing result in the storage unit 408 as is needed.

Here, the input unit 406 is configured by a keyboard, a mouse, a microphone, and the like. In addition, the output unit 407 is configured by a liquid crystal display (LCD), a speaker, and the like.

Here, in this specification, the process that is performed by a computer in accordance with a program does not need to be performed necessarily in a time series in accordance with the sequence described in the flowchart. In other words, the process that is performed by the computer in accordance with the program includes a process (for example, a parallel process or a process using an object) that is performed in a parallel manner or in an individual manner.

In addition, the program may be processed by one computer (processor) or may be processed by a plurality of computers in a distributed manner. Furthermore, the program may be transmitted to a remote computer and be executed.

Fourth Embodiment

Configuration Example of Television Receiver

Figure 24:
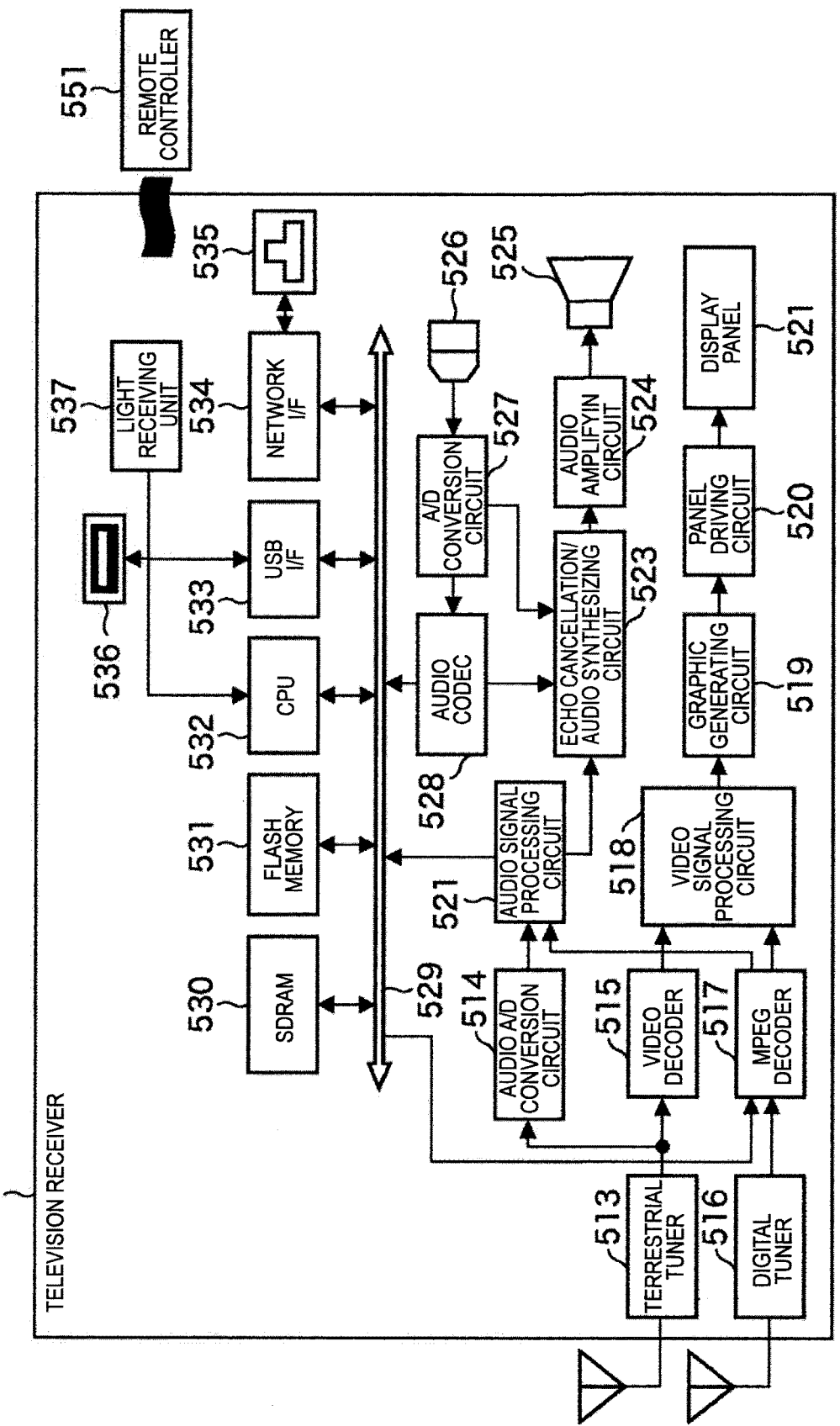
FIG. 24 is a block diagram that illustrates an example of a main configuration of a television set.

FIG. 24 is a block diagram that illustrates an example of a main configuration of a television receiver that uses the image decoding device according to the present technology.

The television receiver 500 illustrated in FIG. 24 includes a terrestrial tuner 513, a video decoder 515, a video signal processing circuit 518, a graphic generating circuit 519, a panel driving circuit 520, and a display panel 521.

The terrestrial tuner 513 receives a broadcasting signal of terrestrial analog broadcasting through an antenna and demodulates the received broadcasting signal so as to acquire a video signal and supplies the video signal to the video decoder 515. The video decoder 515 performs a decoding process for the video signal that is supplied from the terrestrial tuner 513 and supplies acquired digital component signals to the video signal processing circuit 518.

The video signal processing circuit 518 performs a predetermined process such as a noise eliminating process for the video data that is supplied from the video decoder 515 and supplies acquired video data to the graphic generating circuit 519.

The graphic generating circuit 519 generates video data of a program to be displayed on the display panel 521, image data according to a process that is based on an application supplied through a network, and the like and supplies the video data or the image data that has been generated to the panel driving circuit 520. In addition, the graphic generating circuit 519 appropriately performs a process of generating video data (graphics) used for displaying a screen that is used by a user for selecting an item or the like and supplying video data that is acquired by superimposing the generated video data on the video data of the program to the panel driving circuit 520.

The panel driving circuit 520 drives the display panel 521 based on data that is supplied from the graphic generating circuit 519, thereby displaying the video of the program or various screens described above on the display panel 521.

The display panel 521 is formed by a liquid crystal display (LCD) or the like and displays a video of a program or the like under the control of the panel driving circuit 520.

In addition, the television receiver 500 further includes an audio analog/digital (A/D) conversion circuit 514, an audio signal processing circuit 522, an echo cancellation/audio synthesizing circuit 523, an audio amplifying circuit 524, and a speaker 525.

The terrestrial tuner 513 acquires not only a video signal but also an audio signal by demodulating the received broadcasting signal. The terrestrial tuner 513 supplies the acquired audio signal to the audio A/D conversion circuit 514.

The audio A/D conversion circuit 514 performs an A/D conversion process for the audio signal supplied from the terrestrial tuner 513 and supplies an acquired digital audio signal to the audio signal processing circuit 522.

The audio signal processing circuit 522 performs a predetermined process such as a noise eliminating process for the audio data that is supplied from the audio A/D conversion circuit 514 and supplies acquired audio data to the echo cancellation/audio synthesizing circuit 523.

The echo cancellation/audio synthesizing circuit 523 supplies the audio data that is supplied from the audio signal processing circuit 522 to the audio amplifying circuit 524.

The audio amplifying circuit 524 performs a D/A conversion process and an amplifying process for the audio data that is supplied from the echo cancellation/audio synthesizing circuit 523, adjusts resultant data to predetermined volume, and then outputs audio from the speaker 525.

Furthermore, the television receiver 500 includes a digital tuner 516 and an MPEG decoder 517.

The digital tuner 516 receives a broadcasting signal of digital broadcasting (terrestrial digital broadcasting or broadcasting satellite (BS)/communications satellite (CS) digital broadcasting) through an antenna and demodulates the received broadcasting signal so as to acquire a moving picture experts group-transport stream (MPEG-TS) and supplies the MPEG-TS to the MPEG decoder 517.

The MPEG decoder 517 dissolves the scramble that is applied to the MPEG-TS supplied from the digital tuner 516 and extracts a stream including data of a program that is a reproduction target (viewing target). The MPEG decoder 517 decodes an audio packet that configures the extracted stream, supplies acquired audio data to the audio signal processing circuit 522, decodes a video packet that configures the stream, and supplies acquired video data to the video signal processing circuit 518. In addition, the MPEG decoder 517 supplies electronic program guide (EPG) data extracted from the MPEG-TS to the CPU 532 through a path not illustrated in the diagram.

The television receiver 500 uses the above-described image decoding device 151 (300) as the MPEG decoder 517 that decodes a video packet as described above. Accordingly, similarly to the case of the image decoding device 151 (300), the MPEG decoder 517 can perform inverse orthogonal transform processing with a small amount of calculation.

A predetermined process is performed for the video data that is supplied from the MPEG decoder 517, similarly to the video data supplied from the video decoder 515, by the video signal processing circuit 518. Then, the video data generated by the graphic generating circuit 519 and the like appropriately overlap the video data for which the predetermined process has been performed, and resultant video data is supplied to the display panel 521 through the panel driving circuit 520, whereby an image thereof is displayed.

A predetermined process is performed for the audio data that is supplied from the MPEG decoder 517, similarly to the audio data supplied from the audio A/D conversion circuit 514, by the audio signal processing circuit 522. Then, the audio data for which the predetermined process has been performed is supplied to the audio amplifying circuit 524 through the echo cancellation/audio synthesizing circuit 523, and a D/A conversion process and an amplifying process are performed for the audio data. As a result, audio adjusted to predetermined volume is output from the speaker 525.

In addition, the television receiver 500 includes a microphone 526 and an A/D conversion circuit 527.

The A/D conversion circuit 527 receives a user's audio signal that is received by the microphone 526 that is set for audio and is disposed in the television receiver 500. The A/D conversion circuit 527 performs an A/D conversion process for the received audio signal and supplies acquired digital audio data to the echo cancellation/audio synthesizing circuit 523.

In a case where audio data of a user (user A) using the television receiver 500 is supplied from the A/D conversion circuit 527, the echo cancellation/audio synthesizing circuit 523 performs echo cancellation for the audio data of user A as a target. Then, after the echo cancellation, the echo cancellation/audio synthesizing circuit 523 outputs audio data that is acquired by a process of being composed with other audio data or the like from the speaker 525 through the audio amplifying circuit 524.

Furthermore, the television receiver 500 also includes an audio codec 528, an internal bus 529, a synchronous dynamic random access memory (SDRAM) 530, a flash memory 531, a CPU 532, a universal serial bus (USB) I/F 533, and a network I/F 534.

The A/D conversion circuit 527 receives a user's audio signal that is received by the microphone 526 that is set for audio and is disposed in the television receiver 500. The A/D conversion circuit 527 performs an A/D conversion process for the received audio signal and supplies acquired digital audio data to the audio codec 528.

The audio codec 528 converts the audio data that is supplied from the A/D conversion circuit 527 into data of a predetermined format for transmission through a network and supplies the converted data to the network I/F 534 through the internal bus 529.

The network I/F 534 is connected to the network through a cable that is installed to a network terminal 535. The network I/F 534, for example, transmits the audio data that is supplied from the audio codec 528 to another device that is connected to the network. In addition, the network I/F 534, for example, receives the audio data transmitted from the another device that is connected thereto through the network through the network terminal 535 and supplies the received audio data to the audio codec 528 through the internal bus 529.

The audio codec 528 converts the audio data supplied from the network I/F 534 into data of a predetermined format and supplies the converted data to the echo cancellation/audio synthesizing circuit 523.

The echo cancellation/audio synthesizing circuit 523 performs echo cancellation for the audio data supplied from the audio codec 528 as a target and outputs audio data that is acquired by a process of being composed with other audio data or the like from the speaker 525 through the audio amplifying circuit 524.

The SDRAM 530 stores various kinds of data that is necessary for the CPU 532 to perform the process.

The flash memory 531 stores a program that is executed by the CPU 532. The program that is stored in the flash memory 531 is read by the CPU 532 at predetermined timing such as at the time of start-up of the television receiver 500. In the flash memory 531, the EPG data that is acquired through digital broadcasting, data that is acquired from a predetermined server through the network, and the like are also stored.

For example, in the flash memory 531, MPEG-TS that includes content data acquired from a predetermined server through the network under the control of the CPU 532 is stored. The flash memory 531 supplies the MPEG-TS to the MPEG decoder 517 through the internal bus 529, for example, under the control of the CPU 532.

The MPEG decoder 517, similarly to the MPEG-TS that is supplied from the digital tuner 516, processes the MPEG-TS. As above, the television receiver 500 can receive content data that is formed by a video, an audio, and the like through the network, decode the content data using the MPEG decoder 517, and display the video or output the audio.

In addition, the television receiver 500 also includes a light receiving unit 537 that receives an infrared signal transmitted from a remote controller 551.

The light receiving unit 537 receives infrared rays transmitted from the remote controller 551 and outputs a control code that represents the content of a user operation that is acquired through demodulation to the CPU 532.

The CPU 532 executes the program that is stored in the flash memory 531 and controls the entire operation of the television receiver 500 in accordance with a control code supplied from the light receiving unit 537 and the like. The CPU 532 and each unit of the television receiver 500 are connected to each other through a path not illustrated in the diagram.

The USB I/F 533 transmits and receives data between the television receiver 500 and an external device that is connected through a USB cable that is installed to the USB terminal 536. The network I/F 534 is connected to the network through a cable that is installed to the network terminal 535 and transmits and receives data other than audio data to or from various devices connected to the network as well.

By using the image decoding device 151 (300) as the MPEG decoder 517, the television receiver 500 can reduce the calculation amount of the inverse orthogonal transform processing. As a result, the television receiver 500 can acquire a decoded image with a smaller calculation amount based on a broadcasting signal received through the antenna or content data acquired through the network and display the decoded image.

Fifth Embodiment

Configuration Example of Cellular Phone

Figure 25:
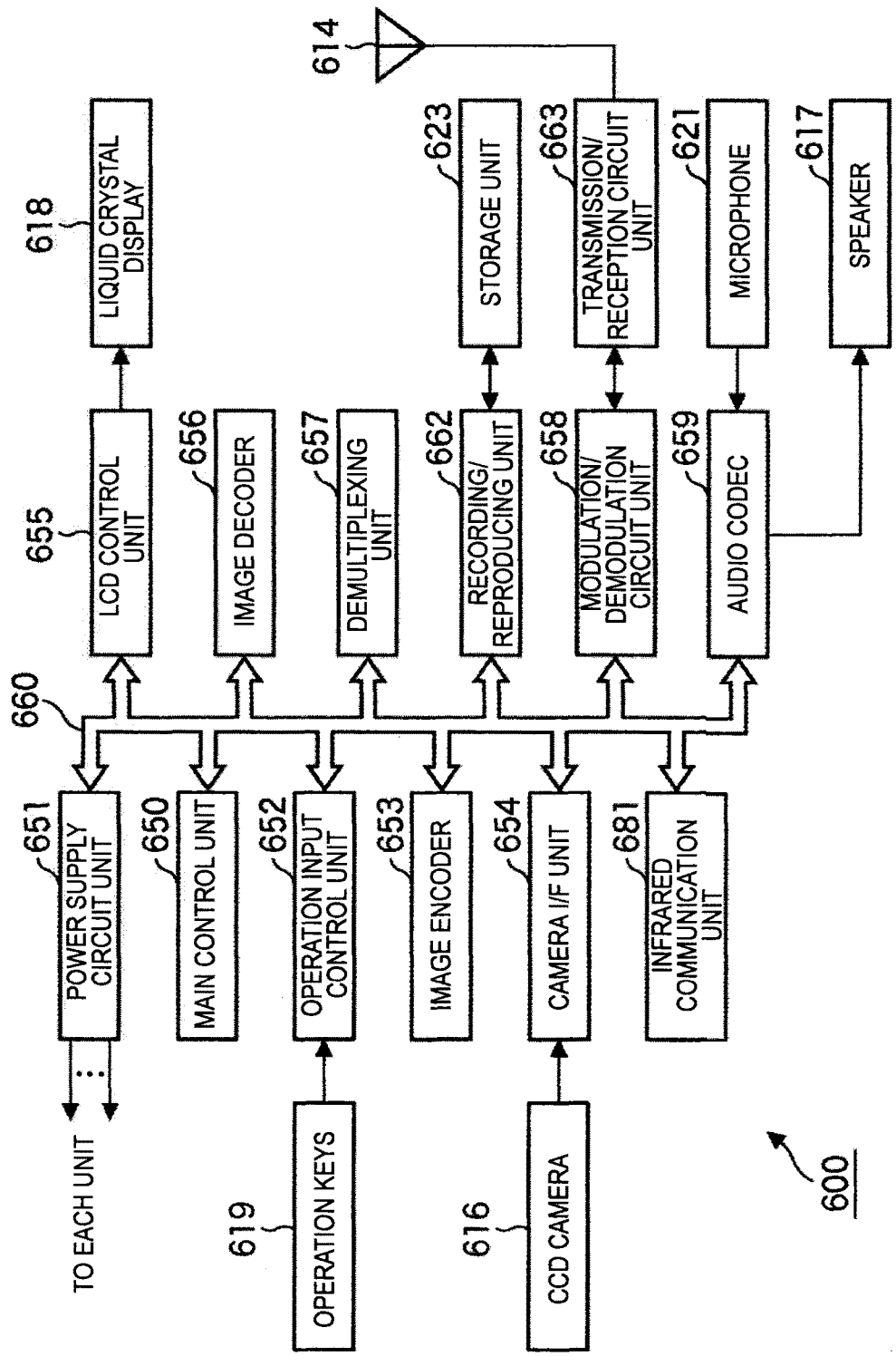
FIG. 25 is a block diagram that illustrates an example of a main configuration of a cellular phone.

FIG. 25 is a block diagram that illustrates an example of a main configuration of a cellular phone that uses the image encoding device and the image decoding device according to the present technology.

The cellular phone 600 illustrated in FIG. 25 includes a main control unit 650 that is configured so as to perform overall control of each unit, a power supply circuit unit 651, an operation input control unit 652, an image encoder 653, a camera I/F unit 654, an LCD control unit 655, an image decoder 656, a demultiplexing unit 657, a recording/reproducing unit 662, a modulation/demodulation circuit unit 658, and an audio codec 659. These are interconnected through a bus 660.

In addition, the cellular phone 600 includes operation keys 619, a charge coupled devices (CCD) camera 616, a liquid crystal display 618, a storage unit 623, a transmission/reception circuit unit 663, an antenna 614, a microphone (mike) 621, and a speaker 617.

When a call-end and power key is turned on by a user's operation, the power supply circuit unit 651 supplies power from a battery pack to each unit, thereby starting up the cellular phone 600 to be in an operable state.

The cellular phone 600 performs various operations such as transmission and reception of an audio signal, transmission and reception of an electronic mail or image data, image capturing, and data recording in various modes such as a phone call mode and a data communication mode under the control of the main control unit 650 that is formed by a CPU, a ROM, a RAM, and the like.

For example, in the phone call mode, the cellular phone 600 converts an audio signal that is collected by the microphone (mike) 621 into digital audio data using the audio codec 659, performs a spread-spectrum process for the digital audio data using the modulation/demodulation circuit unit 658, and performs a digital-to-analog conversion process and a frequency converting process using the transmission/reception circuit unit 663. The cellular phone 600 transmits a transmission signal that is acquired by the conversion processes to a base station not illustrated in the diagram through the antenna 614. The transmission signal (audio signal) transmitted to the base station is supplied to a cellular phone of a phone call opponent through a public telephone line network.

In addition, in the phone call mode, the cellular phone 600 amplifies a reception signal received using the antenna 614 by using the transmission/reception circuit unit 663, further performs a frequency conversion process and an analog-to-digital conversion process for the reception signal, performs a spread-spectrum process using the modulation/demodulation circuit unit 658, and converts a resultant signal into an analog audio signal using the audio codec 659. The cellular phone 600 outputs the analog audio signal acquired through the conversions from the speaker 617.

Furthermore, for example, in a case where an electronic mail is transmitted in the data communication mode, the cellular phone 600 receives text data of an electric mail that is input by operating the operation keys 619 using the operation input control unit 652. The cellular phone 600 processes the text data using the main control unit 650 and displays the processed text data as an image on the liquid crystal display 618 through the LCD control unit 655.

In addition, the cellular phone 600 generates electronic mail data based on text data, a user instruction, and the like received by the operation input control unit 652 using the main control unit 650. The cellular phone 600 performs spread-spectrum process for the electronic mail data using the modulation/demodulation circuit unit 658 and performs a digital-to-analog conversion process and a frequency conversion process for the electronic mail data using the transmission/reception circuit unit 663. The cellular phone 600 transmits a transmission signal that is acquired by the conversion processes to a base station not illustrated in the diagram through the antenna 614. The transmission signal (electronic mail) transmitted to the base station is supplied to a predetermined destination through the network, a mail server, and the like.

Furthermore, for example, in a case where an electronic mail is received in the data communication mode, the cellular phone 600 receives a signal transmitted from the base station through the antenna 614 using the transmission/reception circuit unit 663, amplifies the signal, and further performs a frequency conversion process and an analog-to-digital conversion process for the signal. The cellular phone 600 performs a spread-spectrum process for the reception signal using the modulation/demodulation circuit unit 658, thereby restoring the original electronic mail data. The cellular phone 600 displays the restored electronic mail data on the liquid crystal display 618 through the LCD control unit 655.

In addition, the cellular phone 600 may record (store) the received electronic mail data in the storage unit 623 through the recording/reproducing unit 662.

The storage unit 623 is an arbitrary rewritable storage medium. The storage unit 623, for example, may be a semiconductor memory such as a RAM or a built-in type flash memory, a hard disk, or a removable medium such as a magnetic disk, a magneto-optical disk, an optical disk, a USB memory, or a memory card. It is apparent that the storage unit 623 may be any other type.

In addition, for example, in a case where image data is transmitted in the data communication mode, the cellular phone 600 generates image data using the CCD camera 616 through imaging. The CCD camera 616 includes optical devices such as a lens and a diaphragm and CCDs as photoelectric conversion devices, images a subject, and converts the intensity of received light into an electrical signal, thereby generating image data of an image of the subject. The image data is converted into encoded image data by performing compression and encoding of the image data using a predetermined coding mode such as MPEG2 or MPEG4 by using the image encoder 653 through the camera I/F unit 654.

The cellular phone 600 uses the above-described image encoding device 51 (200) as the image encoder 653 that performs such a process. Accordingly, the image encoder 653, similarly to the case of the image encoding device 51 (200), can perform the orthogonal transform processing and the inverse orthogonal transform processing with a smaller calculation amount.

In addition, at the same time, the cellular phone 600 performs analog-to-digital conversion of audio collected using the microphone (mike) 621 while performing image capturing using the CCD camera 616 by using the audio codec 659 and further encodes the audio.

The cellular phone 600 multiplexes the encoded image data supplied from the image encoder 653 and the digital audio data supplied from the audio codec 659 in a predetermined mode in the demultiplexing unit 657. The cellular phone 600 performs a spread-spectrum process for the acquired resultant multiplexed data using the modulation/demodulation circuit unit 658 and performs a digital-to-analog conversion process and a frequency conversion process for resultant data using the transmission/reception circuit unit 663. The cellular phone 600 transmits a transmission signal that is acquired by the conversion processes to a base station not illustrated in the diagram through the antenna 614. The transmission signal (image data) transmitted to the base station is supplied to a communication opponent through a network or the like.

In a case where the image data is not transmitted, the cellular phone 600 may display image data generated by the CCD camera 616 on the liquid crystal display 618 not through the image encoder 653 but through the LCD control unit 655.

In addition, for example, in a case where data of a moving image file linked from a simple home page or the like is received in the data communication mode, the cellular phone 600 receives a signal transmitted from the base station using the transmission/reception circuit unit 663 through the antenna 614, amplifies the received signal, and further performs a frequency conversion process and an analog-to-digital conversion process for the received signal. The cellular phone 600 performs a spread-spectrum process for the received signal using the modulation/demodulation circuit unit 658, thereby restoring the original multiplexed data. The cellular phone 600 separates the multiplexed data using the demultiplexing unit 657 so as to be divided into encoded image data and audio data.

The cellular phone 600 generates reproduction moving image data by decoding the encoded image data in a decoding mode that corresponds to a predetermined encoding mode such as MPEG2 or MPEG4 by using the image decoder 656 and displays the reproduction moving image data on the liquid crystal display 618 through the LCD control unit 655. Accordingly, for example, the moving image data included in the moving image file linked from the simple home page is displayed on the liquid crystal display 618.

The cellular phone 600 uses the above-described image decoding device 151 (300) as the image decoder 656 that performs such a process. Accordingly, similarly to the case of the image decoding device 151 (300), the image decoder 656 can perform the inverse orthogonal transform processing with a smaller calculation amount.

At this time, the cellular phone 600, at the same time, converts the digital audio data into an analog audio signal using the audio codec 659 and outputs the analog audio signal from the speaker 617. Accordingly, for example, the audio data included in the moving image file that is linked from a simple home page is reproduced.

In addition, similarly to the case of the electronic mail, the cellular phone 600 may record (store) the data linked from a received simple home page or the like in the storage unit 623 through the recording/reproducing unit 662.

The cellular phone 600 may acquire information recorded in a two-dimensional code by analyzing the two-dimensional code acquired by using the CCD camera 616 through imaging by using the main control unit 650.

In addition, the cellular phone 600 may communicate with an external device through infrared rays using the infrared communication unit 681.

By using the image encoding device 51 (200) as the image encoder 653, the cellular phone 600 can perform the orthogonal transform processing and the inverse orthogonal transform processing with a smaller calculation amount. As a result, the cellular phone 600 can provide another device with encoded data (image data) that can be decoded with a smaller calculation amount.

In addition, by using the image decoding device 151 (300) as the image decoder 656, the cellular phone 600 can perform the inverse orthogonal transform processing with a smaller calculation amount. As a result, the cellular phone 600 can acquire a decoded image with a smaller calculation amount from a moving image file that is linked from a simple home page and display the decoded image.

In the description presented above, although the cellular phone 600 has been described to use the CCD camera 616, an image sensor (CMOS image sensor) using a complementary metal oxide semiconductor (CMOS) instead of the CCD camera 616 may be used. Also in such a case, similarly to the case of using the CCD camera 616, the cellular phone 600 can generate image data of an image of a subject by imaging the subject.

In the description presented above, although the cellular phone 600 has been described, for example, the image encoding device 51 (200) and the image decoding device 151 (300) can be applied to any device, similarly to the case of the cellular phone 600 as long as the device has an imaging function and a communication function that are the same as those of the cellular phone 600 such as a personal digital assistants (PDA), a smart phone, an ultra mobile personal computer (UMPC), a netbook, or a notebook personal computer.

Sixth Embodiment

Configuration Example of Hard Disk Recorder

Figure 26:
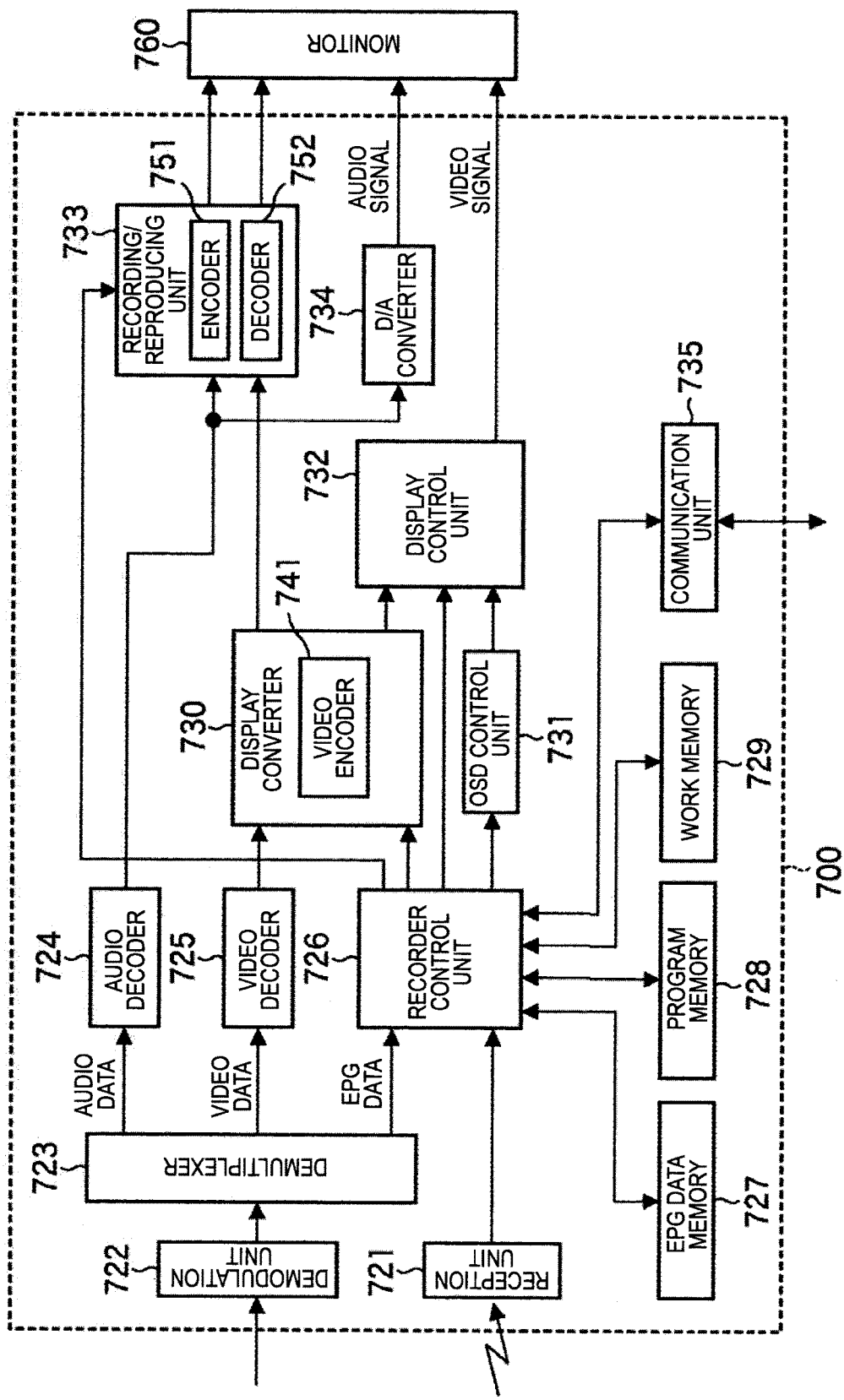
FIG. 26 is a block diagram that illustrates an example of a main configuration of a hard disk recorder.

FIG. 26 is a block diagram that illustrates an example of a main configuration of a hard disk recorder that uses the image encoding device and the image decoding device according to the present technology.

The hard disk recorder (HDD recorder) 700 illustrated in FIG. 26 is a device that stores audio data and video data of a broadcasting program included in a broadcasting signal (television signal), which is received by a tuner, transmitted from a satellite, a terrestrial antenna, or the like in a hard disk that is built therein and provides a user with the stored data at timing according to a user's instruction.

The hard disk recorder 700, for example, may extract audio data and video data from a broadcasting signal, appropriately decode the audio data and the video data, and store the audio data and the video data that have been decoded in the hard disk that is built therein. In addition, the hard disk recorder 700, for example, may acquire audio data and video data from another device through a network, appropriately decode the audio data and the video data, and store the audio data and the video data that have been decoded in the hard disk that is built therein.

In addition, the hard disk recorder 700, for example, decodes the audio data or the video data that is recorded in the built-in hard disk, supplies the audio data or the video data that has been decoded to a monitor 760, and displays an image thereof on the screen of the monitor 760. Furthermore, the hard disk recorder 700 may output audio from a speaker of the monitor 760.

The hard disk recorder 700, for example, decodes audio data or video data that is extracted from a broadcasting signal acquired through a tuner or audio data or video data acquired from another device through the network and supplies the audio data or the video data that has been decoded to the monitor 760 so as to display the image on the screen of the monitor 760. In addition, the hard disk recorder 700 may output the audio from the speaker of the monitor 760.

It is apparent that other operations can be performed.

As illustrated in FIG. 26, the hard disk recorder 700 includes a reception unit 721, a demodulation unit 722, a demultiplexer 723, an audio decoder 724, a video decoder 725, and a recorder control unit 726. In addition, the hard disk recorder 700 includes an EPG data memory 727, a program memory 728, a work memory 729, a display converter 730, an on screen display (OSD) control unit 731, a display control unit 732, a recording/reproducing unit 733, a D/A converter 734, and a communication unit 735.

The display converter 730 includes a video encoder 741. The recording/reproducing unit 733 includes an encoder 751 and a decoder 752.

The reception unit 721 receives an infrared signal transmitted from a remote controller (not illustrated in the diagram), converts the infrared signal into an electrical signal, and outputs the electrical signal to the recorder control unit 726. The recorder control unit 726, for example, is configured by a microprocessor or the like and performs various processes in accordance with a program that is stored in the program memory 728. The recorder control unit 726, at this time, uses the work memory 729 as necessary.

The communication unit 735 is connected to a network and performs a process of communicating with other devices through the network. For example, the communication unit 735 communicates with a tuner (not illustrated in the diagram) under the control of the recorder control unit 726 and outputs a channel selection signal mainly to the tuner.

The demodulation unit 722 demodulates a signal supplied from the tuner and outputs the demodulated signal to the demultiplexer 723. The demultiplexer 723 separates the data supplied froth the demodulation unit 722 into audio data, video data, and EPG data and outputs the separated data to the audio decoder 724, the video decoder 725, or the recorder control unit 726.

The audio decoder 724 decodes the input audio data, for example, in an MPEG mode and outputs the decoded audio data to the recording/reproducing unit 733. The video decoder 725 decodes the input video data, for example, in the MPEG mode and outputs the decoded video data to the display converter 730. The recorder control unit 726 supplies the input EPG data to the EPG data memory 727 for storage.

The display converter 730 encodes the video data that is supplied from the video decoder 725 or the recorder control unit 726 into video data, for example, of a national television standards committee (NTSC) mode using the video encoder 741 and outputs the encoded video data to the recording/reproducing unit 733. In addition, the display converter 730 converts the screen size of video data that is supplied from the video decoder 725 or the recorder control unit 726 into a size that corresponds to the size of the monitor 760. The display converter 730 further converts the video data, of which the screen size has been converted, into a video data of the NTSC mode using the video encoder 741, converts the converted video data into an analog signal, and outputs the analog signal to the display control unit 732.

The display control unit 732 overlaps an on screen display (OSD) signal output by the OSD control unit 731 with the video signal input from the display converter 730 and outputs a resultant signal to the display of the monitor 760 for display under the control of the recorder control unit 726.

In addition, the audio data output by the audio decoder 724 is converted into an analog signal by the D/A converter 734 and is supplied to the monitor 760. The monitor 760 outputs the audio signal from the built-in speaker.

The recording/reproducing unit 733 includes a hard disk as a storage medium that records video data, audio data, and the like therein.

The recording/reproducing unit 733, for example, encodes the audio data supplied from the audio decoder 724 in the MPEG mode using the encoder 751. In addition, the recording/reproducing unit 733 encodes the video data supplied from the video encoder 741 of the display converter 730 in the MPEG mode using the encoder 751. The recording/reproducing unit 733 composes the encoded data of the audio data and the encoded data of the video data using a multiplexer. The recording/reproducing unit 733 amplifies the composed data through channel coding and writes the data into the hard disk through a recording head.

The recording/reproducing unit 733 reproduces the data recorded in the hard disk through a reproducing head, amplifies the data, and separates the data into audio data and video data using the demultiplexer. The recording/reproducing unit 733 decodes the audio data and the video data in the MPEG mode using the decoder 752. The recording/reproducing unit 733 performs D/A conversion of the decoded audio data and outputs resultant audio data to the speaker of the monitor 760. In addition, the recording/reproducing unit 733 performs D/A conversion of the decoded video data and outputs resultant video data to the display of the monitor 760.

The recorder control unit 726 reads latest EPG data from the EPG data memory 727 based on a user instruction that is represented by an infrared signal, which is received through the reception unit 721, transmitted from the remote controller and supplies the latest EPG data to the OSD control unit 731. The OSD control unit 731 generates image data that corresponds to the input EPG data and outputs the image data to the display control unit 732. The display control unit 732 outputs the video data input from the OSD control unit 731 to the display of the monitor 760 for display. Accordingly, the electronic program guide (EPG) is displayed on the display of the monitor 760.

In addition, the hard disk recorder 700 can acquire various kinds of data such as video data, audio data, or EPG data supplied from another device through a network such as the Internet.

The communication unit 735 acquires encoded data of video data, audio data, EPG data, and the like transmitted from another device through the network under the control of the recorder control unit 726 and supplies the acquired encoded data to the recorder control unit 726. The recorder control unit 726, for example, supplies the acquired encoded data of the video data or the audio data to the recording/reproducing unit 733 and stores the encoded data in the hard disk. At this time, the recorder control unit 726 and the recording/reproducing unit 733 may perform a re-encoding process or the like as is necessary.

In addition, the recorder control unit 726 decodes the acquired encoded data of the video data or the audio data and supplies acquired video data to the display converter 730. The display converter 730, similarly to the video data supplied from the video decoder 725, processes the video data supplied form the recorder control unit 726 and supplies the processed video data to the monitor 760 through the display control unit 732, whereby an image thereof is displayed.

Furthermore, in accordance with the display of the image, the recorder control unit 726 may supply the decoded audio data to the monitor 760 through the D/A converter 734 and output the audio from the speaker.

In addition, the recorder control unit 726 decodes the acquired encoded data of the EPG data and supplies the decoded EPG data to the EPG data memory 727.

The above-described hard disk recorder 700 uses the image decoding device 151 (300) as the video decoder 725, the decoder 752, and the decoder that is built in the recorder control unit 726. Accordingly, similarly to the case of the image decoding device 151 (300), the video decoder 725, the decoder 752, and the decoder that is built in the recorder control unit 726 can perform the inverse orthogonal transform processing with a smaller calculation amount.

Accordingly, the hard disk recorder 700 can generate a predicted image with high accuracy. As a result, the hard disk recorder 700 can acquire a decoded image with high accuracy based on the encoded data of the video data received through the tuner, the encoded data of the video data read from the hard disk of the recording/reproducing unit 733, and the encoded data of the video data acquired through the network and display the decoded image on the monitor 760.

In addition, the hard disk recorder 700 uses the image encoding device 51 (200) as the encoder 751. Accordingly, the encoder 751, similarly to the case of the image encoding device 51 (200), can perform the orthogonal transform processing and the inverse orthogonal transform processing with a smaller calculation amount.

Accordingly, the hard disk recorder 700, for example, can improve the encoding efficiency of encoded data to be stored in the hard disk. As a result, the hard disk recorder 700 can use the storage area of the hard disk more efficiently at a higher speed.

In the description presented above, although the hard disk recorder 700 that records the video data or the audio data in the hard disk has been described, it is apparent that a recording medium of any type may be used. For example, even in the case of a recorder such as a flash memory, an optical disc, or a video tape that uses a recording medium other than a hard disk, similarly to the case of the above-described hard disk recorder 700, the image encoding device 51 (200) and the image decoding device 151 (300) can be applied.

Seventh Embodiment

Configuration Example of Camera

Figure 27:
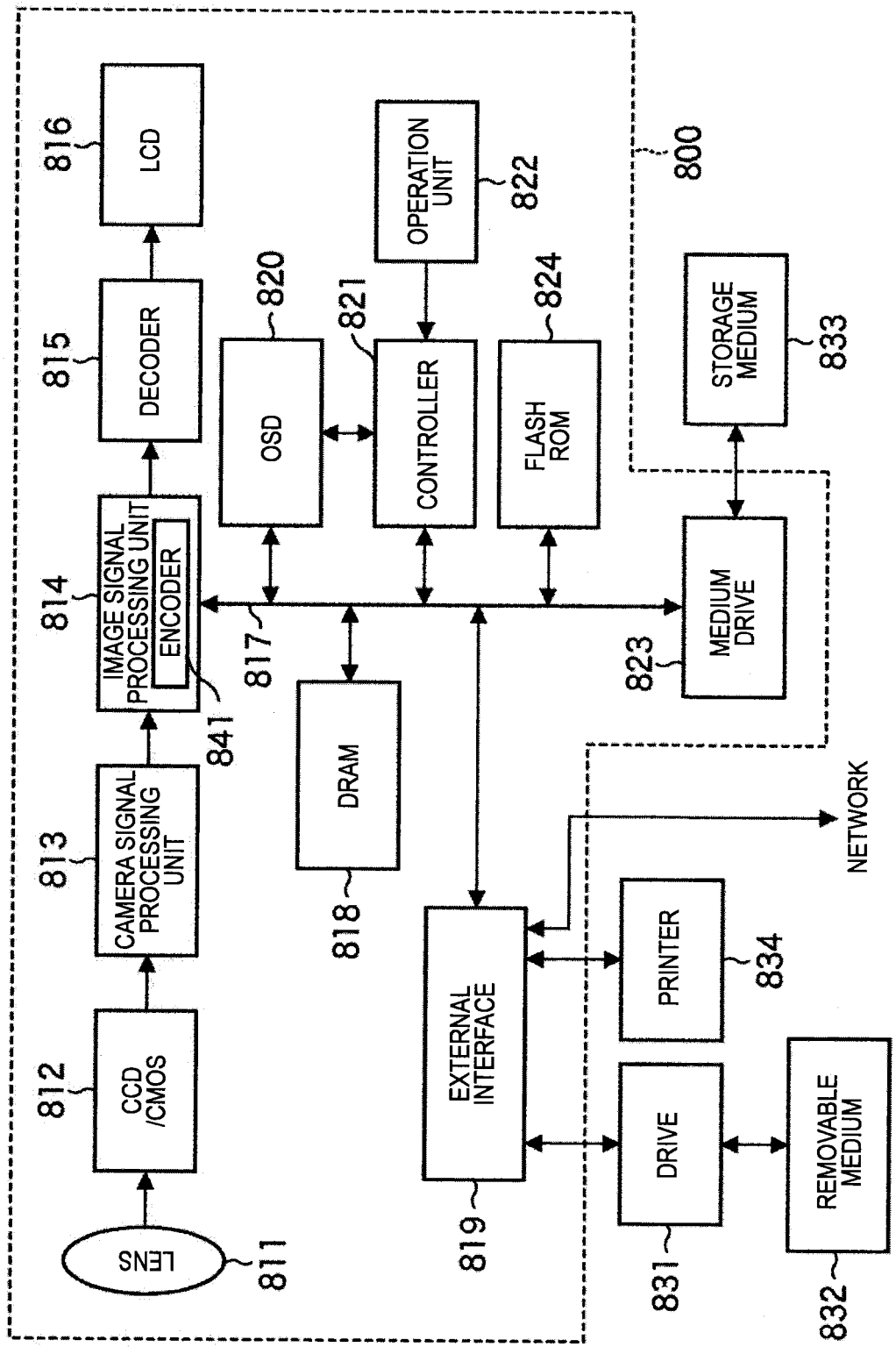
FIG. 27 is a block diagram that illustrates an example of a main configuration of a camera.

FIG. 27 is a block diagram that illustrates an example of a main configuration of a camera that uses the image decoding device and the image encoding device according to the present technology.

The camera 800 illustrated in FIG. 27 images a subject and displays an image of the subject on an LCD 816 or records the image in a recording medium 833 as image data.

A lens block 811 allows light (in other words, a video of a subject) to be incident to a CCD/CMOS 812. The CCD/CMOS 812 is an image sensor that uses a CCD or a CMOS, converts the intensity of received light into an electrical signal, and supplies the electrical signal to a camera signal processing unit 813.

The camera signal processing unit 813 converts electrical signals supplied from the CCD/CMOS 812 into chrominance signals of Y, Cr, and Cb and supplies the chrominance signals to an image signal processing unit 814. The image signal processing unit 814 performs predetermined image processing for an image signal supplied from the camera signal processing unit 813 or decodes the image signal, for example, in the MPEG mode using an encoder 841 under the control of a controller 821. The image signal processing unit 814 encodes an image signal and supplies the generated encoded data to a decoder 815. In addition, the image signal processing unit 814 acquires display data generated on an on-screen display (OSD) 820 and supplies the display data to the decoder 815.

In the above-described process, the camera signal processing unit 813 maintains the image data, encoded data acquired by encoding the image data, or the like in a dynamic random access memory (DRAM) 818 as is necessary by appropriately using the DRAM 818 that is connected through a bus 817.

The decoder 815 decodes the encoded data supplied from the image signal processing unit 814 and supplies acquired image data (decoded image data) to the LCD 816. In addition, the decoder 815 supplies the display data supplied from the image signal processing unit 814 to the LCD 816. The LCD 816 appropriately composes the image of the decoded image data supplied from the decoder 815 and the image of the display data and displays the composed image.

The on screen display 820 outputs display data such as a menu screen that is formed by symbols, characters, or graphics or icons to the image signal processing unit 814 through the bus 817 under the control of the controller 821.

The controller 821 performs various processes based on a signal that represents a content that is instructed by a user using an operation unit 822 and controls the image signal processing unit 814, the DRAM 818, an external interface 819, the on screen display 820, a medium drive 823, and the like through the bus 817. In a flash ROM 824, a program, data, and the like that are necessary for the controller 821 to perform various processes are stored.

For example, the controller 821, instead of the image signal processing unit 814 or the decoder 815, may encode the image data that is stored in the DRAM 818 or decode the encoded data that is stored in the DRAM 818. At this time, the controller 821 may perform an encoding/decoding process in the same mode as the encoding/decoding mode of the image signal processing unit 814 or the decoder 815 or may perform the encoding/decoding process in a mode that the image signal processing unit 814 or the decoder 815 does not support.

For example, in a case where image printing is directed to be started from the operation unit 822, the controller 821 reads image data from the DRAM 818 and supplies the image data to a printer 834 that is connected to the external interface 819 through the bus 817 for being printed.

In addition, for example, in a case where image recording is directed from the operation unit 822, the controller 821 reads encoded data from the DRAM 818 and supplies the encoded data to the recording medium 833 installed to the medium drive 823 through the bus 817 for storage.

The recording medium 833 is an arbitrary readable and writable removable medium such as a magnetic disk, a magneto-optical disk, an optical disc, or a semiconductor memory. It is apparent that the recording medium 833 may be an arbitrary type as a removable medium and may be a tape device, a disk, or a memory card. Furthermore, the recording medium 833 may be a non-contact IC card or the like.

In addition, the medium drive 823 and the recording medium 833 may be integrated so as to be configured as a non-portable storage medium such as a built-in hard disk drive or a solid state drive (SSD).

The external interface 819, for example, is configured by a USB input/output terminal or the like and is connected to the printer 834 in a case where an image is printed. In addition, a drive 831 is connected to the external interface 819 as is necessary, a removable medium 832 such as a magnetic disk, an optical disc, or a magneto-optical disk is appropriately installed, and a computer program read from them is installed in the flash ROM 824 as is necessary.

In addition, the external interface 819 includes a network interface that is connected to a predetermined network such as a LAN or the Internet. The controller 821, for example, may read encoded data from the DRAM 818 in accordance with an instruction transmitted from the operation unit 822 and supply the encoded data to another device that is connected through the network from the external interface 819. In addition, the controller 821 may acquire encoded data or image data supplied from another device through the network through the external interface 819 and maintain the data in the DRAM 818 or supply the data to the image signal processing unit 814.

The above-described camera 800 uses the image decoding device 151 (300) as the decoder 815. Accordingly, similarly to the case of the image decoding device 151, the decoder 815 can perform the inverse orthogonal transform processing with a smaller calculation amount.

Accordingly, the camera 800 can realize a high-speed process and generate a predicted image having high accuracy. As a result, the camera 800, for example, can acquire a decoded image having higher accuracy based on the image data generated by the CCD/CMOS 812, the encoded data of the video data read from the DRAM 818 or the recording medium 833, encoded data of the video data acquired through the network and display the decoded image on the LCD 816.

In addition, the camera 800 uses the image encoding device 51 (200) as the encoder 841. Accordingly, the encoder 841, similarly to the case of the image encoding device 51 (200), can perform the orthogonal transform processing and the inverse orthogonal transform processing with a smaller calculation amount.

Therefore, the camera 800, for example, can improve the encoding efficiency of encoded data that is recorded in a hard disk. As a result, the camera 800 can use the storage area of the DRAM 818 or the recording medium 833 at a high speed more efficiently.

In addition, a decoding method used in the image decoding device 151 (300) may be applied to the decoding process that is performed by the controller 821. Similarly, an encoding method used in the image encoding device 51 (200) may be applied to the encoding process that is performed by the controller 821.

Furthermore, the image data that is captured by the camera 800 may be a moving image or a still image.

It is apparent that the image encoding device 51 (200) and the image decoding device 151 (300) also can be applied to a device other than the above-described device or a system.

In addition, an embodiment of the present technology is not limited to the above-described embodiments, and various changes can be made therein in a range not departing from the concept of the present technology.

Furthermore, the present technology may have the following configurations.

(1)

There is provided an encoding device including: a prior orthogonal transformation unit that performs a second orthogonal transform of which a calculation amount is smaller than a calculation amount of a first orthogonal transform for an image; a posterior orthogonal transformation unit that performs the first orthogonal transform for a low-frequency component of the image that is acquired as a result of the second orthogonal transform; and an encoding unit that encodes the low-frequency component after the first orthogonal transform and a high-frequency component of the image that is acquired as a result of the second orthogonal transform.

(2)

The encoding device described in (1) described above, wherein the first orthogonal transform is a separable-type Karhunen-Loeve transform.

(3)

The encoding device described in (1) or (2) described above, wherein the posterior orthogonal transformation unit performs a non-separable type Karhunen-Loeve transform for the low-frequency component in a case where a predicted direction of an intra prediction mode in an AVC (advanced video coding) mode of the image is an oblique direction and performs a separable-type Karhunen-Loeve transform for the low-frequency component in a case where the predicted direction of the intra prediction mode of the image is not the oblique direction.

(4)

The encoding device described in (3) described above, wherein, in a case where the predicted direction of the intra prediction mode of the image is the oblique direction, the prior orthogonal transformation unit performs the second orthogonal transforms more than the second orthogonal transforms that are performed in a case where the predicted direction of the intra prediction mode of the image is not the oblique direction.

(5)

The encoding device described in any one of (1) to (4) described above, wherein the second orthogonal transform is a wavelet transform.

(6)

The encoding device described in any one of (1) to (5) described above, wherein the encoding unit encodes the low-frequency component after the first orthogonal transform and the high-frequency component in an order according to the intra prediction mode in the AVC (advance video coding) mode of the image.

(7)

There is provided an encoding method performed by an encoding device including the steps of: performing a second orthogonal transform of which a calculation amount is smaller than a calculation amount of a first orthogonal transform for an image; performing the first orthogonal transform for a low-frequency component of the image that is acquired as a result of the second orthogonal transform; and encoding the low-frequency component after the first orthogonal transform and a high-frequency component of the image that is acquired as a result of the second orthogonal transform.

(8)

There is provided a decoding device including: a decoding unit that acquires a coefficient of a low-frequency component of an image after a first orthogonal transform that is acquired as a result of performing a second orthogonal transform of which a calculation amount is smaller than a calculation amount of the first orthogonal transform as a result of encoding the image and a result of encoding a high-frequency component of the image that is acquired as a result of performing the second orthogonal transform and decodes a result of encoding of the image; a prior inverse orthogonal transformation unit that performs a first inverse orthogonal transform that corresponds to the first orthogonal transform for the coefficient of the low-frequency component after the first orthogonal transform that is acquired as a result of the decoding; and a posterior inverse orthogonal transformation unit that acquires the image by performing a second inverse orthogonal transform that corresponds to the second inverse orthogonal transform for the low-frequency component that is acquired as a result of the first inverse orthogonal transform and the high-frequency component that is acquired as a result of the decoding.

(9)

The decoding device described in (8) described above, wherein the first inverse orthogonal transform is a separable-type inverse Karhunen-Loeve transform.

(10)

The decoding device described in (8) or (9) described above, wherein an intra prediction mode of the image in the AVC (advanced video coding) mode is included in the result of the encoding, and the prior inverse orthogonal transformation unit performs a non-separable type inverse Karhunen-Loeve transform for the coefficient of the low-frequency component after the first orthogonal transform in a case where a predicted direction of the intra prediction mode is an oblique direction and performs a separable-type inverse Karhunen-Loeve transform for the coefficient of the low-frequency component after the first orthogonal transform in a case where a predicted direction of the intra prediction mode is not the oblique direction.

(11)

The decoding device described in (10) described above, wherein, in a case where the predicted direction of the intra prediction mode is an oblique direction, the prior inverse orthogonal transformation unit performs the second inverse orthogonal transforms more than the second inverse orthogonal transforms that are performed in a case where the predicted direction of the intra prediction mode is not the oblique direction.

(12)

The decoding device described in any one of (8) to (11) described above, wherein the second inverse orthogonal transform is an inverse wavelet transform.

(13)

The decoding device described in any one of (8) to (12) described above, wherein an intra prediction mode of the image in the AVC (advanced video coding) mode is included in the result of the encoding, and the decoding unit decodes the coefficient of the low-frequency component after the first orthogonal transform and the high-frequency component in order according to the intra prediction mode.

(14)

There is provided a decoding method performed by a decoding device including the steps of: acquiring a coefficient of a low-frequency component of an image after a first orthogonal transform that is acquired as a result of performing a second orthogonal transform of which a calculation amount is smaller than a calculation amount of the first orthogonal transform as a result of encoding the image and a result of encoding a high-frequency component of the image that is acquired as a result of performing the second orthogonal transform and decoding a result of encoding of the image; performing a first inverse orthogonal transform that corresponds to the first orthogonal transform for the coefficient of the low-frequency component after the first orthogonal transform that is acquired as a result of the decoding; and acquiring the image by performing a second inverse orthogonal transform that corresponds to the second orthogonal transform for the low-frequency component that is acquired as a result of the first inverse orthogonal transform and the high-frequency component that is acquired as a result of the decoding.

REFERENCE SIGNS LIST

51 Image encoding device
66 Lossless encoding unit
91 DWT unit
92-0 to 92-8 KLT unit
101-0 to 101-8 Inverse KLT units
103 Inverse DWT unit
151 Image decoding device
162 Lossless decoding unit
200 Image encoding device
221 DWT unit
222-3 to 222-8 KLT unit
241-3 to 241-8 Inverse KLT unit
244 Inverse DWT unit

The invention claimed is:
1. A decoding device comprising:
  circuitry configured to:
    acquire a coefficient of a low-frequency component of an image after a first orthogonal transform that is acquired as a result of performing a second orthogonal transform of which a calculation amount is smaller than a calculation amount of the first orthogonal transform as a result of encoding the image and a result of encoding a high-frequency component of the image that is acquired as a result of performing the second orthogonal transform;

decode the result of encoding of the image and the result of encoding the high-frequency component of the image;

perform a first inverse orthogonal transform that corresponds to the first orthogonal transform on the coefficient of the low-frequency component of the image after the first orthogonal transform that is acquired as a result of the decoding; and acquire the image for display on a display device by performing a second inverse orthogonal transform that corresponds to the second orthogonal transform on the low-frequency component that is acquired as a result of performing the first inverse orthogonal transform and the high-frequency component of the image that is acquired as the result of the decoding, wherein a first type of the first inverse orthogonal transform is used in a case where the predicted direction of the intra prediction mode is one of a horizontal direction or a vertical direction and a second type of the first orthogonal transform, different from the first type, is used for all other intra prediction modes.

2. The decoding device according to claim 1, wherein the first type of the first inverse orthogonal transform is a separable-type inverse Karhunen-Loeve transform.

3. The decoding device according to claim 1,
wherein the intra prediction mode of the image in an AVC (advanced video coding) mode is included in the result of the encoding, and
wherein the circuitry is further configured to perform a non-separable type inverse Karhunen-Loeve transform for the coefficient of the low-frequency component after the first orthogonal transform for the all other intra prediction modes and perform a separable-type inverse Karhunen-Loeve transform for the coefficient of the low-frequency component after the first orthogonal transform in the case where the predicted direction of the intra prediction mode is the one of the horizontal direction or the vertical direction.

4. The decoding device according to claim 3, wherein for the all other intra prediction modes, the circuitry is further configured to perform the second inverse orthogonal transforms more than the second inverse orthogonal transforms that are performed in the case where the predicted direction of the intra prediction mode is the one of the horizontal direction or the vertical direction.

5. The decoding device according to claim 1, wherein the first inverse orthogonal transform is an inverse wavelet transform.

6. The decoding device according to claim 1,
wherein the intra prediction mode of the image in an AVC (advanced video coding) mode is included in the result of the encoding, and
wherein the circuitry is further configured to decode the coefficient of the low-frequency component after the first orthogonal transform and the high-frequency component in order according to the intra prediction mode.

7. A decoding method performed by a decoding device, the decoding method comprising the steps of:
acquiring, via circuitry of the decoding device, a coefficient of a low-frequency component of an image after a first orthogonal transform that is acquired as a result of performing a second orthogonal transform of which a calculation amount is smaller than a calculation amount of the first orthogonal transform as a result of encoding the image and a result of encoding a high-frequency component of the image that is acquired as a result of performing the second orthogonal transform;

decoding, via the circuitry, the result of encoding of the image and the result of encoding the high-frequency component of the image;

performing, via the circuitry, a first inverse orthogonal transform that corresponds to the first orthogonal transform on the coefficient of the low-frequency component of the image after the first orthogonal transform that is acquired as a result of the decoding; and acquiring, via the circuitry, the image for display on a display device by performing a second inverse orthogonal transform that corresponds to the second orthogonal transform on the low-frequency component that is acquired as a result of performing the first inverse orthogonal transform and the high-frequency component of the image that is acquired as the result of the decoding, wherein a first type of the first inverse orthogonal transform is used in a case where the predicted direction of the intra prediction mode is one of a horizontal direction or a vertical direction and a second type of the first orthogonal transform, different from the first type, is used for all other intra prediction modes.

* * * * *